United States Patent
Mori et al.

(10) Patent No.: US 9,151,888 B2
(45) Date of Patent: Oct. 6, 2015

(54) OPTICAL WAVEGUIDE AND ELECTRONIC DEVICE

(75) Inventors: Tetsuya Mori, Tokyo (JP); Kimio Moriya, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 237 days.

(21) Appl. No.: 13/819,600

(22) PCT Filed: Aug. 26, 2011

(86) PCT No.: PCT/JP2011/004773
§ 371 (c)(1),
(2), (4) Date: Feb. 27, 2013

(87) PCT Pub. No.: WO2012/026135
PCT Pub. Date: Mar. 1, 2012

(65) Prior Publication Data
US 2013/0170803 A1 Jul. 4, 2013

(30) Foreign Application Priority Data
Aug. 27, 2010 (JP) ................................. 2010-191294

(51) Int. Cl.
*G02B 6/028* (2006.01)
*G02B 6/122* (2006.01)
(Continued)

(52) U.S. Cl.
CPC .............. *G02B 6/028* (2013.01); *G02B 6/1221* (2013.01); *G02B 6/138* (2013.01); *G02B 6/4214* (2013.01)

(58) Field of Classification Search
None
See application file for complete search history.

(56) References Cited

U.S. PATENT DOCUMENTS

| 5,179,614 | A | 1/1993 | Kanamori et al. |
| 5,243,677 | A | 9/1993 | Kanamori et al. |
| 5,593,621 | A | 1/1997 | Koike et al. |

(Continued)

FOREIGN PATENT DOCUMENTS

| CN | 1902515 A | 1/2007 |
| CN | 101535852 A | 9/2009 |

(Continued)

OTHER PUBLICATIONS

Takeyoshi, Y., et al., "Multichannel Parallel Polymer Waveguide With Circular W-Shaped Index Profile Cores," IEEE Photonics Technology Letters, vol. 19, No. 22, pp. 1795-1797, (Nov. 15, 2007).

(Continued)

*Primary Examiner* — Sung Pak
(74) *Attorney, Agent, or Firm* — Oblon, McClelland, Maier & Neustadt, L.L.P.

(57) ABSTRACT

An optical waveguide including a first cladding layer; a core layer, including first and second core sections with cladding sections on sides thereof in the in-layer direction; and a second cladding layer. A refractive index distribution in the in-layer direction in the core layer, from the first core section to an adjacent cladding section, has a continuous change and a region with a first peak, a first dip, and a second peak in this order; the first peak at a position of the first core section, the second peak with a maximum value of refractive index smaller than of the first peak, at a position of the cladding section, and a portion, from the first cladding layer to the first core section, corresponded to a refractive index distribution in the layer-stacking direction, discontinuously changing at the boundary between the first cladding layer and first core section.

25 Claims, 12 Drawing Sheets

(51) Int. Cl.
*G02B 6/138* (2006.01)
*G02B 6/42* (2006.01)

(56) References Cited

U.S. PATENT DOCUMENTS

| | | | |
|---|---|---|---|
| 7,324,723 | B2 | 1/2008 | Shioda et al. |
| 8,774,575 | B2 | 7/2014 | Fujiwara et al. |
| 2003/0002834 | A1 | 1/2003 | Brown et al. |
| 2005/0074207 | A1 | 4/2005 | Shioda et al. |
| 2005/0135765 | A1* | 6/2005 | Nakata et al. ............ 385/129 |
| 2005/0207714 | A1 | 9/2005 | Koike et al. |
| 2005/0213917 | A1* | 9/2005 | Fukuda et al. ............ 385/132 |
| 2006/0029348 | A1* | 2/2006 | Kempen et al. ............ 385/129 |
| 2008/0205840 | A1* | 8/2008 | Wakabayashi et al. ...... 385/128 |
| 2010/0067861 | A1 | 3/2010 | Choki et al. |
| 2011/0243499 | A1 | 10/2011 | Fujiwara et al. |

FOREIGN PATENT DOCUMENTS

| | | |
|---|---|---|
| CN | 1605887 B | 4/2010 |
| JP | 48 16651 | 3/1973 |
| JP | 4 128704 | 4/1992 |
| JP | 6 18739 | 1/1994 |
| JP | 8 304644 | 11/1996 |
| JP | 9 197148 | 7/1997 |
| JP | 11 133254 | 5/1999 |
| JP | 2001 4852 | 1/2001 |
| JP | 2003 14965 | 1/2003 |
| JP | 3552592 B2 | 8/2004 |
| JP | 2004 295043 | 10/2004 |
| JP | 2005 300652 | 10/2005 |
| JP | 2006 276735 | 10/2006 |
| JP | 4449075 B2 | 4/2010 |
| TW | 201030404 A | 8/2010 |
| WO | 94 04949 | 3/1994 |
| WO | 2004 025340 | 3/2004 |
| WO | 2008 105404 | 9/2008 |

OTHER PUBLICATIONS

Hirobe, Y., et al., "Four-Channel Polymer Optical Waveguide with W-shaped Index Profile Cores and Its Low Inter-Channel Crosstalk Property," IEEE Lasers and Electro-Optics Society, pp. 443-444, (2008).

International Search Report Issued Nov. 8, 2011 in PCT/JP11/04773 Filed Aug. 26, 2011.

Combined Chinese Office Action and Search Report issued Aug. 1, 2014 in Patent Application No. 201180041360.0 (with English translation of categories of cited documents).

* cited by examiner (a)            (b)

(a)

(b)

OPTICAL WAVEGUIDE AND ELECTRONIC DEVICE

TECHNICAL FIELD

The present invention relates to an optical waveguide and an electronic device.

BACKGROUND ART

In recent optical communication technology for transferring data using optical carrier wave, optical waveguide has been disseminated as a means for guiding the optical carrier wave from one location to another location. The optical waveguide has a linear core section, and a cladding section provided so as to surround the core section.

A known optical waveguide is found, for example, in Patent Literature 1. Patent Literature 1 describes an optical waveguide having the refractive index of the core section concentrically distributed when viewed in the transverse cross section, which was established by allowing a refractive index adjusting agent to diffuse in a base polymer. It is also described that the refractive index of the cladding section, which surrounds the core section, is kept constant. The core section is composed of a material substantially transparent to light used as the optical carrier wave, whereas the cladding section is composed of a material having the refractive smaller than that of the core section.

RELATED DOCUMENT

Patent Document

PATENT LITERATURE 1: Japanese Laid-Open Patent Publication No. 2006-276735

SUMMARY OF THE INVENTION

Technical Problem

According to the background art described in the above, a configuration having a plurality of core sections formed therein, sometimes resulted in crosstalk between the adjacent core sections.

Solution to Problem

The present invention includes the configurations below:

[1]
An optical waveguide which includes:
a first cladding layer;
a core layer provided over the first cladding layer, and has therein a cladding section, a first core section, a cladding section, a second core section, and a cladding section aligned in this order in the in-layer direction; and
a second cladding layer provided over the core layer,
a refractive index distribution W in the in-layer direction in a portion of the core layer, which ranges from the first core section to the cladding section, showing a continuous change and having a region in which a first peak, a first dip, and a second peak are aligned in this order,
both of the first core section and the second core section being brought into contact with the first cladding layer and with the second cladding layer,
the refractive index distribution W showing the first peak at the position corresponded to the first core section,
the refractive index distribution W showing the second peak with a maximum value of refractive index smaller than that of the first peak, at the position corresponded to the cladding section, and
a refractive index distribution T in the layer-stacking direction in a portion, which ranges from the first cladding layer to the first core section, showing a discontinuous change at the boundary between the first cladding layer and the first core section.

[2]
The optical waveguide according to [1],
wherein a refractive index distribution P in the layer-stacking direction, in a portion which ranges from the first cladding layer through the cladding section to the second cladding layer, appears differently in a portion located at the first cladding layer and in a portion located at the cladding section.

[3]
The optical waveguide according to [1] or [2],
wherein the refractive index distribution T in the layer-stacking direction, in a portion which ranges from the first cladding layer to the first core section, is different from the refractive index distribution W.

[4]
The optical waveguide according to any one of [1] to [3],
wherein a difference between the maximum value of refractive index of the first core section and the maximum value of refractive index of the first cladding layer, is larger than a difference between the maximum value of refractive index of the first core section and the maximum value of refractive index of the cladding section.

[5]
The optical waveguide according to any one of [1] to [4],
which further includes a second core layer provided over the second cladding layer, and
the second core layer has a third core section located above the first core section in the layer-stacking direction.

[6]
The optical waveguide according to any one of [1] to [5],
wherein the refractive index at the bottom of the first dip is smaller than the average refractive index of the cladding section.

[7]
The optical waveguide according to any one of [1] to [6],
wherein the refractive index distribution W shows the apex of the second peak at a portion other than the vicinity of the boundary between the first core section and the cladding section.

[8]
The optical waveguide according to any one of [1] to [7],
wherein the refractive index distribution W shows the apex of the second peak at the center portion of the cladding section, and has a region in which the refractive index continuously decreases from the apex of the second peak towards the first dip.

[9]
The optical waveguide according to any one of [1] to [8],
wherein the difference between the refractive indices of the first core section and the first cladding layer in the refractive index distribution T, is larger than a difference between the refractive indices at the bottom of the first dip and at the apex of the first peak in the refractive index distribution W.

[10]
The optical waveguide according to any one of [1] to [9],
which further includes a space provided so as to extend across the first core section and the first cladding layer, with an inner surface thereof being configured as a reflective surface on which light which propagates through the core section is reflected.

[11]

The optical waveguide according to any one of [1] to [10], wherein a difference between the refractive indices at the bottom of the first dip and the average refractive index of the cladding section, is 3 to 80% of a difference between the refractive indices at the bottom of the first dip and at the apex of the first peak.

[12]

The optical waveguide according to any one of [1] to [11], wherein a difference between the refractive indices at the bottom of the first dip and at the apex of the first peak is 0.005 to 0.07.

[13]

The optical waveguide according to any one of [1] to [12], wherein, in the refractive index distribution W, defining a [μm] to be the width of a region of the first peak, over which the refractive index is not smaller than the average refractive index of the cladding section, and defining b [μm] to be the width of a region of the first dip, over which the refractive index is smaller than the average refractive index of the cladding section, then b is 0.01a to 1.2a.

[14]

An optical waveguide which includes:

a core layer which has a core section, and side-face cladding sections adjacent to both side faces of the core section; and cladding layers stacked on both surfaces of the core layer, a refractive index distribution W in the widthwise direction of a transverse cross section of the core layer showing at least two local minima, at least one first local maximum, and at least two second local maxima smaller than the first local maximum, and having a region in which the second local maximum, the local minimum, the first local maximum, the local minimum, and the second local maximum aligned in this order, a part of the region which contains the first local maximum and falls between the two local minima being corresponded to the core section, and parts of the region which extend from the individual local minima towards the second local maxima being corresponded to the side-face cladding sections, the core section being brought into contact respectively with the cladding layers stacked on both surfaces of the core layer, each of the local minima being smaller than the average refractive index of the cladding section, and, the refractive index continuously changing over the entire range of the refractive index distribution, a refractive index distribution T, in the thickness-wise direction of the transverse cross section of the optical waveguide, showing an almost constant refractive index respectively in a region corresponded to the core section and regions corresponded to the cladding layers, and the refractive index discontinuously changes at the boundaries between the core section and the cladding layers.

[15]

An electronic device having the optical waveguide described in any one of [1] to [14].

Advantageous Effects of Invention

According to the present invention, crosstalk between the adjacent core sections may be suppressed.

DESCRIPTION OF EMBODIMENTS

The optical waveguide of the present invention and the electronic device will be detailed below based on preferred embodiments, referring to the attached drawings.

<Optical Waveguide>

First, the optical waveguide of the present invention will be explained.

(First Embodiment)

Figure 1:
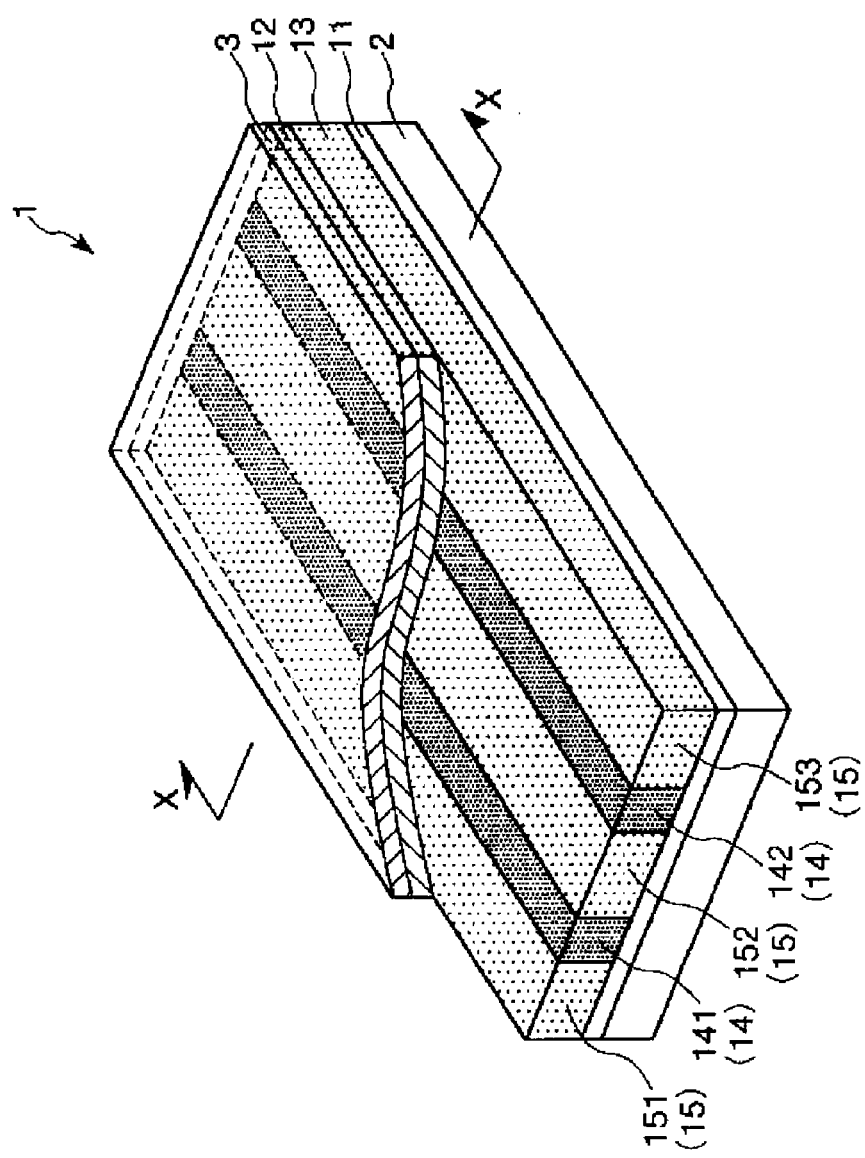
FIG. 1 is a perspective view (partially cutaway and see-through view) illustrating a first embodiment of the optical waveguide of the present invention.
Figure 2:
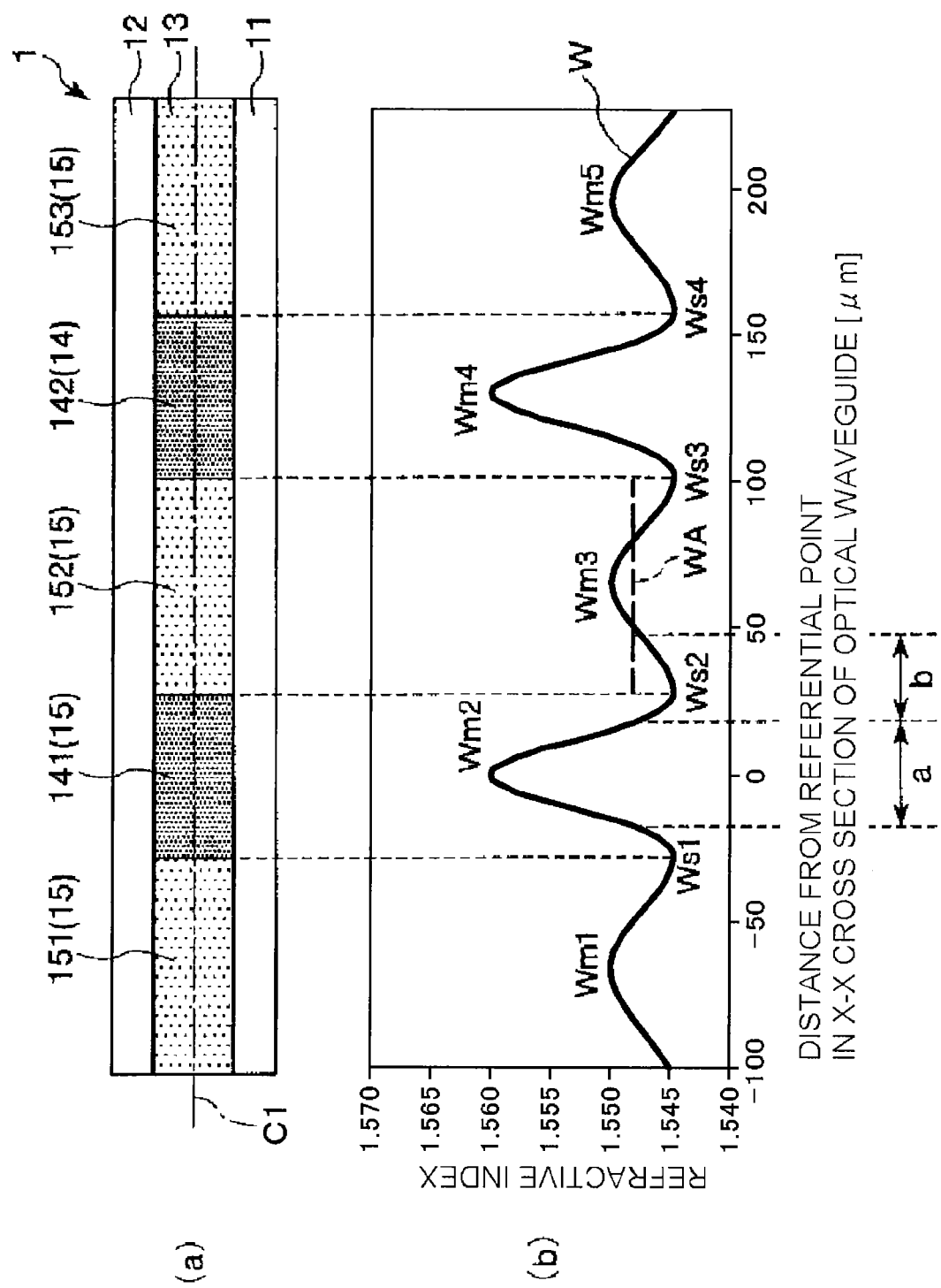
FIG. 2 is a drawing schematically illustrating an exemplary refractive index distribution expressed by position along the center line C1 of the thickness of the core layer, when viewed in a cross section taken along line X-X in FIG. 1, plotted on the abscissa, and refractive index plotted on the ordinate.
Figure 3:
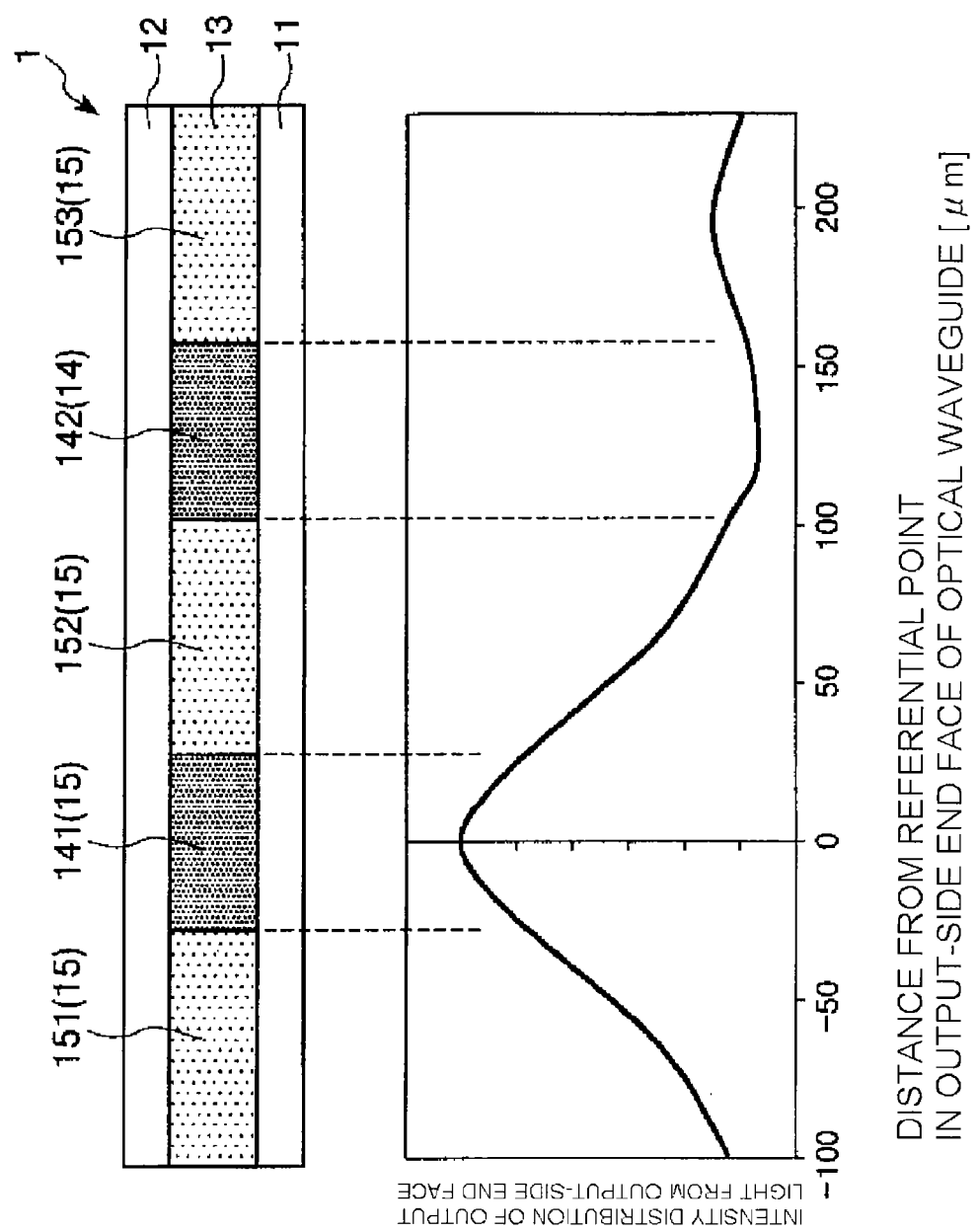
FIG. 3 is a drawing illustrating an exemplary intensity distribution of output light observed when light was incident on one of the core sections of the optical waveguide illustrated in FIG. 1.

FIG. 1 is a perspective view (partially cutaway and see-through view) illustrating a first embodiment of the optical waveguide of the present invention; FIG. 2 is a drawing schematically illustrating an exemplary refractive index distribution expressed by position along the center line of the thickness of the core layer, when viewed in a cross section taken along line X-X in FIG. 1, plotted on the abscissa, and refractive index plotted on the ordinate; and FIG. 3 is a drawing illustrating an exemplary intensity distribution of output light observed when light was incident on one of the core sections of the optical waveguide illustrated in FIG. 1. Note that, in the explanation hereinbelow, the top side and the bottom side of FIG. 1 will be denoted as "upper" and "lower", respectively. FIG. 1 emphasizes the thickness-wise direction of layers (top-bottom direction of the individual drawings).

The optical waveguide of this embodiment will be outlined. The optical waveguide of the first embodiment has a first cladding layer (cladding layer 11), a core layer (core layer 13), and a second cladding layer (cladding layer 12). The core layer (core layer 13) is provided over the cladding layer 11, and has a cladding section, a first core section (core section 14), a cladding section (cladding section 15), a second core section (core section 14), and a cladding section aligned in this order in the in-layer direction. The second cladding layer is provided over the core layer.

A refractive index distribution W in the in-layer direction, which appears in a portion of the core layer ranging from the first core section (core section 14) to the cladding section (cladding section 15), shows a continuous change, and has a region in which a first peak, a first dip, and a second peak are aligned in this order. This sort of refractive index distribution will now be denoted as "W-form refractive index distribution".

The refractive index distribution W which appears in the first core section shows the first peak. The refractive index distribution W which appears in the cladding section shows the second peak with a maximum value of refractive index smaller than that of the first peak.

A refractive index distribution T in the layer-stacking direction, which appears in a portion ranging from the first cladding layer (cladding layer 11) to the first core section (core section 14), typically has a pattern called "stepped index type (referred to as SI type, hereinafter)". The SI type refractive index distribution T means that the refractive index is kept almost constant respectively in the core layer and the cladding layer, but discontinuously changes at the boundary between the core layer and the cladding layer.

A refractive index distribution P in the layer-stacking direction, in a portion ranging from the first cladding layer (cladding layer 11) through the cladding section (cladding section 15) to the second cladding layer (cladding layer 12), appears differently in a portion located at the first cladding layer and in a portion located at the cladding section. For example, the refractive index distribution P may change in a discontinuous manner. The refractive index distribution P typically has a refractive index pattern similar to that of the refractive index distribution T. In other words, the refractive index distribution P preferably has a fifth peak at the position corresponded to the cladding section. The fifth peak of the refractive index distribution P corresponds to the third peak of the refractive index distribution T. In the refractive index distribution P, the maximum refractive index or an average refractive index in the region thereof corresponded to the cladding section, is preferably larger than the maximum refractive index or an average refractive index in the region thereof corresponded to the first cladding layer. In this embodiment, the stacked structure of the first cladding layer, the cladding section of the core layer, and the second cladding layer, which shows the refractive index distribution P, may be fabricated in the same process with the stacked structure of the first cladding layer, the core section of the core layer, and the second cladding layer, which shows the refractive index distribution T.

The refractive index distribution P and the refractive index distribution T may be identical [excluding, for example, the case where the refractive index distribution corresponded to a region ranging from the core section to the adjacent cladding section (cladding layer) is identical in all of six in-plane directions including vertical, transverse, and traverse directions], or may be different from each other. In this embodiment, difference between the refractive index distributions means that (i) the individual refractive index distributions have different repeating pattern of profile, or (ii) the individual refractive index distributions have same profile but different values of refractive index (where, variation ascribable to manufacturing is allowable). For example, difference in the refractive index in the layer-stacking direction observed between the adjacent cladding sections, and difference in the refractive index in the in-layer direction observed between the first core section and the cladding section, may be different.

The refractive index distribution P may be of SI type, for example. The SI-type refractive index distribution P means that the refractive index is kept almost constant in each of the core layer and the cladding layer, but discontinuous at the boundary between the core layer and the cladding layer.

Effects obtainable from the optical waveguide of this embodiment will be explained below.

A first effect relates to that excellent light transmission characteristics may be achieved.

Since the refractive index distribution in the in-layer direction of the core section shows the first dip in the end portion thereof, so that a large difference in the refractive index is ensured between the center portion and the end portion of the core section. Crosstalk between the adjacent core sections aligned in the in-layer direction may thus be suppressed. Even if light should leak from the core section, the leaked light is confined in the cladding section corresponded to the second peak. Accordingly, the crosstalk between the adjacent core sections in the in-layer direction may be suppressed.

A second effect relates to that light confinement effect may be obtained in the cladding section in the layer-stacking direction. Since the refractive index in this embodiment varies over a region ranging from the cladding section to the cladding layer, so that light may be confined in the cladding section or the cladding layer.

A third effect relates to that the optical waveguide may be designed so as to reduce the loss of light, depending on mode of use.

The refractive index distribution T in the layer-stacking direction, assuming the origin at the first core section, may be made different from the refractive index distribution W in the in-layer direction. For example, by making the difference in refractive index in the layer-stacking direction larger than the difference in refractive index in the in-layer direction, loss of light, which possibly occurs when a film of the optical waveguide is folded or wound up in the longitudinal direction of the optical waveguide, may be reduced. Details are as follow. When the film is bent in a predetermined direction, the film may be stretched to reduce the difference in refractive index. As a countermeasure, by preliminarily making the difference in refractive index in the direction of bending of the film large, the loss of light may be reduced even if the difference of refractive index becomes smaller.

A fourth effect relates to a large degree of freedom in the design.

The optical waveguide of this embodiment may be obtained by stacking the films. The thickness of the cladding layer may therefore be determined, arbitrarily based on relation with the thickness of the core layer. Availability of the thickness control successfully enhances the effect of reduction in loss of light coupling.

The optical waveguide of this embodiment will be detailed below.

The refractive index distribution in this embodiment is measured and determined on a cross section of the optical waveguide in the direction orthogonal to the longitudinal direction of the optical waveguide (for example, the longitudinal direction of the first core section).

While this embodiment exemplifies a three-layered configuration, the optical waveguide is not limited to this embodiment, and may have five layers, seven layers, or more. In other words, one or more second core layers may be stacked on the first core layer. Each core layer is preferably sandwiched by the cladding layers.

For example, the optical waveguide of this embodiment may have, over the second cladding layer, another second core layer in addition to the above-described core layer. The second core layer has a third core section provided in the layer-stacking direction relative to the first core section. In other words, the optical waveguide of this embodiment may have a plurality of core sections spaced from each other in the in-layer direction, and a plurality of core sections spaced from each other in the layer-stacking direction.

For example, when viewed in a cross section of the optical waveguide, a plurality of core sections may be arranged in a grid pattern. The optical waveguide of this embodiment is typically laminated with a film. The center of core sections may therefore be prevented from being misaligned in the layer-stacking direction, and thereby the optical coupling loss may be reduced. The optical waveguide of this embodiment may have the core sections formed typically by irradiation of energy beam. Since the misalignment of the core sections in the layer-stacking direction may be reduced, so that the optical coupling loss may be reduced.

It suffices that the refractive index distribution in the in-layer direction of the core layer shows the W-form profile at least in a partial region between two adjacent core sections, where the W-form profile may appear only in regions located on both sides of the core sections, or may appear over the entire range thereof. Repeating units of the W-form refractive index distribution repeated in the in-layer direction may be different from unit to unit.

The refractive index distribution in the layer-stacking direction of the core section will suffice if it appears as the refractive index distribution T in a region which ranges from the core section to the upper cladding layer (or the lower cladding section), or in regions located on both sides of the core section, or the units of the refractive index distribution T may be repeated over the entire range of the regions. Note that the refractive index distribution T repeated in the layer-stacking direction may be different from unit to unit.

While the refractive index distribution in the layer-stacking direction of the cladding section will suffice if it appears different at least between the first cladding section and the cladding section, it may be different not only between the first cladding section and the cladding section, but also between the second cladding section and the cladding section. The refractive index distribution P repeated in the layer-stacking direction may be different from unit to unit.

The difference of refractive index may be, for example, a difference between the maximum value in the first core section and the maximum value in the cladding section, or may be a difference between the average value in the first core section and the average value in the cladding section.

The continuous change in the refractive index distribution means, for example, that a transition region in which the refractive index gradually changes is provided at around the boundary between the cladding layer and the core layer. Various forms of mathematical functions may depict the continuous change in refractive index in the thickness-wise direction, examples of which include spline function and exponential function. In this embodiment, the refractive index continuously changes typically between the peak and the dip.

Each of the peaks in the refractive index distribution (first peak to sixth peak) may have the apex with a local maximum, or the apex with a plateau. Each of the dips in the refractive index distribution (first dip to third dip) may have the apex with a local minimum, or the apex with a plateau.

The first core section may be defined as a region which falls between the local maximum of the first peak and the local minimum of the first dip, and the cladding section may be defined as a region which falls between the local minimum of the first dip and the local maximum of the second dip. Alternatively, the center of the plateau of apex is adoptable, in place of the local maximum or the local minimum.

Although not specifically limited, the width of the plateau is preferably 100 μm or smaller, more preferably 20 μm or smaller, and still more preferably 10 μm or smaller. By reducing the width of plateau, an effect of confinement of light may be enhanced, and thereby the crosstalk between the adjacent core sections may be reduced.

The refractive index distribution in this embodiment may be measured by (1) a method of measuring interference fringes which depend on refractive index under a dual-beam interference microscope, and of calculating the refractive index distribution based on the interference fringes, or by (2) the refracted near field (RNF) method. The refracted near field method may adopt the conditions of measurement described in Japanese Laid-Open Patent Publication No. 5-332880. In this embodiment, the method of using the dual-beam interference microscope is preferably used for simplicity of measurement.

Exemplary procedures of measurement of the refractive index distribution using the dual-beam interference microscope will be explained. First, the optical waveguide is sliced in the direction of cross section, to thereby obtain a slice of the optical waveguide. For example, the optical waveguide is sliced to yield a length of optical waveguide of 200 μm to 300 μm. Next, a space formed between two sheets of slide glass is filled with an oil having a refractive index of 1.536, to thereby configure a chamber. A sample to be measured is prepared by placing the slice of optical waveguide in the chamber space, and a blank sample is prepared without placing the slice. Next, a photograph of interference fringes appeared on the cross section of the optical waveguide is taken under the dual-beam interference microscope. The refractive index distribution may be obtained by image analysis of the resultant photograph of interference fringes. Image data are continuously obtained typically by changing the optical path length of the dual-beam interference microscope so as to vary a position at which the interference fringes appear. Based on the plurality of image data, the refractive index at each point of measurement in the layer-stacking direction and in the in-layer direction is calculated. The intervals of the points of measurement is typically adjusted to 2.5 μm, although not specifically limited.

An example of the optical waveguide of this embodiment will be shown below. In this example, the local maximum resides at the peak in the refractive index distribution, and the local minimum resides at the dip local minimum. The apex of a first peak is denoted as local maximum Wm2, the apex of a second peak is denoted as local maximum Wm3, the apex of a third peak is denoted as local maximum Tm2, the apex of a fourth peak is denoted as local maximum Tm3, the apex of a first dip is denoted as local minimum Ws2, and the apex of a second dip is denoted as local minimum Ts2.

An optical waveguide 1 illustrated in FIG. 1 functions as an optical interconnect which allows therethrough transmission of optical signals from one end to the other end.

The individual constituents of the optical waveguide 1 will be detailed below.

The optical waveguide 1 is configured by a cladding layer 11, a core layer 13 and a cladding layer 12, stacked in this order from the bottom of FIG. 1.

(Core Layer)

The core layer 13 has formed therein a refractive index distribution in the in-layer direction. The refractive index distribution has regions with a relatively large refractive index and regions with a relatively small refractive index, according to which the optical waveguide may allow the incident light to propagate therethrough while confining the light in the region with large refractive index.

FIG. 2(a) is a cross sectional view taken along line X-X in FIG. 1, and FIG. 2(b) is a drawing schematically illustrating an exemplary refractive index distribution which appears on the center line C1 which falls on the center of the core layer 13 in the thickness-wise direction thereof in the X-X cross section.

The core layer 13 is expressed by the refractive index distribution W which contains four local minima Ws1, Ws2, Ws3, Ws4 and five local maxima Wm1, Wm2, Wm3, Wm4, Wm5, as illustrated in FIG. 2(b). The five local maxima include local maxima (first local maximum) with a relatively large refractive index, and local maxima (second local maxima) with a relatively small refractive index.

Of these, the local maxima Wm2 and Wm4 with a relatively large refractive index reside between the local minimum Ws1 and the local minimum Ws2, and between the local minimum Ws3 and the local minimum Ws4, respectively, where the residual local maxima Wm1, Wm3 and Wm5 are those with a relatively small refractive index.

In the optical waveguide 1, as illustrated in FIG. 2, a region corresponded to the local maximum Wm2 with a relatively large refractive index, which falls between the local minimum Ws1 and the local minimum Ws2, serves as the core section 14, and similarly, a region corresponded to the local maximum Wm4, which falls between the local minimum Ws3 and the local minimum Ws4, serves as the core section 14. In more detail, the region between the local minimum Ws1 and the local minimum Ws2 is defined as a core section 141, and the region between the local minimum Ws3 and the local minimum Ws4 is defined as a core section 142.

The region on the left of the local minimum Ws1, the region between the local minimum Ws2 and the local minimum Ws, and the region on the right of the local minimum Ws4 are regions respectively neighboring both sides of the core section 14, and configure side-face cladding sections 15. In further details, the region on the left of the local minimum Ws1 is denoted as a side-face cladding section 151, the region between the local minimum Ws2 and the local minimum Ws3 is denoted as a cladding section 152, and the region on the right of the local minimum Ws4 is denoted as a side-face cladding section 153.

In other words, it suffices that the refractive index distribution W has a region in which at least the second local maximum, the local minimum, the first local maximum, the local minimum, and the second local maximum are aligned in this order. This region is repetitively provided corresponding to the number of core sections. For the case where two core sections 14 are provided as seen in this embodiment, it suffices that the refractive index distribution W has a region in which the local maxima and the local minima alternately aligned therein, typically in the order of the second local maximum, the local minimum, the first local maximum, the local minimum, the second local maximum, the local minimum, the first local maximum, the local minimum, and the second local maximum, and as for the local maxima, it suffices that the first local maxima and the second local maxima are alternately aligned.

It is preferable that the plurality of local minima, the plurality of first local maxima, and the plurality of second local maxima respectively have the same values, where slight differences in the individual values are allowable so long as the local minimum is constantly kept smaller than the first local maximum and the second local maximum, and so long as the second local maximum is constantly kept smaller than the first local maximum. The difference in this case preferably falls within a 10% range around the average of the plurality of local minima.

The optical waveguide 1 has a long strip form, and the above-described refractive index distribution W is kept almost constantly over the entire longitudinal range of the optical waveguide 1.

As a result of such refractive index distribution W, the core layer 13 eventually has two long core sections 14, and three side-face cladding sections 15 neighboring both sides of each core section 14.

In more detail, the optical waveguide 1 illustrated in FIG. 1 has two parallel core sections 141, 142 and three parallel side-face cladding sections 151, 152, 153 alternately aligned. Accordingly, each of the core sections 141, 142 is respectively sandwiched by the side-face cladding sections 151, 152, 153 and the individual cladding layers 11, 12. Since the two core sections 141, 142 have the average refractive index larger than the average refractive index of the three side-face cladding sections 151, 152, 153, so that total reflection of light occurs at the boundaries between the individual core sections 141, 142 and the individual side-face cladding sections 151, 152, 153. In FIG. 1, the individual core sections 14 are expressed by a dense dot mesh, and the individual side-face cladding sections 15 are expressed by a scarce dot mesh.

With the optical waveguide 1, light input to one end of the core section 14 may be allowed to totally reflect at the boundaries between the core sections 14 and the cladding portions (the individual cladding layers 11, 12 and the individual side-face cladding sections 15), may be allowed to propagate towards the other end, and may be extracted from the other end of the core section 14.

The transverse cross section of the core section 14, illustrated in FIG. 1 as being quadrilateral such as square or rectangle, may alternatively have a round shape such as perfect circle, ellipse or oblong circle; or may have a polygonal shape such as triangle, pentagon, or hexagon, without special limitation.

Although not specifically limited, each of the width of the core section 14 and the height thereof (thickness of the core layer 13) is preferably 1 to 200 µm or around, more preferably 5 to 100 µm or around, and still more preferably 20 to 70 µm or around.

Now, each of four local minima Ws1, Ws2, Ws3 and Ws4 is smaller than the average refractive index WA of the side-face cladding section 15. This means that, between the individual core sections 14 and the individual side-face cladding sections 15, there are regions having a refractive index further smaller than that of the side-face cladding sections 15. As a consequence, more steep slope of refractive index appears at around each of the local minima Ws1, Ws2, Ws3 and Ws4, so that leakage of light from the individual core sections 14 may be suppressed, and thereby the optical waveguide 1 with less transmission loss may be obtained.

The refractive index continuously changes over the entire range of the refractive index distribution W. Accordingly, the action of confining light into the core sections 14 is enhanced as compared with an optical waveguide with a step index-type refractive index distribution, so that the transmission loss may further be reduced.

In addition, according to the above-described refractive index distribution W showing the individual local minima Ws1, Ws2, Ws3, Ws4, and in which the refractive index continuously changes, the light is allowed to propagate more densely through regions more closer to the center portions of the core sections 14, so that propagation time through the individual light paths may be less likely to vary. Accordingly, even if pulse signals are contained in the propagation light, pulses may be prevented from being rounded (broadening of pulse signals). The optical waveguide 1 thus obtainable will be improved further in quality of optical communication.

In addition, the light may certainly be confined, even if the difference in average values of refractive index between the core section 14 and the side-face cladding section 15 is small.

In the refractive index distribution W, the local maxima Wm2 and Wm4 are located while being corresponded to the core sections 141, 142 as illustrated in FIG. 2, and moreover at the centers of width of the core sections 141, 142. Accordingly, the propagation light is more likely to be concentrated to the center of width of the individual core sections 141, 142, and thereby becomes less likely to leak out into the side-face cladding sections 151, 152 and 153. As a consequence, the transmission loss in the core sections 141, 142 may further be reduced.

Now, the center of the core section 141 is defined by a region which falls within a 30% range of the width of the core sections 141, on both sides of the middle point between the local minimum Ws1 and the local minimum Ws2.

The local maxima Wm2, Wm4 are preferably located, as possible, at the center of width of the core sections 141, 142. A slight decentering will, however, not result in considerable degradation in characteristics, so long as the local maxima are not located at around the edge of the core sections 141, 142 (portions in contact with the individual side-face cladding sections 151, 152, 153). In other words, the transmission loss in the core sections 141, 142 may be suppressed to some degree.

Note, for example, that "around the edge" of the core section 141 means a region which falls within a 5% range of the width of the core section 141 inwardly extended from the above-described edge.

On the other hand, the local maxima Wm1, Wm3, Wm5 of the refractive index distribution W, located in the side-face cladding sections 151, 152, 153 as illustrated in FIG. 2(b), are preferably located not at around the edges of the side-face cladding sections 151, 152, 153 (portions in contact with the individual core sections 141, 142). This means that the local maxima Wm2, Wm4 in the core sections 141, 142 and the local maxima Wm1, Wm3, Wm5 in the side-face cladding sections 151, 152, 153 are sufficiently spaced from each other, and thereby the light propagating through the core sections 141, 142 becomes much less likely to leak into the side-face cladding sections 151, 152, 153. As a consequence, the propagation loss in the core sections 141, 142 may be reduced.

Note, for example, that "around the edge" of the side-face cladding sections 151, 152, 153 means a region which falls within a 5% range of the width of the side-face cladding sections 151, 152, 153 inwardly extended from the above-described edge.

In addition, the local maxima Wm1, Wm3, Wm5 are preferably located at the center of width of the side-face cladding sections 151, 152, 153, and the refractive index preferably decrease continuously from the local maxima Wm1, Wm3, Wm5 towards the adjacent local minima Ws1, Ws2, Ws3 and Ws4. This means that the local maxima Wm2, Wm4 in the core sections 141, 142 and the local maxima Wm1, Wm3, Wm5 in the side-face cladding section 151, 152, 153 are spaced maximally, and that the light may certainly be confined at around the maxima Wm1, Wm3, Wm5. As a consequence, the above-described leakage of light from the core sections 141, 142 may be suppressed in a more reliable manner.

Since the local maxima Wm1, Wm3, Wm5 are smaller than the above-described local maxima Wm2, Wm4 located at the core sections 141, 142, and are corresponded to a slight level of light transmission property due to the refractive index higher than that of the peripheral region, although the light transmission property is not so high as the core sections 141, 142. Accordingly, the side-face cladding sections 151, 152, 153 confine the propagation light leaked from the core sections 141, 142, to thereby prevent the leakage light from affecting the other core sections. In other words, residence of the local maxima Wm1, Wm3, Wm5 successfully suppresses the crosstalk.

The local minima Ws1, Ws2, Ws3, Ws4 are smaller than the average refractive index WA of the side-face cladding section 15 as described previously, wherein the difference is desired to fall within a predetermined range. More specifically, the difference between the local minima Ws1, Ws2, Ws3, Ws4 and the average refractive index WA of the side-face cladding sections 15 is preferably 3 to 80% or around of the difference between the local minima Ws1, Ws2, Ws3, Ws4 and the local maxima Wm2, Wm4 of the core sections 141, 142, more preferably 5 to 50% or around, and still more preferably 7 to 20% or around (for example, (WA−Ws1)/(Wm2−Ws1)×100 is preferably 3 to 80% or around, more preferably 5 to 50% or around, and still more preferably 7 to 20% or around. (The notation "to" hereinbelow will be used to indicate ranges including the upper and lower limit values thereof, unless otherwise specifically noted)). Accordingly, the side-face cladding sections 15 will have light transmission characteristics which are necessary and sufficient for suppressing crosstalk. By adjusting the difference between the local minima Ws1, Ws2, Ws3, Ws4 and the average refractive index WA of the side-face cladding section 15 to a value not smaller than the lower limit value, the crosstalk may be suppressed to a sufficient degree. On the other hand, by adjusting the difference to a value not larger than the upper limit value, the light transmission characteristics of the core sections 141, 142 may be prevented from degrading due to excessively large light transmission characteristics of the side-face cladding sections 15.

The difference between the local minima Ws1, Ws2, Ws3, Ws4 and the local maxima Wm1, Wm3, Wm5 is preferably 6 to 90% or around of the difference between the local minima Ws1, Ws2, Ws3, Ws4 and the local maxima Wm2, Wm4, more preferably 10 to 70% or around, and still more preferably 14 to 40% or around. By the adjustment, the refractive index of the side-face cladding sections 15 and the refractive index of the core sections 14 are maximally balanced, and thereby the optical waveguide 1 will have particularly excellent light transmission characteristics, and will be suppressed in crosstalk in a more reliable manner.

Although the larger the difference in refractive index between the local minima Ws1, Ws2, Ws3, Ws4 and the local maximum Wm2, Wm4 in the core sections 141, 142, the better, the difference is preferably 0.005 to 0.07 or around, more preferably 0.007 to 0.05 or around, and still more preferably 0.01 to 0.03 or around (for example, (Wm1−Ws1)/(Wm2−Ws1)×100 is preferably 0.005 to 0.07, more preferably 0.007 to 0.05, and still more preferably 0.01 to 0.03). By adjusting the difference of refractive index as described in the above, the light may be confined into the core sections 141, 142.

Referring now to FIG. 2(b) which plots position on the transverse cross section of the core layer 13 on the abscissa, and plots the refractive index on the ordinate, the refractive index distribution W in the core sections 141, 142 may show a concave-up, nearly V-profile (almost linear in the region excluding the local maxima) at around the local maxima Wm2, Wm4, so long as the refractive index changes continuously, wherein a concave-up, nearly U-profile (rounded at the local maxima and broadly therearound) is more preferable. The refractive index distribution W having such profile will make the effect of confinement of light into the core sections 141, 142 more notable.

On the other hand, as illustrated in FIG. 2(b), the refractive index distribution W may show a concave-down, nearly V-profile (almost linear in the region excluding the local maxima) at around the local minima Ws1, Ws2, Ws3 and Ws4, so long as the refractive index changes continuously, wherein a concave-down, nearly U-profile (rounded at the local maxima and broadly therearound) is more preferable.

The present inventors found out that, when light was input to one end of a selected one of the plurality of core sections 141, 142 of the optical waveguide 1, and an intensity distribution of the output light at the other end was acquired, the intensity distribution may be a very useful distribution for suppressing the crosstalk of the optical waveguide 1.

FIG. 3 is a drawing illustrating an intensity distribution of output light observed when light was incident on the core section 141 of the optical waveguide 1.

When the light is incident on the core section 141, the output light shows the largest intensity at the center of the output end of the core section 141. The intensity of output light decreases from the center of the core section 141 towards the periphery, wherein the optical waveguide of the present invention gives an intensity distribution such that the local minimum appears in the core section 142 in adjacent to the core section 141. By positioning the local minimum of the intensity distribution of output light to the core section 142, the crosstalk at the core section 142 may be suppressed to a very low level, and thereby the thus-obtained optical waveguide 1 will be capable of certainly suppressing the crosstalk even if configured to have a multi-channel, high-density configuration.

The conventional optical waveguide has been suffering from the crosstalk, since the local maxima, rather than the local minima, appeared in the core sections in adjacent to the core sections on which the light is incident. In contrast, the above-described behaviors of the optical waveguide of the present invention are very useful in view of suppressing the crosstalk.

Although details why this sort of intensity distribution is obtainable by the optical waveguide of the present invention remain unclear, one possible reason is that the characteristic refractive index distribution W which contains the local minima Ws1, Ws2, Ws3, Ws4, and which shows continuous changes in the refractive index over the entire range thereof, shifts for example to the side-face cladding section 153 adjacent to the core section 142, which has conventionally shown the local maximum at the core section 142. In other words, the shift contributes to certainly suppress the crosstalk.

Note that, even if the intensity distribution of the output light should shift towards the side-face cladding section 15, photodetectors or the like are positionally aligned with the core section 14, so that there is little fear of interference and degradation in quality of optical communication.

In addition, the above-described intensity distribution of output light is not always observable in the optical waveguide of the present invention, although the probability is not so small, so that in some cases, the local minima may be unclear, or the local minima are misaligned with the core section 142, depending on NA (numerical aperture) of incident light, transverse cross sectional area of the core section 141, or pitch of the core sections 141, 142. Even in these cases, the crosstalk may be suppressed to a sufficient degree.

It is denoted now, in the refractive index distribution W illustrated in FIG. 2(b), that WA to be the average refractive index in the side-face cladding section 15, a [μm] to be the width of regions at around the local maxima Wm2, Wm4, over which the refractive index is continuously kept at the average refractive index WA or above, and b [μm] to be the width of regions at around the local minima Ws1, Ws2, Ws3, Ws4, over which the refractive index is continuously kept at the average refractive index WA or below. Then, b is preferably 0.01a to 1.2a or around, more preferably 0.03a to 1a or around, and still more preferably 0.1a to 0.8a or around. By the adjustment of the substantial width of the local minima Ws1, Ws2, Ws3, Ws4, the above-described operations and effects may be implemented. In further details, by adjusting b to the lower limit value or above, the substantial width of the local minimum Ws1, Ws2, Ws3, Ws4 may be suppressed from becoming too narrow, and thereby the effect of confining the light within the core sections 141, 142 may be prevented from being degraded. On the other hand, by adjusting b to the upper limit value or below, the substantial width of the local minima Ws1, Ws2, Ws3, Ws4 may be suppressed from becoming too broad enough to limit the width and pitch of the core sections 141, 142, and thereby the transmission efficiency may be prevented from degrading, or thereby the multi-channel, high-density configuration may be suppressed from being inhibited.

The average refractive index WA of the side-face cladding sections 15 may be approximated by the middle point between the local maximum Wm1 and the local minimum Ws1.

Constituents (major materials) composing the above-described core layer 13 are not specifically limited so long as they can produce such local difference in the refractive index, and specific examples of which include various resins such as acrylic resin, methacrylic resin, polycarbonate, polystyrene, epoxy resin, polyamide, polyimide, polybenzoxazole, polysilane, polysilazane, silicone-based resin, fluorine-containing resin, and cyclic olefin-based resins such as benzcyclobutene-base resin and norbornene-based resin; and glass materials such as quartz glass and borosilicate glass. The resin material may be a composite material having different compositions combined therein, and may even contain unpolymerized monomers.

Among them, norbornene-based resin is particularly preferable. The norbornene-based polymer is obtainable by any of publicly known polymerization methods, such as ring-opening metathesis polymerization (ROMP), combination of ROMP and hydrogenation reaction, radical or cation-assisted polymerization, polymerization using cationic palladium polymerization initiator, and polymerization using any other polymerization initiators (for example, polymerization initiator containing nickel or other transition metal).

(Cladding Layer)

The cladding layers 11 and 12 respectively configure the cladding sections located below and over the core layer 13.

The average thickness of the cladding layers 11, 12 is preferably 0.1 to 1.5 times or around larger than that of the average thickness of the core layer 13 (average height of the individual core sections 14), and more preferably 0.2 to 1.25 times or around. More specifically, the average thickness of the cladding layers 11, 12 is preferably 1 to 200 μm or around in general, more preferably 5 to 100 μm or around, and still more preferably 10 to 60 μm or around, although not specifically limited. Accordingly, the cladding layers are well performed as the cladding portions, while preventing the optical waveguide 1 from being unnecessarily increased in size (thickened).

Materials for composing the cladding layers 11 and 12 employable herein may be same as those for composing the core layer 13 described in the above, wherein norbornene-based polymer is particularly preferable.

Materials for composing the core layer 13 and for composing the cladding layers 11, 12 may be selected, taking the difference in refractive index between the both into account. More specifically, the materials are selected so as to make the refractive index of the core sections 14 sufficiently larger, for the purpose of ensuring total reflection of light at the boundary between the core sections 14 and the cladding layers 11, 12. Accordingly, a sufficiently large difference in the refractive index in the thickness-wise direction of the optical waveguide 1 may be obtained, and thereby the light may be prevented from leaking out of the individual core sections 14 into the cladding layers 11, 12.

From the viewpoint of suppressing attenuation of light, it is also important to ensure tight adhesion (affinity) between the material composing the core layer 13 and the material composing the cladding layers 11, 12.

Provision of the cladding layers 11, 12 is optional, and either one of them or both of them are omissible. The surface(s) of the core layer 13 in this case may be exposed to the atmosphere (air), wherein the air has a sufficiently small refractive index, and thereby the air can substitute the function of the cladding layers 11, 12.

By the way, the refractive index distribution T in the thickness-wise direction shows a different profile from that of the above-described refractive index distribution W in the width-wise direction.

Figure 4:
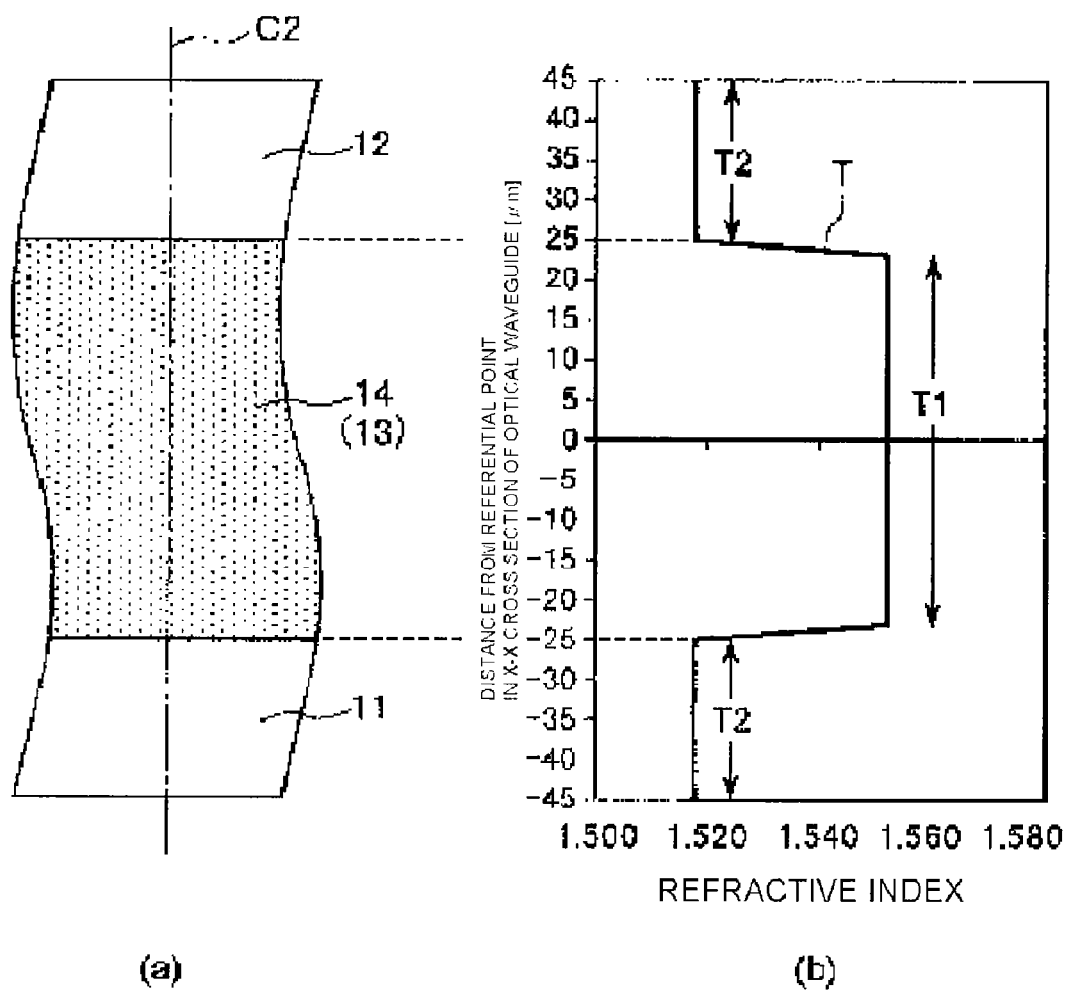
FIG. 4 shows a drawing illustrating a part of a cross sectional view taken along line X-X in FIG. 1 centered round the core section, and a drawing schematically illustrating an exemplary refractive index distribution T along the center line C2 which lies on the center of the width-wise direction of the core section.

FIG. 4(a) is a drawing illustrating a part of a cross sectional view taken along line X-X in FIG. 1 centered round the core section, and FIG. 4(b) is a drawing schematically illustrating an exemplary refractive index distribution T along the center line C2 which lies on the center of the width-wise direction of the core section. Note that FIG. 4(b) is a drawing illustrating an exemplary refractive index distribution T, with the refractive index plotted on the abscissa, and the position on the center line C2 plotted on the ordinate.

As described previously, the optical waveguide 1 is configured by stacking the cladding layer 11, the core layer 13 and the cladding layer 12 in this order. The refractive index distribution T in the thickness-wise direction, seen in the transverse cross section of the core section 14, shows that the refractive index is kept almost constant respectively in the region (portion) T1 corresponded to the core section 14, and in the region (portion) T2 corresponded to the individual cladding layers 11, 12. At the boundary between the region T1 and the region T2, the refractive index changes discontinuously. In other words, the refractive index distribution T has a step index-type profile. The thus configured optical waveguide 1 is obtainable simply by stacking the cladding layer 11, the core layer 13 and the cladding layer 12, and is advantageous in terms of readiness of manufacturing.

In the refractive index distribution T, the larger the ratio of difference in refractive index between the refractive index n1 of the core section 14 and the refractive index n2 of the cladding layers 11, 12 (relative to the refractive index n2), the better, wherein the difference is preferably 0.5% or larger, and more preferably 0.8% or larger. While the upper limit value is not necessarily set, it is preferably set to 5.5% or around. Efficiency of transmission of light may degrade if the difference in refractive index is smaller than the lower limit value, whereas the efficiency will no longer increase if the difference exceeds the upper limit value.

The ratio of difference in refractive index, between refractive index n1 and the refractive index n2, is given by the equation below.

$$\text{Ratio of difference in refractive index}(\%) = |n1/n2 - 1| \times 100$$

The difference in refractive index in the refractive index distribution T, between the core section 14 and the cladding layers 11, 12, or n1−n2, preferably has a value in a specific range, based on the preferable range of the difference in refractive index, and is preferably larger than the difference in refractive index in the refractive index distribution W, between the local minima Ws1, Ws2, Ws3, Ws4 and the first local maxima Wm2, Wm4. In this way, the total reflection at the boundary between the core section 14 and the cladding layers 11, 12 may be ensured. Accordingly, transmission loss in the thickness-wise direction of the optical waveguide 1 is suppressed, and thereby the optical waveguide 1 with high transmission efficiency may be obtained.

Note that n1-n2 will suffice if it is larger than the difference between the local minima Ws1, Ws2, Ws3, Ws4 and the first local maxima Wm2, Wm4 in the refractive index distribution W, and is preferably adjusted to 100.5% or more of the difference in refractive index, more preferably 101% or more, and still more preferably 102% or more. In this way, the transmission loss in the thickness-wise direction may be suppressed in a necessary and sufficient manner.

While the refractive index is kept almost constant respectively in the region T1 and the region T2 in the refractive index distribution T, more specifically, the ratio of deviation of the individual refractive indices from the individual average refractive indices of the individual regions T1, T2 is preferably 10% or smaller, and more preferably 5% or smaller.

(Support Film)

The optical waveguide 1 may have, on the lower surface thereof, a support film 2 as illustrated in FIG. 1, if necessary.

The support film 2 supports the lower surface of the optical waveguide 1, so as to protect and reinforce it. In this way, reliability and mechanical characteristics of the optical waveguide 1 may be improved.

Materials for composing the support film 2 are exemplified by various resins such as polyethylene terephthalate (PET), polyolefins such as polyethylene and polypropylene, polyimide, and polyamide; and metal materials such as copper, aluminum and silver. When the metal materials are used for the support film 2, metal foils are preferably used.

Although not specifically limited, the average thickness of the support film 2 is preferably 5 to 200 μm or around, and more preferably 10 to 100 μm or around. In this way, the support film 2 may be given an appropriate rigidity, so as to certainly support the optical waveguide 1, but is unlikely to inhibit flexibility of the optical waveguide 1.

The support film 2 and the optical waveguide 1 are adhered or bonded, wherein methods for adhesion or bonding are exemplified by thermocompression bonding, and bonding with the aid of adhesive or pressure sensitive adhesive.

Among them, the adhesive is exemplified by acrylic adhesive, urethane-based adhesive, silicone-based adhesive, and various hot melt adhesives (polyester-based, and modified olefin-based ones). Thermoplastic adhesives such as polyimide, polyimidamide, polyimidamide ether, polyester imide and polyimide ether are preferably used as adhesives of particularly high heat resistance. The adhesive layer composed of these materials is relatively flexible, and is highly conforming to any geometrical changes of the optical waveguide 1. Accordingly, separation possibly associating the geometrical changes may be prevented in a reliable manner.

Although not specifically limited, the average thickness of the adhesive layer is preferably 1 to 100 μm or around, and more preferably 5 to 60 μm or around.

(Cover Film)

On the other hand, the optical waveguide 1 may have, on the upper surface thereof, a cover film 3 stacked thereon as illustrated in FIG. 1, if necessary.

The cover film 3 protects the optical waveguide 1, and also supports it from the upper side. In this way, the optical waveguide 1 may be protected from being fouled or scratched, and thereby the optical waveguide 1 may be improved in reliability and mechanical characteristics.

Materials for composing the cover film 3 are similar to those composing the support film 2, and are exemplified by various resin materials such as polyethylene terephthalate (PET), polyolefins such as polyethylene and polypropylene, polyimide, and polyamide; and metal materials such as copper, aluminum, and silver. When the metal materials are used for the cover film 3, metal foils are preferably used. For the case where a mirror is formed in the middle of the optical waveguide 1, light will transmit through the cover film 3, so that it is preferable for the material for composing the cover film 3 to be substantially transparent.

Although not specifically limited, the average thickness of the cover film 3 is preferably 3 to 50 μm or around, and more preferably 5 to 30 μm or around. By adjusting the thickness of the cover film 3 to the above-described ranges, the cover film 3 will have a sufficient level of transmissivity of light in optical communication, and also a level of rigidity sufficient for protecting the optical waveguide 1 in a reliable manner.

The cover film 3 and the optical waveguide 1 are adhered or bonded, wherein methods for adhesion or bonding are exemplified by thermocompression bonding, and bonding with the aid of adhesive or pressure sensitive adhesive. The adhesive employable herein may be those described in the above.

Although the optical waveguide 1 explained in this embodiment is composed of the stack of the cladding layer 11, the core layer 13 and the cladding layer 12, the layers may alternatively be integrated.

Although the core layer 13 explained in this embodiment has two core sections 14, the number of core sections 14 may be one, or three or more, without special limitation.

For an exemplary case where there is only a single core section 14, the refractive index distribution W of the transverse cross section of the optical waveguide 1 has two local minima, wherein the local minima are smaller than the average refractive index WA as described previously, and the refractive index will suffice if it continuously changes over the entire range of the refractive index distribution W. On the other hand, for exemplary cases where the number of the core sections 14 increases up to 3, 4, 5 or more, also the number of the local minima contained in the refractive index distribution W will correspondingly increase up to 6, 8, 10 or more.

(Second Embodiment)

Next, a second embodiment of the optical waveguide of the present invention will be explained.

Figure 5:
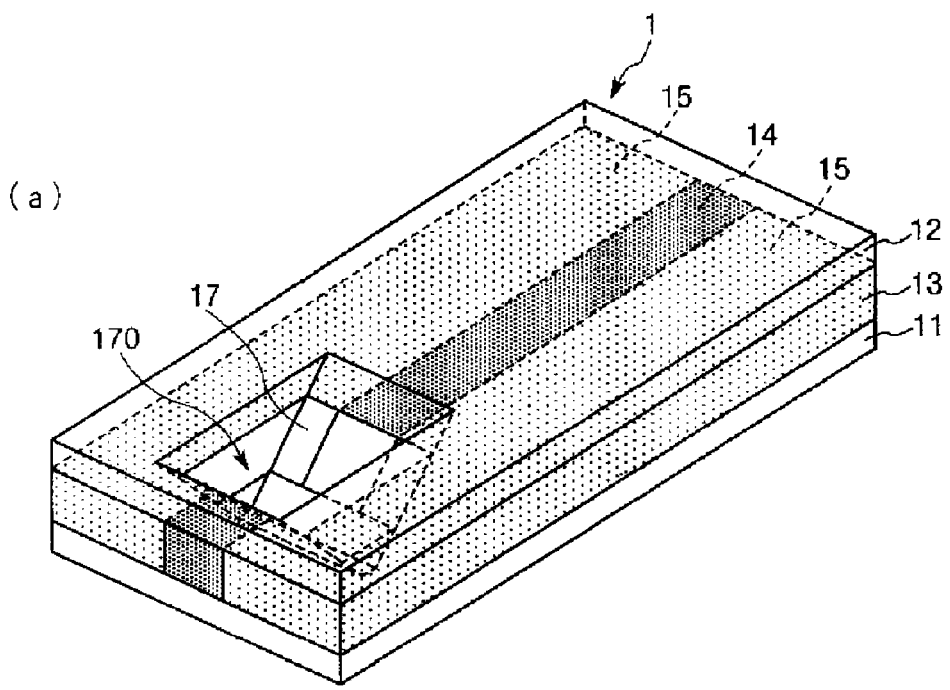
FIG. 5 is a perspective view (partial see-through view) illustrating a second embodiment of the optical waveguide of the present invention.
Figure 5:
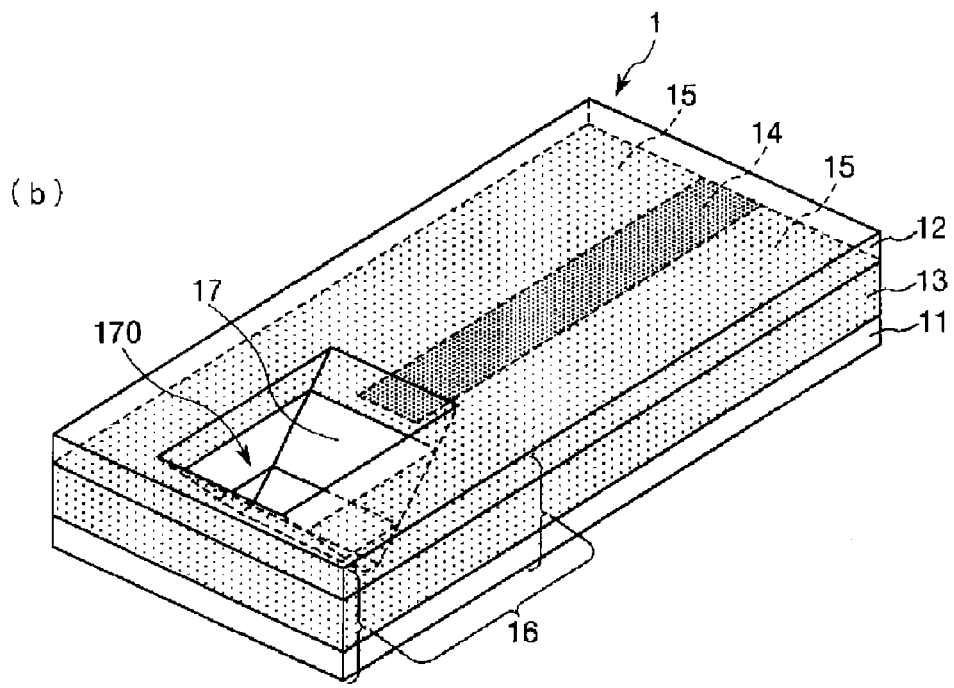
Figure 6:
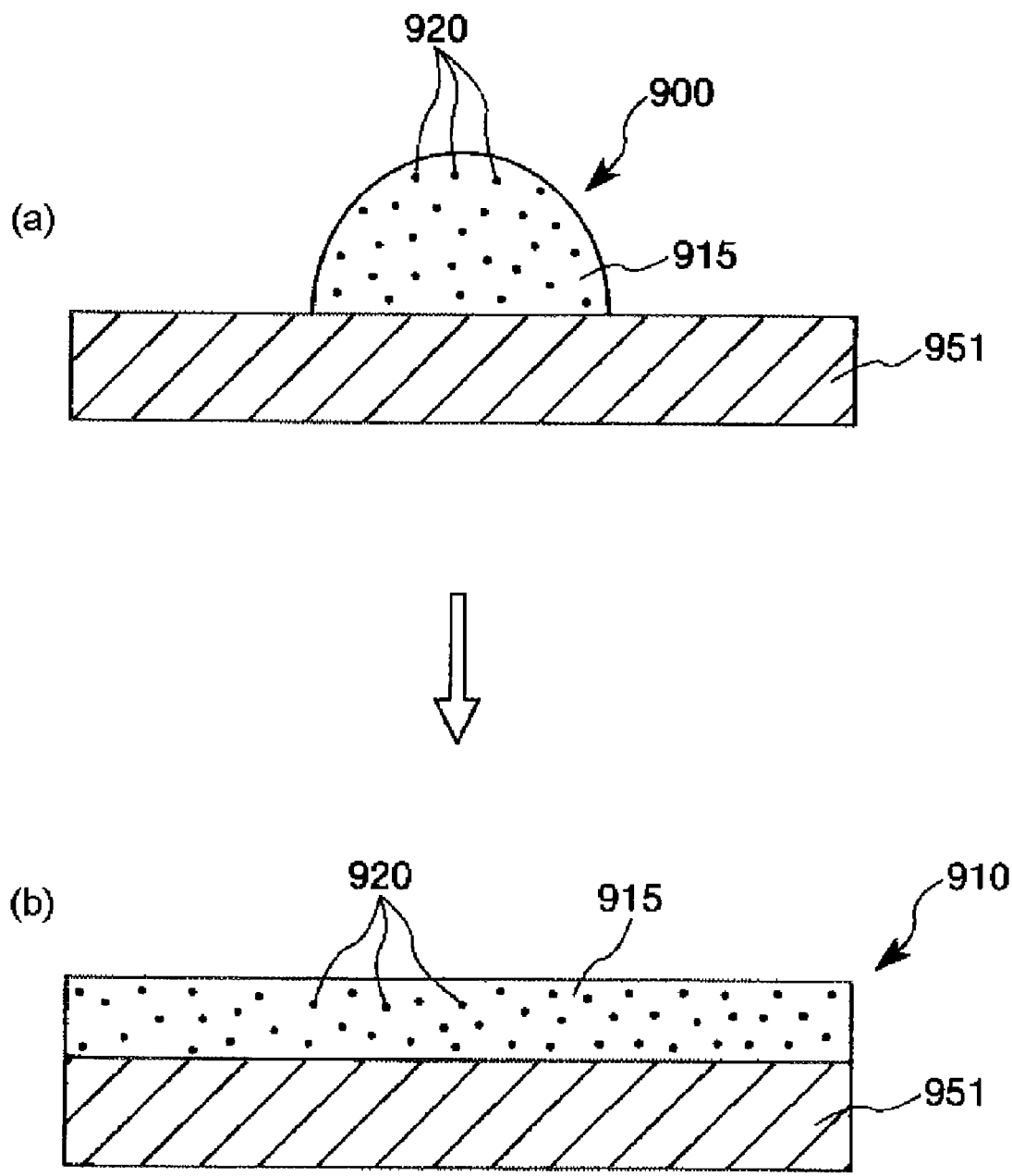
FIG. 6 is a drawing illustrating a first method of manufacturing the optical waveguide illustrated in FIG. 1.

FIG. 5 is a perspective view (partial see-through view) illustrating a second embodiment of the optical waveguide of the present invention. For easy understanding of the drawing, a part of core section 14 is not illustrated, and also the support film 2 and the cover film 3 are not illustrated.

The second embodiment of the optical waveguide will be explained below, while focusing differences from the first embodiment, without repeating the explanation for the similar aspects. In FIG. 5, all constituents similar to those in the first embodiment will be given similar reference numerals, and will not be detailed.

The second embodiment is similar to the first embodiment, except that a mirror (reflective surface) 17 for changing the direction of travel of light which propagates through the core section 14 is provided.

The mirror 17 is configured by a part of the side face (inner surface) of a recess 170 which is formed so as to partially extend through the optical waveguide 1 in the thickness-wise direction, and has a V-form transverse cross section. The side face is a flat surface, and inclines 45° away from the axial line of the core section 14. The light propagated through the core section 14 is incident on the mirror 17, and the direction of optical path is changed by 90°, pointing the bottom of FIG. 5. On the other hand, light propagated from the bottom side of FIG. 5 is reflected on the mirror 17, and is then incidnet on the core section 14. In short, the mirror 17 functions as an optical path converter which converts the optical path of light propagated through the core section 14.

On the mirror 17, there are exposed processed surfaces of the cladding layer 11, the core layer 13 and the cladding layer 12, wherein the processed surface of the core section 14 is located approximately at the center of the mirror 17.

The thus-configured mirror 17 can suppress loss of light reflected thereon. The reason why is supposed that, in this embodiment, the region T1 of the refractive index distribution T corresponded to the core section 14 (see FIG. 4) is kept at almost constant, so that the mirror 17 exhibits almost constant reflection characteristics irrespective of portions of incidence of light, and thereby the reflectivity of light may be improved.

While the mirror 17 may be provided so as to extend only through the core section 14, it is more preferably provided, as illustrated in FIG. 5(a), so as to extend through the side-face cladding section in the periphery of the individual cladding layers 11, 12 and the core sections 14. In this way, an effective area of mirror 17, contributive to the reflection, may be kept wide, and thereby mirror loss may be suppressed.

Alternatively, a reflective film may be formed over the processed surface composing the mirror 17, if necessary. The reflective film is exemplified by metal films of Au, Ag and Al, and films composed of materials having refractive index smaller than that of the core section 14.

Methods of forming the metal film are exemplified by physical vapor deposition such as vacuum evaporation, chemical vapor deposition such as CVD, and plating.

For the case where the light is input to the vertical end face, not to the mirror 17, of the optical waveguide 1, or for the case where the light output from the end face is received, the optical waveguide of the present invention is advantageous in that it has a large allowance of misalignment of a light emitting device or photodetector (both including optical fibers and so forth), with respect to the end face. This is because the refractive index distribution T in the thickness-wise direction of the optical waveguide 1 has the region T1 over which the refractive index is kept almost constant, and therefore the efficiency of incidence of light will be almost equal irrespective of position within the region T1. Accordingly, the optical waveguide 1 may readily coupled with the light emitting device or the photodetector, with a small optically coupling loss.

On the other hand, FIG. 5(b) shows another exemplary configuration of the second embodiment.

The optical waveguide 1 illustrated in FIG. 5(b) has the core section 14 which is discontinued in midway, rather than reaching the end face of the optical waveguide 1. A portion which ranges from the point of discontinuity of the core section 14 up to the end face is occupied by the side-face cladding section 15. The portion where the core section 14 is discontinued will be referred to as a core section deficient portion 16.

The mirror 17 is formed in the core section deficient portion 16. On the mirror 17, there are exposed the processed surfaces of the cladding layer 11, the core layer 13 and the cladding layer 12, wherein the processed surface of the core section 13 will have exposed thereto only the processed surface of the side-face cladding section 15. On the other hand, referring now back to FIG. 5(a) mentioned in the above, the processed surface of the core layer 13 has exposed thereto both of the processed surfaces of the core section 14 and the side-face cladding section 15.

As is clear from the above, in the mirror 17 illustrated in FIG. 5(b), the exposed surface of the core layer 13 is configured by a single material, and thereby has a uniform smoothness. This is because the process is directed to only a single material, and so that the process rate may be uniform over the surface. Accordingly, the mirror 17 will have an excellent reflection characteristic enough to ensure small mirror loss.

The core section deficient portion 16 is located apart from the core section 14, and is therefore free from local variation in concentration of any monomer-derived substances. Accordingly, the reflection characteristic will be less variable not only in the thickness-wise direction but also in width-wise direction, ensuring the mirror 17 with particularly excellent reflection characteristic.

<Method of Manufacturing Optical Waveguide>

Next, an exemplary method of manufacturing of the above-described optical waveguide 1 will be explained.

(First Method of Manufacturing)

A first method of manufacturing of the optical waveguide 1 will be explained below.

FIGS. 6 to 10 are drawings respectively explaining the first method of manufacturing of the optical waveguide 1. In the explanations below, the top side and the bottom side of FIGS. 6 to 10 will be denoted as "upper" and "lower", respectively.

The optical waveguide 1 is manufactured by preparing the cladding layer 11, the core layer 13 and the cladding layer 12, and by stacking them.

According to the first method of manufacturing the optical waveguide 1, [1] a core layer forming composition 900 is coated over a support substrate 951 to thereby form a liquid cover film, the support substrate 951 is then placed on a leveling table so as to planarize the liquid cover film, while allowing the solvent to vaporize (desolvate). A layer 910 is thus obtained. [2] Next, active radiation beam is irradiated partially on the layer 910 so as to produce difference in refractive index, to thereby obtain the core layer 13 in which the core sections 14 and the side-face cladding sections 15 are formed. [3] Next, the cladding layers 11, 12 are stacked on both sides of the core layer 13, to thereby obtain the optical waveguide 1.

The individual processes will be explained below.

[1] First, the core layer forming composition 900 is prepared.

The core layer forming composition 900 contains a polymer 915 and an additive 920 (containing at least a monomer in this embodiment). The core layer forming composition 900 is a material such as causing at least a reaction of monomer in the polymer 915, so as to induce changes in the refractive index distribution. In other words, the core layer forming composition 900 is a material capable of inducing changes in the refractive index distribution, based on the abundance ratio of polymer 915 and monomer, and of consequently forming the core sections 14 and the side-face cladding sections 15 in the core layer 13.

Next, the core layer forming composition 900 is coated over the support substrate 951 to thereby form a liquid cover film (see FIG. 6(a)). The support substrate 951 is then placed on a leveling table so as to planarize the liquid cover film, while allowing the solvent to vaporize (desolvate). The layer 910 is thus obtained (see FIG. 6(b)).

The support substrate 951 used herein is, for example, a silicon substrate, silicon dioxide substrate, glass substrate, or polyethylene terephthalate (PET) film.

A method of coating for forming the liquid cover film is exemplified by doctor blade coating, spin coating, dipping, table coating, spray coating, applicator coating, curtain coating and die coating.

In the thus-obtained layer 910, there is the polymer (matrix) 915 in a substantially uniform matter, with the additive 920 dispersed in the polymer 915 substantially in a uniform and random manner. Accordingly, the additive 920 is dispersed substantially in a uniform and random manner in the layer 910.

The average thickness of the layer 910 may appropriately be set depending on the thickness of the core layer 13 to be formed, without special limitation, preferably 5 to 300 μm or around, and more preferably 10 to 200 μm or around.

(Polymer)

The polymer 915 serves as a base polymer of the core layer 13.

The polymer 915 preferably used herein is such as being sufficiently transparent (colorless and clear), compatible with monomers described later, having the monomers remained still reactive (possibly submitted to polymerization reaction or crosslinking reaction), and being sufficiently transparent even after the monomers are polymerized.

"Compatible" herein means that the monomers are mixed into at least the core layer forming composition 900 or in a layer 910 without causing phase separation with the polymer 915.

This sort of polymer 915 is exemplified by cyclic olefin-based resin such as norbornene-based resin and benzocyclobutene-based resin, acrylic resin, methacrylic resin, polycarbonate, polystyrene, epoxy-based resin, polyamide, polyimide, polybenzoxazole, all of which may be used alone, or two or more species may be combined (polymer alloy, polymer blend (mixture), copolymer, etc.).

Of these, the polymer mainly composed of cyclic olefin-based resin is particularly preferable. Use of the cyclic olefin-based resin for the polymer 915 successfully yields the core layer 13 having excellent light transmission performance and heat resistance.

The cyclic olefin-based resin may be unsubstituted, or may have hydrogen atom substituted by any other group.

The cyclic olefin-based resin is exemplified by norbornene-based resin and benzocyclobutene-based resin.

Among others, the norbornene-based resin is preferably used from the viewpoints of heat resistance and transparency. The norbornene-based resin also has an excellent hydrophobicity, and this makes the resultant core layer 13 less likely to cause dimensional changes due to absorption of water.

The norbornene-based resin may be either a resin composed of a single species of repeating unit (homopolymer), or may be a resin composed of two or more species of norbornene-based repeating unit (copolymer).

This sort of norbornene-based resin is exemplified by:

(1) addition (co)polymer obtained by allowing norbornene-type monomer(s) to (co)polymerize;

(2) addition copolymer composed of norbornene-type monomer and ethylene or α-olefin;

(3) addition polymer such as addition copolymer composed of norbornene-type monomer and non-conjugative diene, and other optional monomer;

(4) ring-opening (co)polymer of norbornene-type monomer(s), and a resin obtained by optionally hydrogenating the (co)polymer;

(5) ring-opening (co)polymer composed of norbornene-type monomer and ethylene or α-olefin, and a resin obtained by optionally hydrogenating the (co)polymer; and (6) ring-opening polymers such as ring-opening copolymer composed of norbornene-type monomer and non-conjugative diene, or any other monomer, and a polymer obtained by optionally hydrogenating the (co)polymer. These polymers are exemplified by random copolymer, block copolymer, and alternating copolymer.

These norbornene-based resins may be obtained any of publicly-known methods of polymerization which include ring-opening metathesis polymerization (ROMP), combination of ROMP and hydrogenation, radical or cation polymerization, polymerization with the aid of cationic palladium-containing polymerization initiator, and polymerization with the aid of other polymerization initiator (for example, nickel- or other transition metal-containing polymerization initiator).

Of these, the norbornene-based resin is preferably an addition (co)polymer having at least one repeating unit represented by structural formula B below. This is because the addition (co)polymer is excellent in transparency, heat resistance, and flexibility, so that even for the case where formation of the optical waveguide 1 is followed by mounting of electric components and so forth by soldering, the optical waveguide 1 may stay highly resistant to heat, or resistant to reflow.

[Chemical Formula 1]

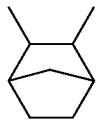

B

The norbornene-based polymer is preferably synthesized, typically by using a later-described, norbornene-based monomer (norbornene-based monomer represented by structural formula C, and a crosslinkable norbornene-based monomer, described later).

Various product having the optical waveguide 1 incorporated therein may be used in an environment at around 80° C., for example. Also in this case, the addition (co)polymer is preferable from the viewpoint of ensuring heat resistance.

In particular, the norbornene-based resin preferably contains norbornene-based repeating units each having a polymerizable group-containing substituent, or norbornene-based repeating units each having an aryl group-containing substituent.

The norbornene-based repeating unit having the polymerizable group-containing substituent is preferably at least one of a norbornene-based repeating unit having an epoxy group-containing substituent, norbornene-based repeating unit having a (meth)acryl group-containing substituent, and a norbornene-based repeating unit having an alkoxysilyl group-containing substituent. These polymerizable groups are preferable among various polymerizable groups, by virtue of their high reactivity.

If the norbornene-based resin used herein contains two or more species of the norbornene-based repeating unit having such polymerizable groups, good levels of both of flexibility and heat resistance may be achieved.

On the other hand, if the norbornene-based resin used herein contains the norbornene-based repeating unit having an aryl group-containing substituent, dimensional changes due to absorption of water may be prevented in a more reliable manner, by virtue of a very large hydrophobicity ascribable to the aryl group.

The norbornene-based resin preferably contains alkylnorbornene-based repeating units. The alkyl group herein may have a straight chain structure or a branched structure.

The norbornene-based resin adds the flexibility thereof by containing the alkylnorbornene-based repeating units, and is thereby given a high level of flexibility.

The norbornene-based resin containing the alkylnorbornene-based repeating units is preferable also because it is excellent in transmissivity of light in a specific wavelength region (in particular, at around 850 nm).

Specific examples of the norbornene-based resin containing the norbornene-based repeating unit described in the above include homopolymer of hexylnorbornene, homopolymer of phenylethylnorbornene, homopolymer of benzylnorbornene, copolymer of hexylnorbornene and phenylethylnorbornene, and copolymer of hexylnorbornene and benzylnorbornene.

Considering the above, preferable examples of the norbornene-based resin are those represented by the formulae (1) to (4), and (8) to (10) below.

[Chemical Formula 2]

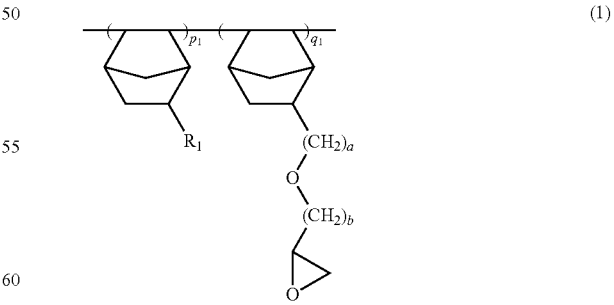

(1)

(in the formula (1), $R_1$ represents a $C_{1\text{-}10}$ alkyl group, a represents an integer of 0 to 3, b represents an integer of 1 to 3, and $p_1/q_1$ is 20 or smaller.)

The norbornene-based resin represented by the formula (1) may be prepared as follows.

A norbornene having $R_1$, and a norbornene having an epoxy group in the side chain thereof are dissolved into toluene, and are allowed to polymerize in the solution using a Ni compound (A) as a catalyst, to thereby obtain (1).

(A)

Note that the norbornene having an epoxy group in the side chain thereof may be prepared typically by the procedures (i), (ii) below.

(i) Synthesis of Norbornene Methanol (NB—$CH_2$—OH)

CPD (cyclopentadiene) produced by cracking of DCPD (dicyclopentadiene) is allowed to react with α-olefin ($CH_2$=CH—$CH_2$—OH) under high temperature and high pressure.

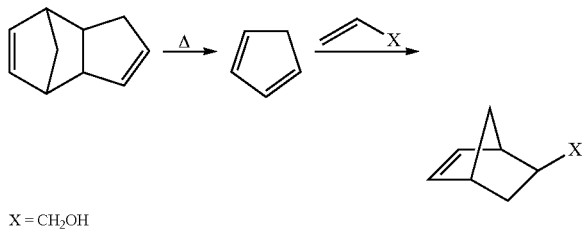

X = $CH_2OH$ (ii) Synthesis of Epoxynorbornene

Produced by allowing norbornene methanol to react with epichlorohydrin.

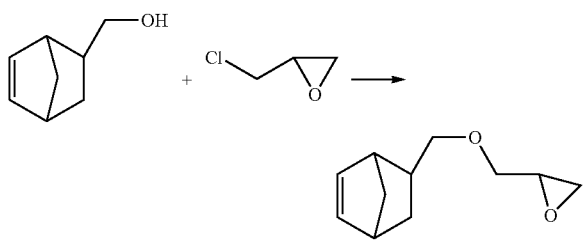

In the formula (1), when b is 2 or 3, a compound having an ethylene group or propylene group, in place of the methylene group in epichlorohydrin, is used.

Of the norbornene-based resins represented by the formula (1), it is particularly preferable to use compounds in which $R_1$ represents a $C_{4-10}$ alkyl group, and both of a and b are 1, from the viewpoint of achieving both of flexibility and heat resistance. Preferable examples include copolymer of butylbornene and methyl glycidyl ether norbornene, copolymer of hexylnorbornene and methyl glycidyl ether norbornene, and copolymer of decylnorbornene and methyl glycidyl ether norbornene.

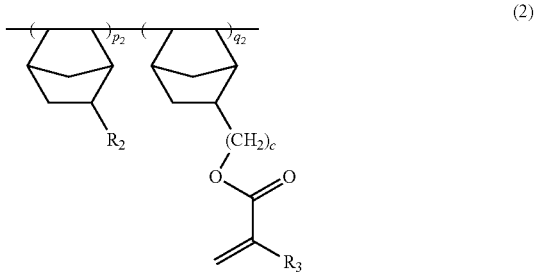

(2)

(In the formula (2), $R_2$ represents a $C_{1-10}$ alkyl group, $R_3$ represents a hydrogen atom or methyl group, c represents an integer of 0 to 3, and $p_2/q_2$ is 20 or smaller.)

The norbornene-based resin represented by the formula (2) may be prepared by dissolving a norbornene having $R_2$ and a norbornene having an acryl group and methacryl group in the side chain thereof into toluene, and by allowing them to polymerize in the solution using the above-described Ni compound (A) as a catalyst.

Of the norbornene-based resins represented by the formula (2), those having a $C_{4-10}$ alkyl group for $R_2$, and characterized by c=1 are particularly preferable from the viewpoint of flexibility and heat resistance. Specific examples include copolymer of butylbornene and 2-(5-norbornenyl)methyl acrylate, copolymer of hexylnorbornene and 2-(5-norbornenyl)methyl acrylate, copolymer of decylnorbornene and 2-(5-norbornenyl)methyl acryalte.

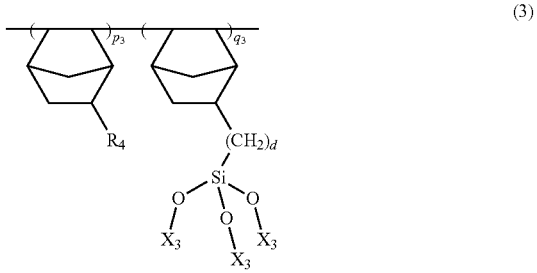

(3)

(In the formula (3), $R_4$ represents a $C_{1-10}$ alkyl group, each $X_3$ independently represents a $C_{1-3}$ alkyl group, d represents an integer of 0 to 3, and $p_3/q_3$ is 20 or smaller.)

The resin represented by the formula (3) may be prepared by dissolving a norbornene having $R_4$, and a norbornene having an alkoxysilyl group in the side chain thereof into toluene, and by allowing them to polymerize in the solution using the above-described Ni compound (A) as a catalyst.

Of the norbornene-based polymers represented by the formula (3), those having a $C_{4-10}$ alkyl group for $R_4$, characterized by d=1 or 2, and having a methyl group or ethyl group for $X_3$, are particularly preferable. Specific examples include copolymer of butylbornene and norbornenyl ethyl trimethoxysilane, copolymer of hexylnorbornene and norbornenyl ethyl trimethoxysilane, copolymer of decylnorbornene and norbornenyl ethyl trimethoxysilane, copolymer of butylbornene and triethoxysilyl norbornene, copolymer of hexylnorbornene and triethoxysilyl norbornene, copolymer of decylnorbornene and triethoxysilyl norbornene, copolymer of butylbornene and trimethoxysilyl norbornene, copolymer of hexylnorbornene and trimethoxysilyl norbornene, and copolymer of decylnorbornene and trimethoxysilyl norbornene.

[Chemical Formula 8]

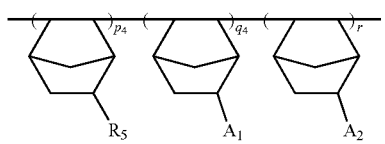

(4)

(In the formula (4), $R_5$ represents a $C_{1-10}$ alkyl group, and $A_1$ and $A_2$ independently represents a substituent represented by any of the formulae (5) to (7) below, excluding the case where the both are the same. $p_4/q_4+r$ is 20 or smaller.)

The resin represented by the formula (4) may be prepared by dissolving a norbornene having $R_5$, and norbornenes respectively having $A_1$ and $A_2$ in the side chains thereof into toluene, and by allowing them to polymerize in the solution using the Ni compound (A) as a catalyst.

[Chemical Formula 9]

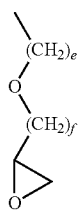

(5)

(In the formula (5), e represents an integer of 0 to 3, and f represents an integer of 1 to 3.)

[Chemical Formula 10]

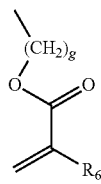

(6)

(In the formula (6), $R_6$ represents a hydrogen atom or methyl group, and g represents an integer of 0 to 3.)

[Chemical Formula 11]

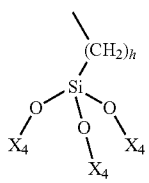

(7)

(In the formula (7), each $X_4$ independently represents a $C_{1-3}$ alkyl group, and h represents an integer of 0 to 3.)

The norbornene-based resin represented by the formula (4) is exemplified by terpolymer composed of any one of butylnorbornene, hexylnorbornene and decylnorbornene, combined with 2-(5-norbornenyl)methyl acrylate, and with any one of norbornenyl ethyl trimethoxysilane, triethoxysilyl norbornene and trimethoxysilyl norbornene; terpolymer composed of any one of butylbornene, hexylnorbornene and decylnorbornene, combined with 2-(5-norbornenyl)methyl acrylate, and with methyl glycidyl ether norbornene; and terpolymer composed of any one of butylbornene, hexylnorbornene and decylnorbornene, combined with any one of methyl glycidyl ether norbornene, norbornenylethyl trimethoxysilane, triethoxysilyl norbornene and trimethoxysilyl norbornene.

[Chemical Formula 12]

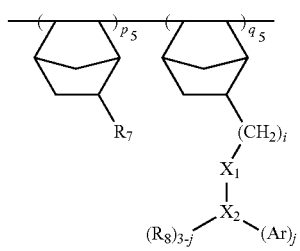

(8)

(In the formula (8), $R_7$ represents a $C_{1-10}$ alkyl group, $R_8$ represents a hydrogen atom, methyl group or ethyl group, Ar represents an aryl group, $X_1$ represents an oxygen atom or methylene group, $X_2$ represents a carbon atom or silicon atom, i represents an integer of 0 to 3, j represents an integer of 1 to 3, and $p_5/q_5$ is 20 or smaller.)

The resin represented by the formula (8) may be prepared by dissolving a norbornene having $R_7$, and a norbornene having $—(CH_2)—X_1—X_2$ $(R_8)_{3-j}$ $(Ar)_j$ in the side chain thereof into toluene, and by allowing them to polymerize in the solution using the Ni compound as a catalyst.

Of the norbornene-based resin represented by the formula (8), those having an oxygen atom for $X_1$, silicon atom for $X_2$, and a phenyl group for Ar are preferable.

From the viewpoint of controlling flexibility, heat resistance and refractive index, compounds having a $C_{4-10}$ alkyl group for $R_7$, an oxygen atom for $X_1$, a silicon atom for $X_2$, a phenyl group for Ar, a methyl group for $R_8$, and characterized by i=1 and j=2 are particularly preferable. Specific examples include copolymer of butylbornene and diphenylmethyl norbornene methoxysilane, copolymer of hexylnorbornene and diphenylmethyl norbornene methoxysilane, and copolymer of decylnorbornene and diphenylmethyl norbornene methoxysilane.

More specifically, the norbornene-based resin shown below is preferably used.

[Chemical Formula 13]

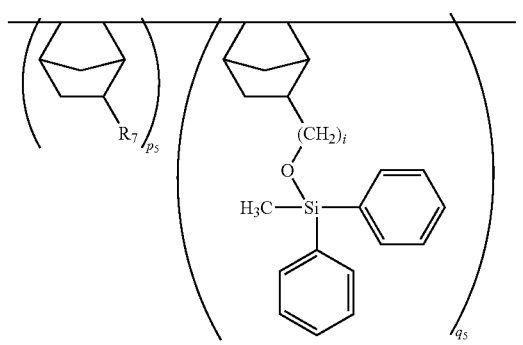

(9)

(In the formula (9), $R_7$, $p_5$, $q_5$ and i are same as those for the formula (8).)

From the viewpoint of controlling flexibility, heat resistance and refractive index, compounds represented by the formula (8) and having $C_{4-10}$ alkyl group for $R_7$, a methylene group for $X_1$, a carbon atom for $X_2$, a phenyl group for Ar, a hydrogen atom for $R_8$, and characterized by i=0 and j=1 are particularly preferable. Specific examples include copolymer of butylbornene and phenylethylnorbornene, copolymer of hexylnorbornene and phenylethylnorbornene, and copolymer of decylnorbornene and phenylethylnorbornene.

Alternatively, also the compound shown below may be used as the norbornene-based resin.

[Chemical Formula 14]

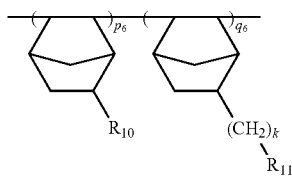

(10)

(In the formula (10), $R_{10}$ represents a $C_{1-10}$ alkyl group, $R_{11}$ represents an aryl group, k is 0 or larger and 4 or smaller. $p_6/q_6$ is 20 or smaller.)

Although it suffices that each of $p_1/q_1$ to $p_3/q_3$, $P_5/q_5$, $P_6/q_6$ and $p_4/q_4+r$ is 20 or smaller, it is preferably 15 or smaller, and more preferably 0.1 to 10 or around. By the adjustment, involvement of a plurality of species of norbornene-based repeating unit will create a maximum effect.

On the other hand, the polymer 915 may be an acrylic resin, methacrylic resin, epoxy-based resin, polyimide, silicone-based resin, or fluorine-containing resin, as described previously.

Of these, the acrylic resin and methacrylic resin are exemplified by poly(methyl acrylate), poly(methyl methacrylate), poly(epoxy acrylate), poly(epoxy ethacrylate), poly(aminoacrylate), poly(aminomethacrylate), polyacrylic acid, polymethacrylic acid, poly(isocyanate acrylate), poly(isocyanate methacrylate), poly(cyanate acrylate), poly(cyanate methacrylate), poly(thioepoxy acrylate), poly(thioepoxy methacrylate), poly(allyl acrylate), poly(allyl methacrylate), acrylate/epoxy acrylate copolymer (copolymer of methyl methacrylate and glycidyl methacrylate), and styrene/epoxy acrylate copolymer. They are used independently, or in a form of composite composed of two or more species.

The epoxy-based resin used herein is exemplified by alicyclic epoxy resin, bisphenol A type epoxy resin, bisphenol F type epoxy resin, bisphenol S type epoxy resin, biphenyl type epoxy resin having a biphenyl skeleton, naphthalene ring-containing epoxy resin, dicyclopentadiene type epoxy resin having a dicyclopentadiene skeleton, phenol novolac type epoxy resin, cresol novolac type epoxy resin, triphenylmethane type epoxy resin, triphenylmethane type epoxy resin, aliphatic epoxy resin and triglycidyl isocyanurate. They are used independently, or in a form of composite composed of two or more species.

The polyimide is not specifically limited, so long as it may be obtained by opening the ring of polyamic acid, which is a precursor of polyimide resin, and then by curing (imidizing) the product.

The polyamic acid may be obtained in a liquid form, typically by allowing a tetracarboxylic acid dianhydride and an equimolar amount of diamine to react in N,N-dimethylacetamide.

Of these, the tetracarboxylic acid dianhydride is exemplified by pyromellitic acid dianhydride, 3,3',4,4'-biphenyltetracarboxylic dianhydride, 2,2-bis(2,3-dicarboxyphenyl)-1,1,1,3,3,3-hexafluoropropane dianhydride, 2,2-bis(3,4-dicarboxyphenyl)-1,1,1,3,3,3-hexafluoropropane dianhydride, 3,3',4,4'-benzophenone tetracarboxylic dianhydride, bis(3,4-dicarboxyphenyl)ether dianhydride, and bis(3,4-dicarboxyphenyl)sulfonic dianhydride.

On the other hand, the diamine is exemplified by m-phenylenediamine, p-phenylenediamine, 3,4'-diaminodiphenyl ether, 4,4'-diaminodiphenyl ether, 4,4'-diaminodiphenylsulfone, 3,3'-diaminodiphenylsulfone, 2,2-bis(4-aminophenoxyphenyl)propane, 2,2-bis(4-aminophenoxyphenyl)hexafluoropropane, 1,3-bis(4-aminophenoxy)benzene, 1,4-bis(4-aminophenoxy)benzene, 2,4-diaminotoluene, 2,6-diaminotoluene, diaminodiphenylmethane, 4,4'-diamino-2,2-dimethylbiphenyl, and 2,2-bis(trifluoromethyl)-4,4'-diaminobiphenyl.

The silicone-based resin is exemplified by silicone rubber and silicone elastomer. These silicone-based resins are obtained by allowing a silicone rubber monomer or oligomer to react with a curing agent.

The silicone rubber monomer or oligomer is exemplified by those containing methyl siloxane group, ethylsiloxane group, or phenylsiloxane group.

The silicone rubber monomer or oligomer preferably used herein include those having functional groups such as epoxy group, and vinyl group introduced therein, for the purpose of imparting photo-reactivity.

The fluorine-containing resin is exemplified by polymer obtained from monomers having a fluorine-containing alicyclic structure, polymer obtained by ring-forming polymerization of fluorine-containing monomers each having two or more unsaturated bonds, and polymer obtained by co-polymerizing fluorine-containing monomer and radically-polmerizable monomer.

The fluorine-containing alicyclic structure is exemplified by perfluoro(2,2-dimethyl-1,3-dioxole), perfluoro(4-methyl-1,3-dioxole), and perfluoro(4-methoxy-1,3-dioxole).

The fluorine-containing monomer is exemplified by perfluoro(allyl vinyl ether), and perfluoro(butenyl vinyl ether).

The radically-polymerizable monomer is exemplified by tetrafluoroethylene, chlorotrifluoroethylene, and perfluoro (methyl vinyl ether).

Since the refractive indices of the individual portions of the core layer 13 are determined depending on magnitude relation of refractive index and abundance ratio of the polymer 915 and the monomer, so that the refractive index of the polymer 915 may appropriately be adjusted, depending on species of the monomer to be used.

For example, for the purpose of obtaining the polymer 915 with a relatively large refractive index, it is general to select a monomer having in the molecular structure thereof an aromatic ring (aromatic group), nitrogen atom, bromine atom or chlorine atom, and to synthesize (polymerize) the polymer 915. On the other hand, for the purpose of obtaining the polymer 915 with a relatively small refractive index, it is general to select a monomer having in the molecular structure thereof an alkyl group, fluorine atom or ether structure (ether group) and to synthesize (polymerize) the polymer 915.

The norbornene-based resin having a relatively large refractive index preferably contains an aralkylnorbornene-based repeating unit. This sort of norbornene-based resin has a particularly large refractive index.

Examples of the aralkyl group (aryl alkyl group) possibly contained in the aralkylnorbornene-based repeating unit include benzyl group, phenylethyl group, phenylpropyl group, phenylbutyl group, naphthylethyl group, naphthylpropyl group, fluorenylethyl group, and fluorenylpropyl group, wherein benzyl group and phenylethyl group are particularly preferable. The norbornene-based resin having such repeating unit is preferable by virtue of its extremely large refractive index.

The above-described polymer 915 preferably contains a leaving group (eliminatable pendant group) branched from the principal chain, and at least a part of the molecular structure thereof is eliminatable from the principal chain upon being irradiated by active radiation beam. By elimination of the leaving group, the polymer 915 will be decreased in the refractive index, so that the polymer 915 will produce the difference in refractive index depending on whether the active radiation beam has been irradiated or not.

The polymer 915 having such leaving group is exemplified by those having in the molecular structure thereof at least one of —O— structure, —Si-aryl structure and —O—Si— structure. These leaving groups may be eliminated by the action of cation in a relatively easy manner.

Of these, the leaving group capable of lowering the refractive index of the resin as a result of elimination preferably has at least either one of —Si-diphenyl structure and —O—Si-diphenyl structure.

The polymer 915 having a leaving group in the side chain thereof is exemplified by cyclic olefin-based resins which include polymers of monocyclic monomers such as cyclohexene and cyclooctene; and polymers of polycyclic monomers such as norbornene, norbornanediene, dicyclopentadiene, dihydrodicyclopentadiene, tetracyclododecene, tricyclopentadiene, dihydrotricyclopentadiene, tetracyclopentadiene, and dihydrotetracyclopentadiene. Of these, one or more species of cyclic olefin-based resin selected from the polymers of the polycyclic monomers are preferably used. In this way, the heat resistance of the resin may be improved.

Modes of polymerization employable herein may be any of publicly known modes including random polymerization and block polymerization. Specific examples of the polymer of norbornene-type monomer include (co)polymer of norbornene-type monomer, copolymer of norbornene-type monomer and other copolymerizable monomer such as α-olefins, and hydrogen-added product of these copolymers. These cyclic olefin-based resin may be manufactured by publicly known methods of polymerization. The methods of polymerization include addition polymerization and ring-opening polymerization. Of the above-described resins, the cyclic olefin-based resin obtained by the addition polymerization (in particular, norbornene-based resin) is preferable (that is, the addition polymer of norbornene-based compound is preferable). In this way, the resin is improved in transparency, heat resistance and flexibility.

The norbornene-based resin having the leaving group in the side chain thereof is exemplified by the norbornene-based resin represented by the formula (8), wherein $X_1$ represents an oxygen atom, $X_2$ represents a silicon atom, and Ar represents a phenyl group.

In the formula (3), elimination may occur in some cases in the portion of Si—O—$X_3$ in the alkoxysilyl group.

When the norbornene-based resin represented by the formula (9) is used, the reaction is supposed to proceed with the aid of an acid generated from a photoacid generator (referred to as PAG), according to the following scheme. Note that the scheme shows only a portion around the leaving group, with i=1.

[Chemical Formula 15]

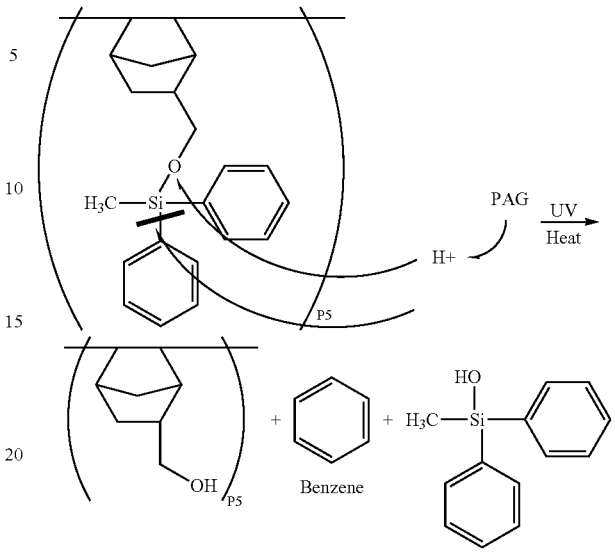

In addition to the structure represented by the formula (9), the norbornene-based resin may further have an epoxy group in the side chain thereof. By using this sort of resin, the core layer 13 will show tight adhesion to the cladding layers 11, 12 or to the base.

Specific example is shown below.

[Chemical Formula 16]

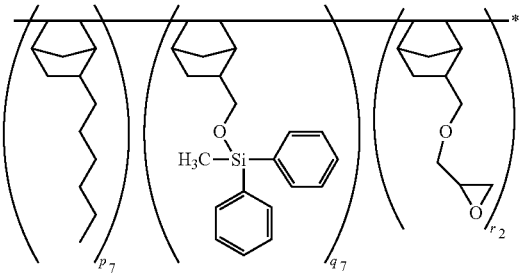

(31)

(In the formula (31), $p_7/q_7+r_2$ is 20 or smaller.)

The compound represented by the formula (31) may be obtained typically by dissolving hexylnorbornene, diphenylmethyl norbornene methoxysilane (norbornene containing —$CH_2$—O—Si($CH_3$) (Ph)$_2$ in the side chain thereof) and epoxynorbornene into toluene, and by allowing them to polymerize in the solution using a Ni compound as a catalyst.

On the other hand, other leaving group is exemplified by a substituent having at the terminal thereof an acetophenone structure. This leaving group may readily be eliminated, by the action of free radical.

Although not specifically limited, the content of the leaving group is preferably 10 to 80% by weight of the polymer 915 having in the side chain thereof the eliminatable group, and more preferably 20 to 60% by weight. By adjusting the content within the above-described ranges, both of the flexibility and the function of modulating refractive index (effect of altering the difference in refractive index) are successfully attained.

For example, by increasing the content of the leaving group, an adjustable range of the refractive index may be expanded.

(Additive)

The additive 920 contains a monomer and a polymerization initiator.

((Monomer))

The monomer herein is a compound capable of forming a reaction product, upon being irradiated by the active radiation beam described later, by causing a reaction in a region irradiated with the active radiation beam to produce a reaction product, and also causing migration by diffusion of the monomer, to thereby produce difference in refractive index between the irradiated region and the non-irradiated region in the layer 910.

Reaction products of the monomer are exemplified by at least one of polymer formed by polymerizing the monomers within the polymer 915, crosslinked structure produced by crosslinking of the polymers 915 by the monomer, and branched structure produced by polymerization of monomer onto the polymer 915 so as to branch out therefrom.

Now the difference in the refractive index between the irradiated region and the non-irradiated region is ascribable to the difference in refractive index between the polymer 915 and the monomer, so that the monomer contained in the additive 920 is selected taking the magnitude relation of refractive index between the monomer and the polymer 915 into account.

More specifically, in the layer 910, for the case where the refractive index is desired to be high in the irradiated region, the polymer 915 having a relatively small refractive index and a monomer having a refractive index larger than that of the polymer 915 are combined for use. On the other hand, for the case where the refractive index is desired to be low in the irradiated region, the polymer 915 having a relatively large refractive index and 915 a monomer having a refractive index smaller than that of the polymer 915 are combined for use.

Note that, the adjectives "large" and "small" with respect to the refractive indices are used to depict relative relation between certain materials, rather than any absolute values.

For the case where the refractive index decreases in the irradiated region of the layer 910 as a result of the reaction of monomer (generation of the reaction product), the region forms the local minimum in the refractive index distribution W, whereas for the case where the refractive index increases in the irradiated region, the region forms the local maximum of the refractive index distribution.

The monomer preferably used herein is such as being compatible with the polymer 915, and showing a difference of refractive index of 0.01 or larger from that of the polymer 915.

This sort of monomer will suffice if it is a compound having a polymerizable portion, and is exemplified by norbornene-based monomer, acrylic (methacrylic) monomer, epoxy-based monomer, oxetane-based monomer, vinyl ether-based monomer, and styrene-based monomer, but not specifically limited. They may be used independently, or two or more species may be used in combination.

Of these, monomer or oligomer having a cyclic ether group such as oxetanyl group or epoxy group, and norbornene-based monomer are preferably used. By using the monomer or oligomer having cyclic ether group(s), a monomer capable of rapid reaction may be obtained, since the cyclic ether group is likely to cause ring opening. On the other hand, by using the norbornene-based monomer, the core layer 13 (optical waveguide 1) excellent in light transmission characteristics and also in heat resistance and flexibility may be obtained.

Of these, each of the monomer and the oligomer having the cyclic ether group(s) preferably has a molecular weight (weight average molecular weight) of 100 or larger and 400 or smaller.

The monomer having oxetanyl group(s), and the oligomer having oxetanyl group(s) are preferably selected from the group consisting of those represented by the formulae (11) to (20) below. By using these compounds, the resultant layer will be excellent in transparency at around a wavelength of 850 nm, and also good levels of both of flexibility and heat resistance may be achieved. These compounds may be used independently, or in a mixed form.

[Chemical Formula 17]

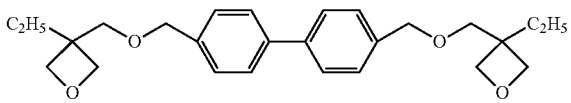

(11)

[Chemical Formula 18]

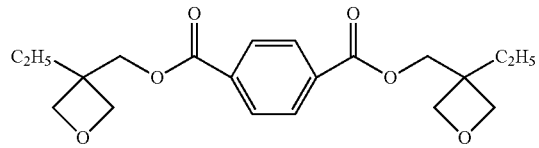

(12)

[Chemical Formula 19]

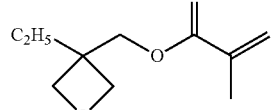

(13)

[Chemical Formula 20]

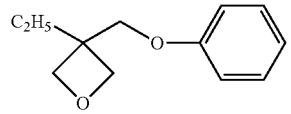

(14)

[Chemical Formula 21]

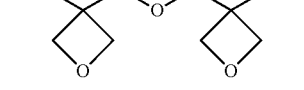

(15)

[Chemical Formula 22]

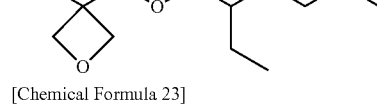

(16)

[Chemical Formula 23]

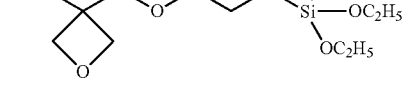

(17)

-continued

[Chemical Formula 24]

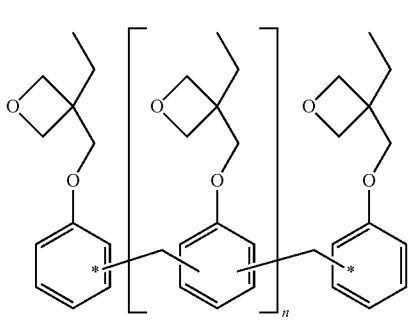

(18)

(In the formula (18), n is 0 or larger, and 3 or smaller.)

[Chemical Formula 25]

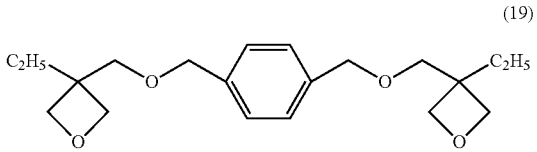

(19)

[Chemical Formula 26]

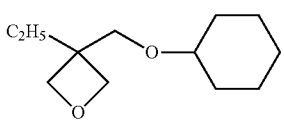

(20)

Of the above-listed monomers and oligomers, the compounds represented by the formulae (13), (15), (16), (17), (20) are preferably used, from the viewpoint of ensuring a sufficient difference in refractive index from that of the polymer 915.

It is particularly preferable to use the compounds represented by the formulae (20) and (15), considering that they have the refractive index sufficiently different from that of the polymer 915, that they have small molecular weight and therefore show high mobility of monomer, and that they are less volatile.

The compound having an oxetanyl group used herein include those represented by the formulae (32) and (33) below. The compound represented by the formula (32) is typically available from TOAGOSEI Co. Ltd., under the trade name of "TESOX", and the compound represented by the formula (33) is typically available from TOAGOSEI Co. Ltd., under the trade name of "OX-SQ".

[Chemical Formula 27]

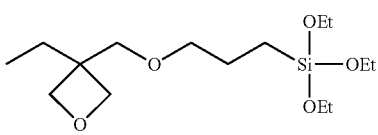

(32)

[Chemical Formula 28]

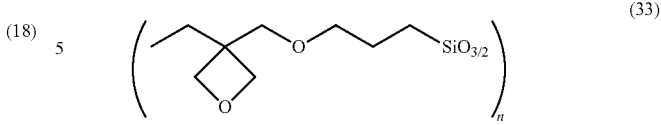

(33)

(In the formula (33), n is 1 or 2.)

The monomer having epoxy group (s) and the oligomer having epoxy group(s) are exemplified by those listed below. The monomer and oligomer having epoxy groups may be polymerized based on ring opening under the presence of an acid.

The monomer having epoxy group (s) and the oligomer having epoxy group(s) are exemplified by those represented by the formulae (34) to (39). Among them, alicyclic epoxy monomers represented by the formulae (36) to (39) are preferably used, from the viewpoint of large reactivity by virtue of large strain energy of the epoxy ring.

The compound represented by the formula (34) is epoxy norbornene, and is typically available as "EpNB" from Promerus LLC. The compound represented by the formula (35) is γ-glycidoxypropyl trimethoxysilane, and is typically available as "Z-6040" from Dow Corning Toray Co. Ltd. The compound represented by the formula (36) is 2-(3,4-epoxycyclohexyl)ethyl trimethoxysilane, and is typically available as "E0327" from Tokyo Chemical Industry Co. Ltd.

The compound represented by the formula (37) is 3, 4-epoxycyclohexenylmethyl-3',4'-epoxycyclohexene carboxylate, and is typically available as "Celloxide 2021P" from Daicel Corporation. The compound represented by the formula (38) is 1,2-epoxy-4-vinyl cyclohexane, and is typically available as "Celloxide 2000" from Daicel Corporation.

The compound represented by the formula (39) is 1,2:8,9-diepoxylimonene, and is typically available as "Celloxide" 3000 from Daicel Corporation.

[Chemical Formula 29]

(34)

[Chemical Formula 30]

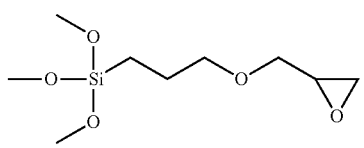

(35)

[Chemical Formula 31]

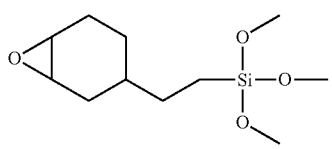

(36)

[Chemical Formula 32]

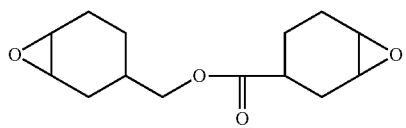
(37)

[Chemical Formula 33]

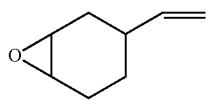
(38)

[Chemical Formula 34]

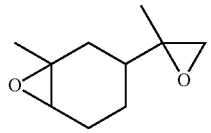
(39)

As the monomer, a monomer having oxetanyl group(s) or an oligomer having oxetanyl group(s) may be combined with a monomer having epoxy group(s) or an oligomer having epoxy group(s).

While the monomer having oxetanyl group(s) and the oligomer having oxetanyl group(s) can initiate the polymerization reaction only slowly, but the polymer can grow rapidly. In contrast, the monomer having epoxy group(s) and the oligomer having epoxy group(s) can initiate the polymerization reaction rapidly, but the polymer can grow only slowly. For this reason, combination of the monomer having oxetanyl group(s) or the oligomer having oxetanyl group(s), with the monomer having epoxy group(s) or the oligomer having epoxy group(s), produces the difference in refractive index between the irradiated region and non-irradiated region upon photoirradiation, in a reliable manner.

Specifically denoting now the monomer represented by the formula (20) as a "first monomer", and the monomer containing the above-described component B as a "second monomer", it is preferable to use the first monomer and the second monomer in a combined manner, wherein the ratio of combination, specified by (weight of second monomer)/(weight of first monomer), is preferably 0.1 to 1 or around, and more preferably 0.1 to 0.6 or around. The ratio of combination within the above-described ranges may improve the balance between high reactivity of the monomers and heat resistance of the resultant optical waveguide 1.

The monomer corresponded to the second monomer is exemplified by monomer having an oxetanyl group different from the monomer represented by the formula (20), and monomer having an vinyl ether group. Of these, at least either one species of epoxy compound (in particular, alicyclic epoxy compound) and bifunctional oxetane compound (monomer having two oxetanyl groups) is preferably used. By using the second monomer, the reactivity between the first monomer and the polymer 915 may be improved, and thereby the optical waveguide may be improved in heat resistance, while keeping the transparency.

Specific examples of the second monomer include the compounds represented by the formulae (15), (12), (11), (18), (19), and (34) to (39).

The norbornene-based monomer herein is used as a general term for indicating a monomer having at least one norbornene skeleton represented by the structural formula A below, and is exemplified by a compound represented by the structural formula C below.

[Chemical Formula 35]

A

[Chemical Formula 36]

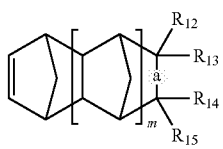
C

[In the formula, "a" represents a single bond or double bond, each of $R_{12}$ to $R_{15}$ independently represents a hydrogen atom, substituted or unsubstituted hydrocarbon group, or functional substituent, and m represents an integer of 0 to 5. If "a" represents a double bond, either one of $R_{12}$ and $R_{13}$, and either one of $R_{14}$ and $R_{15}$ do not exist.]

The unsubstituted hydrocarbon group (hydrocarbyl group) is exemplified by straight-chain or branched $C_{1-10}$ ($C_1$ to $C_{10}$) alkyl group, straight-chain or branched $C_{2-10}$ ($C_2$ to $C_{10}$) alkenyl group, straight-chain or branched $C_{2-10}$ ($C_2$ to $C_{10}$) alkynyl group, $C_{4-12}$ ($C_4$ to $C_{12}$) cycloalkyl group, $C_{4-12}$ ($C_4$ to $C_{12}$) cycloalkenyl group, $C_{6-12}$ ($C_6$ to $C_{12}$) aryl group, and $C_{7-24}$ ($C_7$ to $C_{24}$) aralkyl group (aryl alkyl group). Alternatively, each of $R_{12}$ and $R_{13}$, and each of $R_{14}$ and $R_{15}$ may represent $C_{1-10}$ ($C_1$ to $C_{10}$) alkylidenyl group.

Examples of the monomer other than those described in the above, such as acrylic (methacrylic) monomer, include acrylic acid, methacrylic acid, acrylic ester, methacrylic ester, acrylic amide, methacrylic amide, and acrylonitrile. They may be used independently, or two or more species thereof may be used in combination.

Specific examples include 2-ethylhexyl (meth)acrylate, cyclohexyl (meth)acrylate, and 2-butoxyethyl (meth)acrylate.

Examples of the vinyl ether-based monomer include alkyl vinyl ethers and cycloalkyl vinyl ethers, such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, 2-ethylhexyl vinyl ether, and cyclohexyl vinyl ether. They may be used independently, or two or more species thereof may be used in combination.

The styrene-based monomer is exemplified by styrene and divinyl benzene. They may be used independently, or two or more species thereof may be used in combination.

The combination of these monomers with the above-described polymer 915 may be arbitrary, without special limitation.

At least a part of the monomer may be oligomerized.

Amount of addition of these monomers is preferably 1 part by weight or more and 50 parts by weight or less, per 100 parts by weight of polymer, and more preferably 2 parts by weight or more and 20 parts by weight or less. By the adjustment, the refractive index may appropriately be modulated between the core and the cladding portions, and the flexibility and the heat resistance may be well balanced.

((Polymerization Initiator))

The polymerization initiator is a compound which reacts with the monomer upon irradiation of active radiation beam, to thereby promote the reaction of the monomer, and is optionally added while taking reactivity of the monomer into consideration.

The polymerization initiator used herein is appropriately selected depending on types of the polymerization reaction or crosslinking reaction of the monomer. For example, radical polymerization initiator is preferably used for acrylic (meth-acrylic) monomer and styrene-based monomer, whereas cation polymerization initiator is solely preferable for the epoxy-based monomer, oxetane-based monomer, and vinyl ether-based monomer.

The radical polymerization initiator is exemplified by benzophenones and acetophenones.

On the other hand, the cation polymerization initiator is exemplified by diazonium salts capable of generating a Lewis acid; and iodonium salts or sulfonium salts capable of generating a Brønsted acid.

For a particular case where a monomer having a cyclic ether group is used as the monomer, cation polymerization initiators (photoacid generators) listed below are preferably used.

Examples of compound used as the photoacid generator include sulfonium salts such as triphenylsulfonium trifluoromethane sulfonate, and tris(4-t-butylphenyl)sulfonium-trifluoromethane sulfonate; diazonium salts such as p-nitrophenyldiazonium hexafluorophosphate; ammonium salts; phosphonium salts; iodonium salts such as diphenyliodonium trifluoromethane sulfonate, and (tricumyl)iodonium-tetrakis(pentafluorophenyl) borate; quinonediazides; diazomethanes such as bis(phenylsulfonyl)diazomethane; sulfonate esters such as 1-phenyl-1-(4-methylphenyl)sulfonyloxy-1-benzoylmethane, and N-hydroxynaphthalimide-trifluoromethane; disulfones such as diphenyl disulfone; and triazines such as tris(2,4,6-trichloromethyl)-s-triazine, and 2-(3,4-methylenedioxyphenyl)-4,6-bis(trichloromethyl)-s-triazine. These photoacid generators may be used independently, or two or more species thereof may be used in combination.

The content of the polymerization initiator is preferably 0.01 parts by weight or more and 0.3 parts by weight or less per 100 parts by weight of polymer, and more preferably 0.02 parts by weight or more and 0.2 parts by weight or less. This contributes an effect of improving the reactivity.

If the reactivity of the monomer is extremely large, the polymerization initiator is omissible.

Sensitizer enhances the sensitivity of the polymerization initiator to light, and thereby decreases the time and energy necessary for activating (reacting or decomposing) the polymerization initiator, or changes the wavelength of light suitable for activating the polymerization initiator.

Such sensitizer is appropriately selected, without special limitation, depending on the sensitivity of polymerization initiator and peak wavelength of absorption of the sensitizer, and is exemplified by anthracenes such as 9,10-dibutoxyanthracene (CAS No. 76275-14-4), xanthones, anthraquinones, phenanthrenes, chrysenes, benzpyrenes, fluoranthenes, rubrenes, pyrenes, indanthrenes, and thioxanthene-9-ones. They may be used independently, or in the form of mixture.

Specific examples of the sensitizer include 2-isopropyl-9H-thioxanthene-9-one, 4-isopropyl-9H-thioxanthene-9-one, 1-chloro-4-propoxythioxanthone, phenothiazine, and mixtures of them.

Content of the sensitizer in the core layer forming composition 900 is preferably 0.01% by weight or more, more preferably 0.5% by weight or more, and still more preferably 1% by weight or more. The upper limit value is preferably 5% by weight or below.

Besides them, the additive 920 may also contain catalyst precursor, cocatalyst, antioxidant, UV absorber, photostabilizer, silane coupling agent, coated surface modifier, thermal polymerization inhibitor, leveling agent, surfactant, colorant, storage stabilizer, plasticizer, lubricant, filler, inorganic particle, antiaging agent, wettability modifier, and antistatic agent.

The layer 910 containing the above-described polymer 915 and the additive 920 shows a predetermined refractive index, by the action of the additive 920 uniformly dispersed in the polymer 915.

Figure 7:
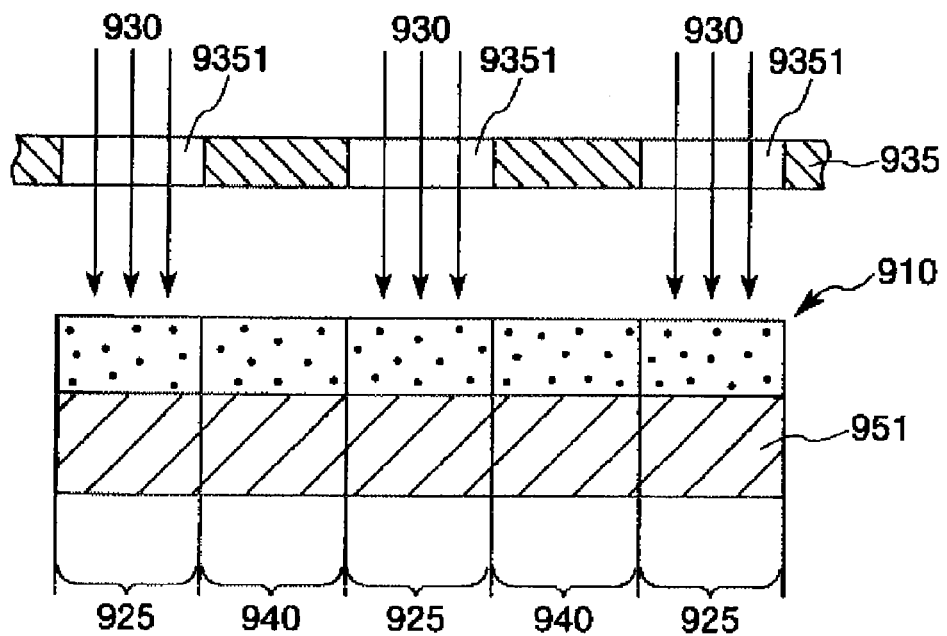
FIG. 7 is a drawing illustrating the first method of manufacturing the optical waveguide illustrated in FIG. 1.

[2] Next, a mask 935 with openings (window) 9351 formed therein is prepared, and active radiation beam 930 is irradiated through the mask 935 onto the layer 910 (see FIG. 7).

The description below will deal with an exemplary case where the monomer has the refractive index smaller than that of the polymer 915.

In the example illustrated herein, the irradiated regions 925 irradiated by the active radiation beam 930 mainly serve as the side-face cladding sections 15.

In the example illustrated herein, the mask 935 has the openings (windows) 9351 formed so as to conform with a pattern of the side-face cladding sections 15 to be formed. The openings 9351 configure a transmissive portion through which the active radiation beam 930 to be irradiated can pass. Since the pattern of the core sections 14 and the side-face cladding sections 15 is determined based on the refractive index distribution W formed corresponding to the irradiation of active radiation beam 930, so that the pattern of the openings 9351 and the pattern of the side-face cladding section 15 may sometimes slightly misalign, rather than showing perfect matching.

The mask 935 may be a preliminarily prepared (separately formed) component (for example, a plate-like component), or may be formed on the layer 910 by a vapor film deposition process or coating process.

Preferable examples of the mask 935 include photomask composed of a quartz glass or PET base, stencil mask, and metal film formed by vapor film deposition process (vapor deposition, sputtering, etc.), wherein the photomask and stencil mask are particularly preferable, since they are advantageous in terms of precise formation of fine patterns, easy handling, and improved productivity.

While the mask 935 illustrated in FIG. 7 has the openings (windows) 9351 formed by partially removing the mask according to the pattern of the irradiated region 925 to be irradiated by the active radiation beam 930, the photomask composed of quartz glass, PET base or the like, may have formed thereon a masking portion against the active radiation beam 930, which is composed of a masking material such as chromium or other metal. In the thus-configured mask, portions other than the masking shielding serve as the windows (transmissive portion).

The active radiation beam 930 used herein will suffice if it can induce a photochemical reaction (change) of the polymerization initiator, and, can eliminate the leaving group contained in the polymer 915, examples of which include visible light, ultraviolet radiation, infrared radiation, laser light, electron beam, and X-ray.

While the active radiation beam 930 may appropriately be selected depending on types of the polymerization initiator and the leaving group, and also depending on types of the sensitizer if contained, without special limitation, it preferably shows a peak wavelength in the range from 200 to 450 nm. In this way, the polymerization initiator may be activated in a relatively easy manner, and the leaving group may be eliminated in a relatively easy manner.

Irradiation dose of the active radiation beam 930 is preferably 0.1 to 9 J/cm² or around, more preferably 0.2 to 6 J/cm² or around, and still more preferably 0.2 to 3 J/cm² or around.

When the active radiation beam 930 is irradiated through the mask 935 on the layer 910, the polymerization initiator is activated in the irradiated region 925, and thereby the monomer polymerizes in the irradiated region 925. When the monomer polymerizes, the amount of monomer in the irradiated region 925 decreases, and the monomer in the non-irradiated region 940 correspondingly diffuses and migrates into the irradiated region 925. Since, as explained previously, the polymer 915 and the monomer are appropriately selected so as to ensure the difference in refractive index in between, so that the difference in refractive index appears between the irradiated region 925 and the non-irradiated region 940, with the progress of diffusion and migration of the monomer.

Figure 11:
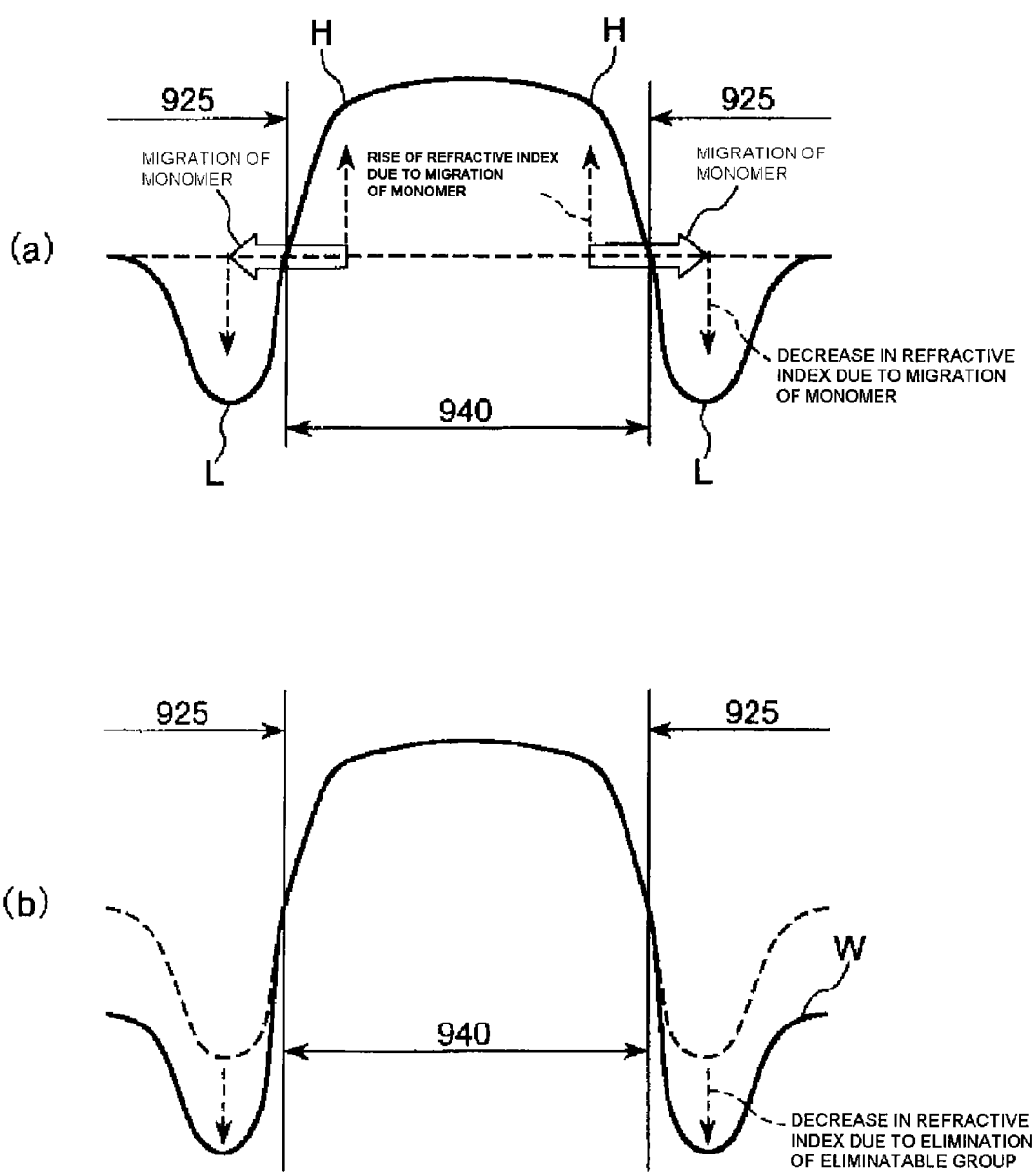
FIG. 11 shows drawings explaining a cause for difference in refractive index between an irradiated region and an non-irradiated region, in the form of refractive index distribution expressed by position in the width-wise direction of a transverse cross section of a layer plotted on the abscissa, and refractive index appeared on the transverse cross section plotted on the ordinate.

FIG. 11 is a drawing explaining a cause for the difference in refractive index between irradiated region 925 and the non-irradiated region 940, which illustrates a refractive index distribution expressed by position in a transverse cross section of the layer 910 plotted on the abscissa, and refractive index appeared on the transverse cross section plotted on the ordinate.

Since the monomer used in this embodiment has a refractive index smaller than that of the polymer 915, so that the non-irradiated region 940 will have a larger refractive index with the progress of diffusion and migration of the monomer, whereas the irradiated region 925 will have a smaller refractive index (see FIG. 11(a)).

The diffusion and migration of the monomer are supposed to be triggered by consumption of the monomer in the irradiated region 925, and concentration gradient of the monomer formed corresponding thereto. Accordingly, the monomer begins to diffuse and migrate towards the irradiated region 925 gradually from the portion of the non-irradiated region 940 closer to the irradiated region 925, rather than from the entire portion of the non-irradiated region 940 all at once, and just as compensating the event, the monomer is also driven to migrate from the center portion of the non-irradiated region 940 outwardly. As a consequence, as illustrated in FIG. 11(a), while placing the boundary of the irradiated region 925 and the non-irradiated region 940 in between, a high refractive index portion H is formed on the non-irradiated region 940 side, and low refractive index portions L are formed on the irradiated region 925 side. Since the high refractive index portion H and the low refractive index portions L are formed with the progress of diffusion and migration of the monomer as described in the above, so that the profile is expressed by a smooth curve as a matter of course. More specifically, the high refractive index portion H will be expressed by a concave-up, nearly U-profile, and each low refractive index portion L will be expressed by a concave-down, nearly U-profile, for example.

Since the refractive index of the polymer produced by polymerization of the above-described monomer is nearly equal to the refractive index of the monomer before being polymerized (difference in refractive index is 0 to 0.001 or around), so that the refractive index in the irradiated region 925 will decrease corresponding to the amount of monomer and the amount of monomer-derived substances, with the progress of polymerization of the monomer. Accordingly, by appropriately adjusting, for example, the amount of monomer relative to the amount of polymer, the profile of refractive index distribution W may be controlled.

On the other hand, in the non-irradiated region 940, the polymerization initiator is not activated, and therefore the monomer is not polymerized.

In the irradiated region 925, readiness of diffusion and migration of the monomer gradually decreases with the progress of polymerization of monomer. Accordingly, in the irradiated region 925, the closer the region thereof to the non-irradiated region 940, the higher the monomer concentration, and the larger the amount of decrease in refractive index. As a consequence, the low refractive index portion L formed in the irradiated region 925 tends to have a laterally asymmetric profile, showing a more steep slope on the non-irradiated region 940 side. In this way, the refractive index distribution W characteristic to the optical waveguide of the present invention is formed.

The polymer 915 preferably has a leaving group as described previously. The leaving group causes elimination upon irradiation of the active radiation beam 930, and decreases the refractive index of the polymer 915. Accordingly, when the active radiation beam 930 is irradiated on the irradiated region 925, the monomer starts to diffuse and migrate as described in the above, the leaving group is eliminated from the polymer 915, and thereby the refractive index of the irradiated region 925 will decrease from the pre-irradiation level (see FIG. 11(b)).

Such decrease in the refractive index occurs uniformly over the entire portion of the irradiated region 925, so that the above-described difference in refractive index between the high refractive index portion H and the low refractive index portion L will further be expanded. As a consequence, the refractive index distribution W illustrated in FIG. 11(b) may be obtained. Note that the changes in refractive index illustrated in FIG. 11(a) and FIG. 11(b) occur almost at the same time. By virtue of such mode of changes in refractive index, the difference in refractive index will further be expanded.

In this embodiment, by appropriately adjusting, for example, the constituents of the core layer before irradiation of energy, the dose of energy irradiation, or the degree of dryness of the core layer before irradiation of energy, the profile of refractive index distribution of the core layer after the irradiation of energy may be controlled.

On the other hand, by adjusting the irradiation dose of the active radiation beam 930, the resultant difference in refractive index, and the profile of the refractive index distribution may be controlled. For example, by increasing the irradiation dose, the difference in refractive index may be expanded. Alternatively, by adjusting the content of photoacid generator and the irradiation dose, the profile of refractive index distribution may be controlled. The layer 910 may be dried before the irradiation with the active radiation beam 930, wherein it is also possible to control the profile of refractive index distribution, by adjusting the degree of dryness. For example, by increasing the degree of dryness, the amount of diffusion and migration of monomer may be suppressed. Alternatively, by elevating the drying temperature, the amount of diffusion may be increased, and thereby the refractive index distribution may be controlled.

Next, the layer 910 is subjected to a heating process. In the heating process, the monomer in the irradiated region 925 irradiated by light further polymerizes. On the other hand, in the process of heating, the monomer in the non-irradiated region 940 vaporizes. Accordingly, the amount of monomer in the non-irradiated region 940 further decreases, and the refractive index elevates to reach a level close to that of the polymer 915.

Although not specifically limited, the heating temperature in the heating process is preferably adjusted to 30 to 180° C. or around, and more preferably 40 to 160° C. or around.

The heating time is preferably adjusted so that the polymerization reaction of the monomer is allowed to almost complete in the irradiated region 925, and for example, preferably adjusted to 0.1 to 2 hours or around, and more preferably 0.1 to 1 hour or around.

The heating process is optional as required, and is omissible.

Figure 8:
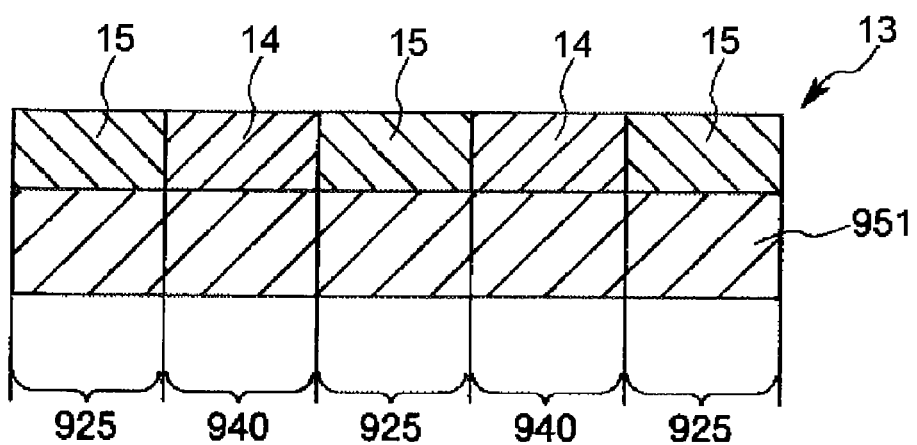
FIG. 8 is a drawing illustrating the first method of manufacturing the optical waveguide illustrated in FIG. 1.

According to the principle described in the above, the core layer 13 showing the refractive index distribution W may be obtained (see FIG. 8).

The refractive index distribution W has local minima Ws1, Ws2, Ws3, Ws4, as a result of conversion from the low refractive index portion L (see FIG. 2(b)), wherein the positions of the local minima correspond to the boundaries between the core sections 14 and the side-face cladding sections 15.

The refractive index distribution W is in a certain correlation with the concentration of structure derived from the monomer in the core layer 13. Accordingly, by measuring the concentration of the monomer-derived structure, the refractive index distribution W of the optical waveguide 1 may be identified in an indirect manner.

The concentration of the structure may be measured by linear analysis or area analysis by means of FT-IR, TOF-SIMS and so forth.

The refractive index distribution W may indirectly be determined also based on that the intensity distribution of output light from the optical waveguide 1 is in a certain correlation with the refractive index distribution W.

Of course, the refractive index distribution W may be identified directly by the refracted near-field technique, differential interferometry, or the like.

For the case where the monomer used herein has a refractive index larger than that of the polymer 915, the refractive index of the destination will become larger in association with migration of the monomer on the contrary to the above, so that it is recommendable to correspondingly set the irradiated region 925 and the non-irradiated region 940.

For the case where a highly directive light such as laser light is used as the active radiation beam 930, the mask 935 is omissible.

[3] Next, the cladding layers 11, 12 are stacked on the core layer 13. The optical waveguide 1 may be obtained in this way.

Figure 9:
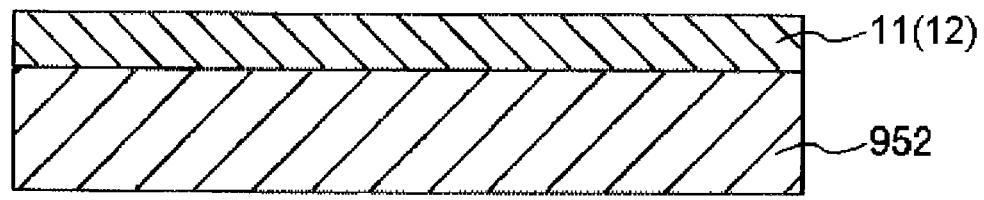
FIG. 9 is a drawing illustrating the first method of manufacturing the optical waveguide illustrated in FIG. 1.
Figure 10:
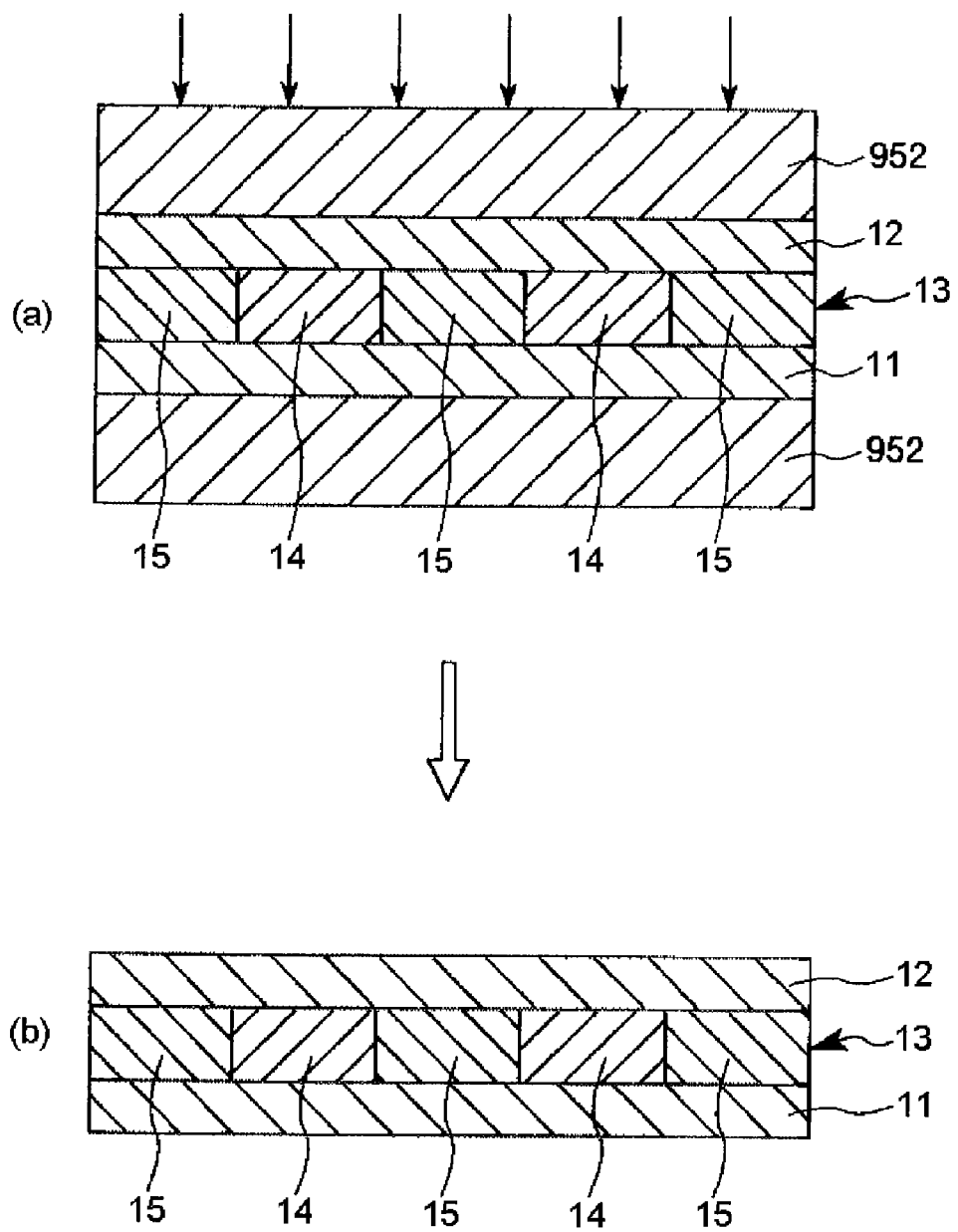
FIG. 10 is a drawing illustrating the first method of manufacturing the optical waveguide illustrated in FIG. 1.

In the process, first, the cladding layer 11 (12) is formed over the support substrate 952 (see FIG. 9).

A method of forming the cladding layer 11 (12) is arbitrarily selectable from a method of coating a varnish (cladding layer forming composition) which contains a cladding material and allowing it to cure (solidify), and a method of coating a curable monomer composition and allowing it to cure (solidify), and so forth.

Next, the core layer 13 is separated from the support substrate 951, and the core layer 13 is held between the support substrate 952 having the cladding layer 11 formed thereon, and the support substrate 952 having the cladding layer 12 formed thereon (see FIG. 10(a)).

Then as illustrated by arrows in FIG. 10(a), the stack is pressed from the top side of the support substrate 952 having the cladding layer 12 formed thereon, so as to bond the cladding layers 11, 12 and the core layer 13 under compression.

In this way, the cladding layers 11, 12 and the core layer 13 are bonded and integrated (see FIG. 10(b)).

Next, the support substrates 952 are removed by separation, respectively from the cladding layers 11, 12. The optical waveguide 1 is obtained in this way.

Thereafter, if necessary, the support film 2 is stacked over the bottom surface of the optical waveguide 1, and the cover film 3 is stacked over the top surface.

The core layer 13 may alternatively be formed over the cladding layer 11, rather than over the support substrate 951. Still alternatively, the cladding layer 12 may be formed by coating a material over the core layer 13, rather than by bonding on the core layer 13.

(Second Method of Manufacturing)

Next, a second method of manufacturing of the optical waveguide 1 will be explained.

The second method of manufacturing will be explained below, mainly focusing aspects different from those of the first method of manufacturing, so that explanations for any similar aspects will not be repeated.

The second method of manufacturing is similar to the first method of manufacturing, except for composition of the core layer forming composition 900.

According to the second method of manufacturing the optical waveguide 1, [1] the core layer forming composition 900 is coated over a support substrate 951 to thereby form a liquid cover film, the support substrate 951 is then placed on a leveling table so as to planarize the liquid cover film, while allowing the solvent to vaporize (desolvate). The layer 910 is thus obtained. [2] Next, active radiation beam is irradiated partially on the layer 910 so as to produce difference in refractive index, to thereby obtain the core layer 13 in which the core sections 14 and the side-face cladding sections 15 are formed. [3] Next, the cladding layers 11, 12 are stacked on both sides of the core layer 13, to thereby obtain the optical waveguide 1.

The individual processes will be explained below.

[1] First, the core layer forming composition 900 is prepared.

The core layer forming composition 900 used in the second method of manufacturing contains a catalyst precursor and a cocatalyst, in place of the polymerization initiator.

The catalyst precursor is a substance capable of initiating a monomer reaction (polymerization reaction, crosslinking reaction, etc.), the activation temperature of which changes while being acted upon by the cocatalyst activated by photoirradiation. By such change in the activation temperature, the temperature at which the monomer reaction is initiated is varied between the irradiated region 925 and the non-irradiated region 940, and thereby the monomer may be reacted only in the irradiated region 925.

The catalyst precursor (procatalyst) used herein may be an arbitrary compound so long as it may be varied (elevated or lowered) in the activation temperature upon being irradiated by the active radiation beam, wherein those lowered in the activation temperature upon being irradiated by the active radiation beam are preferable. By the selection, the core layer 13 (optical waveguide 1) may be formed by heating at relatively low temperatures, so that the optical waveguide 1 may be prevented from being degraded in the characteristics (light transmission performance), due to unnecessary heat input to other layers.

This sort of catalyst precursor preferably used herein contains (mainly composed of) at least one of compounds represented by the formulae (Ia) and (Ib) below.

[Chemical Formula 37]

$$(E(R)_3)_2Pd(Q)_2 \qquad (Ia)$$

$$[(E(R)_3)_a Pd(Q)(LB)_b]_p[WCA]_r \qquad (Ib)$$

[In the formulae Ia, Ib, each $E(R)_3$ independently represents a Group XV neutral electron-donating ligand, E represents an element selected from Group XV in the periodic table, R represents a hydrogen atom (or one of isotopes thereof) or a domain containing a hydrocarbon group, and Q represents an anionic ligand selected from carboxylate, thiocarboxylate and dithiocarboxylate. In the formula Ib, LB represents a Lewis base, and WCA represents a weakly coordinating anion, a represents an integer of 1 to 3, b represents an integer of 0 to 2, a+b is 1 to 3, and each of p and r represents a numeral balancing electric charge between palladium cations and weakly coordinating anions.]

Typical catalyst precursors represented by the formula Ia include $Pd(OAc)_2(P(i-Pr)_3)_2$, $Pd(OAc)_2(P(Cy)_3)_2$, $Pd(O_2CCMe_3)_2(P(Cy)_3)_2$, $Pd(OAc)_2(P(Cp)_3)_2$, $Pd(O_2CCF_3)_2 (P(Cy)_3)_2$, and $Pd(O_2CC_6H_5)_3(P(Cy)_3)_2$, but not limited thereto. Now, Cp represents a cyclopentyl group, and Cy represents a cyclohexyl group.

The catalyst precursor represented by the formula Ib is preferably a compound such that each of p and r is independently selected form integers of 1 and 2.

Typical catalyst precursors represented by the formula Ib include $Pd(OAc)_2(P(Cy)_3)_2$. Now, Cy represents a cyclohexyl group, and Ac represents an acetyl group.

These catalyst precursors are capable of allowing the monomer to react in an efficient manner (for example, norbornene-based monomer may be polymerized by addition polymerization, or crosslinked in an efficient manner).

In the state that the activation temperature is lowered (activity latent state), the catalyst precursor is preferably such that the activation temperature thereof is lower than the intrinsic activation temperature by 10 to 80° C. or around (preferably by 10 to 50° C. or around). By the selection, difference in refractive index between the core sections 14 and the side-face cladding sections 15 may be produced in an exact manner.

This sort of catalyst precursor preferably contains (mainly composed of) at least one of $Pd(OAc)_2(P(i-Pr)_3)_2$ and $Pd(OAc)_2(P(Cy)_3)_2$.

The cocatalyst is a substance activated upon being irradiated by the active radiation beam, and capable of varying the activation temperature (temperature allowing the monomer to react) of the catalyst precursor (procatalyst).

The cocatalyst used herein is arbitrarily selectable from compounds possibly activated as a result of changes in the molecular structure (reaction or decomposition), upon being irradiated by the active radiation beam, wherein those containing (being mainly composed of) a compound (photoinitiator), decomposable upon irradiation of the active radiation beam at a specific wavelength, and capable of generating a cation such as proton or other cation, and a weakly coordinating anion (WCA) capable of substituting a leaving group of the catalyst precursor, are preferably used.

The weakly coordinating anion is exemplified by tetrakis (pentafluorophenyl) borate ion ($FABA^-$), and hexafluoroantimonate ion ($SbF_6^-$).

The cocatalyst (photoacid generator or photobase generator) is exemplified by tetrakis(pentafluorophenyl) borate and hexafluoroantimonate represented by the formulae below, and also by tetrakis(pentafluorophenyl) gallate, aluminates, antimonates, other borates, gallates, carboranes, and halocarboranes.

[Chemical Formula 38]

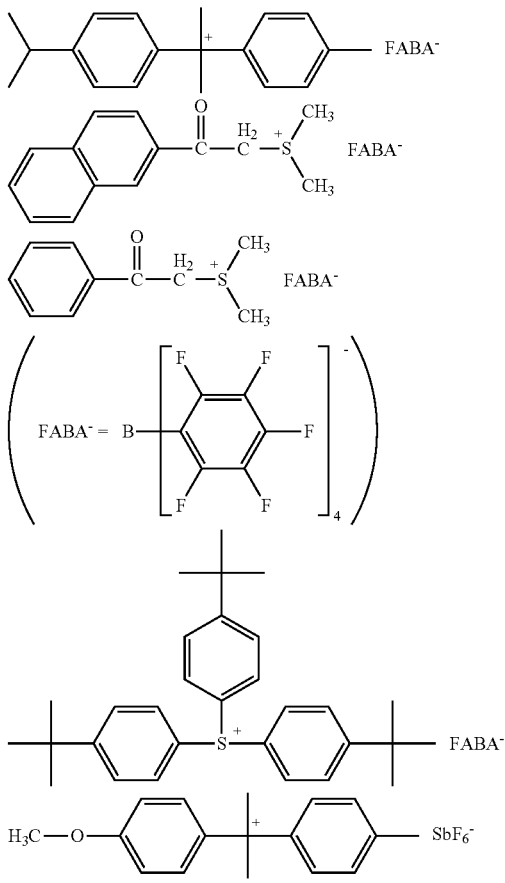

Commercially available products of the cocatalyst include "Rhodorsil (registered trademark, the same will apply hereinafter) Photoinitiator 2074 (CAS No. 178233-72-2)" available from Rhodia USA, Cranbury, N.J., "TAG-372R" ((dimethyl(2-(2-naphthyl)-2-oxoethyl)sulfonium tetrakis(pentafluorophenyl) borate: CAS No. 193957-54-9)" available from Toyo Ink Co. Ltd., Tokyo, Japan, "MPI-103 (CAS No. 87709-41-9)" available from Midori Kagaku Co. Ltd., Tokyo Japan, "TAG-371 (CAS No. 193957-53-8)" available from Toyo Ink Co. Ltd., Tokyo, Japan, "TTBPS-TPFPB (tris(4-tert-butylphenyl)sulfonium tetrakis(pentafluorophenyl) borate)" available from Toyo Gosei Co. Ltd., Tokyo, Japan, and "NAI-105 (CAS No. 85342-62-7)" available from Midori Kagaku Co. Ltd., Tokyo, Japan.

For the case where Rhodorsil Photoinitiator 2074 is used as the cocatalyst, ultraviolet radiation (UV light) is preferably used as the active radiation beam (chemical beam) described later. Mercury lamp (high pressure mercury lamp) is preferably used as a means for irradiating ultraviolet radiation. By the selection, a sufficient energy of ultraviolet radiation (active radiation beam) at 300 nm or shorter may be supplied to the layer 910, so as to efficiently decompose Rhodorsil Photoinitiator 2074, and thereby the above-described cation and WCA may be generated.

[2]

[2-1] Next, in a similar way to the first method of manufacturing, the active radiation beam 930 is irradiated through the mask 935 onto the layer 910.

In the irradiated region 925, the cocatalyst reacts (combines) or decomposed by the action of the active radiation beam 930, and releases (generates) a cation (proton or other cation), and a weakly coordinating anion (WCA).

These cation and weakly coordinating anion change (decompose) the molecular structure of the catalyst precursor which resides in the irradiated region 925, and turn it into an activity latent state (potentially active state).

Now, the catalyst precursor in the activity latent state (or potentially active state) means the catalyst lowered in the activation temperature than the intrinsic activation temperature, but incapable of allowing the monomer reaction to proceed without elevation of temperature, that is, at around room temperature.

Accordingly, even after being irradiated by the active radiation beam 930, the layer 910 may be kept in a state not causative of the monomer reaction, if stored at around −40° C. for example. The optical waveguide 1 (for example, core layer 13) may therefore be obtained in a highly convenient manner, by preparing a plurality of layers 910 after being irradiated by the active radiation beam 930, and by collectively annealing them.

In addition to the above-described change in the molecular structure of the catalyst precursor, in a similar way to the first method of manufacturing, the leaving group leaves the polymer 915. In this way, difference in refractive index appears between the irradiated region 925 and the non-irradiated region 940 of the layer 910.

[2-2] Next, the layer 910 is heated (first heating process) By the heating, in the irradiated region 925, the catalyst precursor in the activity latent state is activated (turned active), and the monomer starts to react (polymerize or crosslink).

As the monomer reaction proceeds, the monomer concentration in the irradiated region 925 gradually decreases. In this way, difference in the monomer concentration appears between the irradiated region 925 and the non-irradiated region 940, and the monomer then migrates by diffusion from the non-irradiated region 940 to gather in the irradiated region 925, so as to cancel the difference.

As a consequence, the layer 910 will have formed therein the refractive index distribution, similar to that in the first method of manufacturing.

While heating temperature in the heating process is not specifically limited, it is preferably 30 to 80° C. or around, and more preferably 40 to 60° C. or around.

The heating time is preferably set so that the monomer reaction in the irradiated region 925 almost completes. More specifically, the heating time is preferably 0.1 to 2 hours or around, and more preferably 0.1 to 1 hour or around.

Next, the layer 910 is subjected to a second heating process.

By the heating, the catalyst precursor which remains in the non-irradiated region 940 and/or the irradiated region 925 is activated (brought into an active state), directly or in association with activation of the cocatalyst, and thereby the monomer which remains in the individual regions 925, 940 is allowed to react.

By allowing the monomer which remains in the individual regions 925, 940 to react in this way, the resultant core sections 14 and side-face cladding sections 15 may be stabilized.

Heating temperature in the second heating is not specifically limited so long as the catalyst precursor or the cocatalyst may be activated, wherein the heating temperature is preferably 70 to 100° C. or around, and more preferably 80 to 90° C. or around.

The heating time is preferably 0.5 to 2 hours or around, and more preferably 0.5 to 1 hour or around.

Next, the layer 910 is subjected to a third heating process.

By the heating, the resultant core layer 13 may be reduced in the internal stress possibly produced therein, so that the core sections 14 and the side-face cladding sections 15 may further be stabilized.

Heating temperature in the third heating process is preferably set higher by 20° C. or more than that in the second heating process. More specifically, the heating temperature is preferably 90 to 180° C. or around, and more preferably 120 to 160° C. or around.

The heating time is preferably 0.5 to 2 hours or around, and more preferably 0.5 to 1 hour or around.

By the processes described in the above, the optical waveguide 1 (core layer 13, for example) may be obtained.

Note that, for the case where a sufficient difference in refractive index may be obtained between the core sections 14 and the side-face cladding sections 15 before the second heating process or the third heating process, process of the second heating process or thereafter, or the process of the third heating process of thereafter is omissible.

[3] Next, the cladding layers 11, 12 are stacked on both surfaces of the core layer 13, in a similar way to the first method of manufacturing. In this way, the optical waveguide 1 is obtained.

Note that, for the case where the mirror 17 illustrated in FIG. 5 is formed, a part of the obtained optical waveguide 1 is notched, and the recess 170, the inner surface of which is used as the mirror 17, is formed.

The optical waveguide 1 may be notched by laser processing, dicing using a dicing saw, and so forth.

<Electronic Device>

The above-described optical waveguide of the present invention is excellent in light transmission efficiency and long-term reliability. Accordingly, by incorporating the optical waveguide of the present invention, there is obtained a reliable electronic device (electronic device of the present invention) capable of implementing high-quality optical communication between two points.

The electronic device having the optical waveguide of the present invention incorporated therein is exemplified by mobile phone, game machine, router device, WDM device, personal computer, television set, and home server. All of these electronic devices are required to rapidly transfer a large volume of data, typically between a processor such as LSI and a memory device such as RAM. Accordingly, the electronic devices having the optical waveguide of the present invention incorporated therein are expected to solve any nonconformities specific to electric wiring, such as noise and signal degradation, and to dramatically improve the performances.

In addition, the optical waveguide portion is largely reduced in heat generation as compared to the electric wiring. Accordingly, electric power necessary for cooling may be saved, and total power consumption of the electronic device may be saved as a consequence.

The optical waveguide of the present invention is less causative of transmission loss and rounded pulse signal, so that interference is less likely to occur even in a multi-channel and high-density configuration. Accordingly, a highly reliable optical waveguide may be obtained even in a high-density and small-area design, and the electronic device may therefore be improved in reliability and may further be downsized, by incorporating the optical waveguide.

While the optical waveguide of the present invention and electronic device have been explained, the present invention is not limited thereto. For example, the optical waveguide may be added with an arbitrary constituent.

The electronic device of this embodiment generally uses transmission equipment such as router device and WDM (Wavelength Division Multiplexing) device which transmit information to a broad band circuit (broadband) capable of large-capacity and high-speed information communication. These transmission equipment have incorporated therein a large number of signal processing boards on which processors such as LSIs and storage devices such as memories are integrated, dedicated to mutual communication among the individual circuits.

The optical waveguide of this embodiment is excellent in light transmission characteristics, represented by small deficiency in photorepair, and small crosstalk. Accordingly, crosstalk, high-frequency noise, and degradation of electric signal may be suppressed even under increased speed of information transmission. This enables high-throughput information transmission among the individual signal processing boards. This enables high-throughput information transmission also in super computer and large-scale server.

The method of manufacturing the optical waveguide of the present invention is not limited to the above-described methods. For example, available methods include a method of changing the refractive index by cleaving bonds in molecules by irradiating the active radiation beam (photobleaching); and a method of adding photo-crosslinkable polymer having a photoisomerizable or photodimerizable unsaturated bond, to a composition composing the core layer, and by irradiating it with the active radiation beam so as to change the molecular structure to thereby change the refractive index (photoisomerization, photodimerization).

By these methods, since the amount of change of refractive index is adjustable depending on the irradiation dose of active radiation beam, so that the core layer with a desired profile of refractive index distribution W may be formed by varying the irradiation dose onto the individual parts of the layer, depending on the desired profile.

EXAMPLE

Next, Examples of the present invention will be explained.
1. Manufacturing of Optical Waveguide

Example 1

(1) Synthesis of Norbornene-Based Resin Having Leaving Group

In a glove box having both of moisture and oxygen concentration conditioned at 1 ppm or lower, and filled with dry nitrogen, 7.2 g (40.1 mmol) of hexylnorbornene (HxNB), and 12.9 g (40.1 mmol) of diphenylmethyl norbornene methoxysilane were weighed in a 500-mL vial, followed by further addition of 60 g of dehydrated toluene and 11 g of ethyl acetate, and the vial was tightly closed by placing a silicone sealer on the top.

Next, 1.56 g (3.2 mmol) of a Ni catalyst represented by the chemical formula (A) below, and 10 mL of dehydrated toluene were weighed in a 100-mL vial, the vial was then sealed, with a stirrer chip enclosed therein, and the catalyst was completely dissolved by thorough stirring.

One milliliter of the solution of the Ni catalyst represented by the chemical formula (A) below was exactly measured using a syringe, and quantitatively injected into the vial containing the two above-described species of norbornenes, and stirred at room temperature for one hour. A distinct increase in the viscosity was confirmed. The seal was removed at this point of time, 60 g of tetrahydrofuran (THF) was added and stirred, to thereby obtain a reaction solution.

In a 100-mL beaker, 9.5 g of acetic anhydride, 18 g (30% concentration) of aqueous hydrogen peroxide, and 30 g of deionized water were placed and stirred, to thereby prepare an aqueous peracetic acid in situ. Next, the whole quantity of the aqueous solution was added to the above-described reaction solution, and stirred for 12 hours, to thereby allow reduction treatment of Ni to proceed.

Next, the reaction solution after the treatment was transferred into a separating funnel, the lower aqueous layer was discarded, 100 mL of a 30% aqueous solution of isopropanol was added, and vigorously shaken. The content was allowed to stand still so as to allow it to completely separate into two layers, and the aqueous layer was discarded. After the water washing process repeated three times, the oil layer was dropped into a large excess of acetone so as to re-precipitate the produced polymer, the polymer was separated by filtration from the filtrate, and then dried under heating in a vacuum drying oven set to 60° C. for 12 hours. Polymer #1 was thus obtained. Measurement of molecular weight distribution by GPC gave Mw=100,000 and Mn=40,000. Measurement of molar ratios of the individual structural units in the polymer #1 by NMR revealed 50 mol % of hexylnorbornene structural unit, and 50 mol % of diphenylmethyl norbornene methoxysilane structural unit.

[Chemical Formula 39]

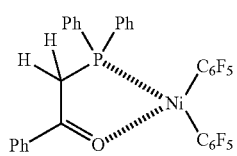

(A)

[Chemical Formula 40]

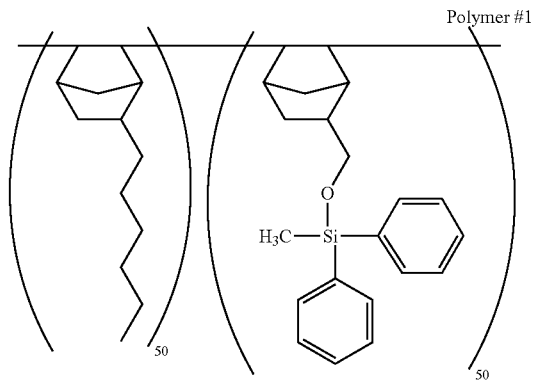

Polymer #1

(2) Preparation of Core Layer Forming Composition

Ten grams of the purified polymer #1 was weighed in a 100-mL glass container, to which 40 g of mesitylene, 0.01 g of antioxidant Irganox 1076 (from Ciba Geigy), 2 g of cyclohexyloxetane monomer (the first monomer represented by the formula (20), CHOX from TOAGOSEI Co. Ltd., CAS #483303-25-9, molecular weight=186, boiling point=125° C./1.33 kPa), and polymerization initiator (photoacid generator) Rhodorsil Photoinitiator 2074 (from Rhodia, CAS #178233-72-2) (2.50E-2 g, in 0.1 mL ethyl acetate) were added, the content was allowed to uniformly solubilize, and filtered through a 0.2-μm PTFE filter, to thereby obtain a clean core layer forming composition.

(3) Manufacturing of Optical Waveguide
(Formation of Lower Cladding Layer)

On a silicon wafer, a photosensitive norbornene resin composition (from Promerus LLC Avatrel 2000P varnish) was uniformly coated using a doctor blade, and the product was placed in a drying oven at 45° C. for 15 minutes. After completely removing the solvent, the entire surface of coating was irradiated by 80 mJ UV, the product was dried in a drying oven at 120° C. for one hour so as to cure the coated film, and thereby the lower cladding layer was formed. The thus-formed lower cladding layer was found to be 20 μm thick, colorless and clear.

(Formation of Core Layer)

A core layer forming composition was uniformly coated on the lower cladding layer using a doctor blade, and the product was placed in a drying oven at 55° C. for 10 minutes. After the solvent was completely removed, the product was brought into contact with a photomask under pressure, and was selectively irradiated with 1300 mJ/cm² UV. The mask was then removed, and the product was heated in a drying oven at 150° C. for 1.5 hours. After the heating, formation of a very clear waveguide pattern was confirmed. Also formation of the core sections and side-face cladding sections was confirmed. The optical waveguide obtained herein had 8 core sections aligned in parallel. Each core section was 50 μm wide, each side-face cladding section was 80 μm wide, and each core layer was 50 μm thick.

(Formation of Upper Cladding Layer)

A dry film having, on a polyethersulfone (PES) film, Avatrel 2000P preliminarily stacked so as to give a dry thickness of 20 μm was bonded to the core layer, and the stack was placed in a vacuum laminator set to 140° C. for thermocompression bonding. The product was then irradiated with 100 mJ UV over the entire surface, dried in a drying oven at 120° C. for 1 hour so as to cure Avatrel 2000P, to thereby form the upper cladding layer. The optical waveguide was thus obtained.

A 10 cm piece was cut out from the thus-obtained optical waveguide.

(Evaluation of Refractive Index Distribution)

The thus-obtained optical waveguide was observed on the transverse cross section of the core layer along the center line in the thickness-wise direction, under a dual-beam interference microscope, to thereby acquire the refractive index distribution W in the width-wise direction. The refractive index distribution W was found to have a plurality of local minima and local maxima, and show a continuous change of refractive index.

A method of measuring the refractive index distribution under the dual-beam interference microscope will be explained below.

First, the optical waveguide was sliced in the cross sectional direction, to obtain a slice of the optical waveguide, with a length of optical waveguide of 200 μm to 300 μm. Next, a chamber was fabricated by filling a space surrounded by two sheets of slide glass with an oil having a refractive index of 1.536. A sample incorporated with the slice of the optical waveguide, and a blank sample not incorporated with the slice of the optical waveguide, were prepared. Next, interference fringe of the slice of the optical waveguide was observed under the dual-beam interference microscope, to thereby obtain a photo of interference fringe in the cross sectional direction of the slice. The photo of interference fringes was analyzed to obtain the refractive index distribution. Procedures of the image analysis of the photo of interference fringes are as follow. First, the optical path length of the dual-beam interference microscope was changed so as to vary a position at which the interference fringes appear, and image data were continuously acquired. Based on the plurality of image data, the refractive index at each point of measurement in the layer-stacking direction and the in-layer direction was calculated. In this example, the intervals of the points of measurement was set to 2.5 μm.

On the other hand, the optical waveguide was observed on the transverse cross section of the core section along the center line which vertically passes the center of the width of the core section, under the dual-beam interference microscope, to thereby acquire the refractive index distribution T in the thickness-wise direction. It was found in the refractive index distribution T that the refractive index was kept almost constant in a region corresponded to the core section, and kept almost constant also in regions corresponded to the individual cladding layers, but at a level lower than that in the region corresponded to the core section. In other words, the refractive index distribution in the thickness-wise direction of the thus-obtained optical waveguide was found to be of so-called step index type.

Example 2

An optical waveguide was obtained in a similar way as described in Example 1, except that the irradiation dose of UV was raised to 1500 mJ/cm².

Example 3

An optical waveguide was obtained in a similar way as described in Example 1, except that the irradiation dose of UV was raised to 2000 mJ/cm², and that the molar ratios of the individual structural units of the polymer #1 were changed to 40 mol % of hexylnorbornene structural unit and 60 mol % of diphenylmethyl norbornene methoxysilane structural unit.

Example 4

An optical waveguide was obtained in a similar way as described in Example 1, except that the irradiation dose of UV was reduced to 500 mJ/cm², and that the molar ratios of the individual structural units of the polymer #1 were changed to 45 mol % of hexylnorbornene structural unit and 55 mol % of diphenylmethyl norbornene methoxysilane structural unit.

Example 5

An optical waveguide was obtained in a similar way as described in Example 1, except that the molar ratios of the individual structural units of the polymer #1 were changed to 30 mol % of hexylnorbornene structural unit and 70 mol % of diphenylmethyl norbornene methoxysilane structural unit.

Example 8

An optical waveguide was obtained in a similar way as described in Example 1, except that the irradiation dose of UV was reduced to 300 mJ/cm², and that the molar ratios of the individual structural units of the polymer #1 were changed to 40 mol % of hexylnorbornene structural unit and 60 mol % of diphenylmethyl norbornene methoxysilane structural unit.

Example 9

An optical waveguide was obtained in a similar way as described in Example 1, except that the irradiation dose of UV was reduced to 500 mJ/cm², and that the molar ratios of the individual structural units of the polymer #1 were changed to 30 mol % of hexylnorbornene structural unit and 70 mol % of diphenylmethyl norbornene methoxysilane structural unit.

Example 10

An optical waveguide was obtained in a similar way as described in Example 1, except that the irradiation dose of UV was reduced to 100 mJ/cm², and that the molar ratios of the individual structural units of the polymer #1 were changed to 60 mol % of hexylnorbornene structural unit and 40 mol % of diphenylmethyl norbornene methoxysilane structural unit.

Example 11

An optical waveguide was obtained in a similar way as described in Example 1, except that the irradiation dose of UV was raised to 1500 mJ/cm², and that the molar ratios of the individual structural units of the polymer #1 were changed to 10 mol % of hexylnorbornene structural unit and 90 mol % of diphenylmethyl norbornene methoxysilane structural unit.

Example 12

An optical waveguide was obtained in a similar way as described in Example 1, except that the irradiation dose of UV was raised to 3000 mJ/cm², and that the molar ratios of the individual structural units of the polymer #1 were changed to 5 mol % of hexylnorbornene structural unit and 95 mol % of diphenylmethyl norbornene methoxysilane structural unit.

Example 13

An optical waveguide was obtained in a similar way as described in Example 1, except that the core layer forming composition prepared as described below was used.

Ten grams of the purified polymer #1 was weighed in a 100-mL glass container, to which 40 g of mesitylene, 0.01 g of antioxidant Irganox 1076 (from Ciba Geigy), 2 g of bifunctional oxetane monomer (represented by the formula (15), DOX from TOAGOSEI Co. Ltd., CAS #18934-00-4, molecular weight=214, boiling point=119° C./0.67 kPa), and photoacid generator Rhodorsil Photoinitiator 2074 (From Rhodia, CAS #178233-72-2) (1.36E-2 g, in 0.1 mL ethyl acetate) were added, the content was allowed to uniformly solubilize, and filtered through a 0.2-µm PTFE filter, to thereby obtain a clean core layer forming composition.

Example 14

An optical waveguide was obtained in a similar way as described in Example 1, except that the core layer forming composition prepared as described below was used.

Ten grams of the purified polymer #1 was weighed in a 100-mL glass container, to which 40 g of mesitylene, 0.01 g of antioxidant Irganox 1076 (from Ciba Geigy), 2 g of alicyclic epoxy monomer (represented by the formula (37), Celloxide 2021P from Daicel Corporation, CAS #2386-87-0, molecular weight=252, boiling point=188° C./4 hPa), and photoacid generator Rhodorsil Photoinitiator 2074 (From Rhodia, CAS #178233-72-2) (1.36E-2 g, in 0.1 mL ethyl acetate) were added, the content was allowed to uniformly solubilize, and filtered through a 0.2-µm PTFE filter, to thereby obtain a clean core layer forming composition.

Example 15

An optical waveguide was obtained in a similar way as described in Example 1, except that the core layer forming composition prepared as described below was used.

Ten grams of the purified polymer #1 was weighed in a 100-mL glass container, to which 40 g of mesitylene, 0.01 g of antioxidant Irganox 1076 (from Ciba Geigy), 1 g of cyclohexyloxetane monomer (represented by the formula (20), CHOX from TOAGOSEI Co. Ltd.), 1 g of alicyclic epoxy monomer (Celloxide 2021P from Daicel Corporation), and photoacid generator Rhodorsil Photoinitiator 2074 (From Rhodia, CAS #178233-72-2) (1.36E-2 g, in 0.1 mL ethyl acetate) were added, the content was allowed to uniformly solubilize, and filtered through a 0.2-µm PTFE filter, to thereby obtain a clean core layer forming composition.

Example 16

An optical waveguide was obtained in a similar way as described in Example 1, except that the polymer synthesized as described below was used.

First, a polymer was synthesized in a similar way as described in Example 1, except that 10.4 g (40.1 mmol) of phenyldimethyl norbornene methoxysilane was used in place of 12.9 g (40.1 mmol) of phenylmethyl norbornene methoxysilane. A structural unit of the thus-obtained polymer is represented by the formula (103). Molecular weights of the polymer was found to be Mw=110,000 and Mn=50,000. Molar ratios of the individual structural units determined by NMR were 50 mol % of hexylnorbornene structural unit, and 50 mol % of phenyldimethyl norbornene methoxysilane structural unit.

Example 17

An optical waveguide was obtained in a similar way as described in Example 1, except that the core layer forming composition prepared by the method described below was used, and that the core layer forming composition was uniformly coated over the lower cladding layer using a doctor blade, and then placed in a drying oven at 60° C. for 10 minutes.

Ten grams of the polymer #1 was weighed in a 100-mL glass container, to which 40 g of mesitylene, 0.01 g of antioxidant Irganox 1076 (from Ciba Geigy), 2 g of cyclohexyloxetane monomer (represented by the formula (20), CHOX from TOAGOSEI Co. Ltd.), and photoacid generator Rhodorsil Photoinitiator 2074 (From Rhodia, CAS #178233-72-2) (2.72E-2 g, in 0.1 mL ethyl acetate) were added, the content was allowed to uniformly solubilize, and filtered through a 0.2-µm PTFE filter, to thereby obtain a clean core layer forming composition.

Example 18

An optical waveguide was obtained in a similar way as described in Example 15, except that the irradiation dose of UV was reduced to 500 mJ/cm².

[Chemical Formula 41]

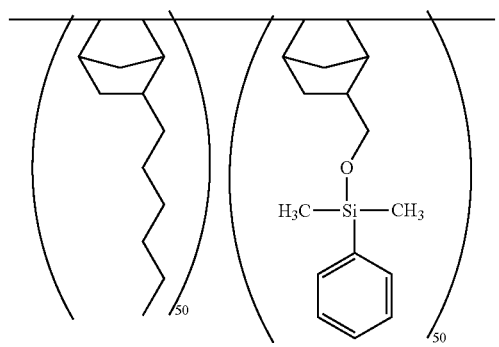

(103)

Comparative Example 1

An optical waveguide was obtained in a similar way as described in Example 1, except for the aspect below.

First, the lower cladding layer was formed, and a core layer forming composition which contains the polymer #1 not polymerized with cyclohexyloxetane monomer was coated thereon, followed by photo-irradiation and heating, to thereby obtain the core layer.

The cladding layer was then formed, and the optical waveguide was obtained.

In the thus-obtained optical waveguide, the refractive index of the core section was found to be almost constant, and also the refractive index of the side-face cladding section was found to be almost constant. In other words, the refractive index distribution W in the width-wise direction of core layer of the thus-obtained optical waveguide was found to be of so-called step index type.

Comparative Example 2

An optical waveguide was obtained in a similar way as described in Comparative Example 1, except that the photo-irradiation was conducted using, in the process of photo-irradiation, a photomask having a continuously graduated transmissivity of light, so as to continuously graduate the irradiation dose.

In the thus-obtained optical waveguide, the refractive index of the side-face cladding sections was found to be almost constant, whereas the refractive index of the core sections was found to continuously decrease from the center portion towards the periphery. In other words, the refractive index distribution of the core layer of the thus-obtained optical waveguide was found to be of so-called graded index type.

Comparative Example 3

An optical waveguide was obtained in a similar way as described in Comparative Example 1, except that the photo-irradiation was conducted using, in the process of photo-irradiation, a photomask having a continuously graduated transmissivity of light was used so as to continuously graduate the irradiation dose.

In the thus-obtained optical waveguide, the refractive index distribution was found to have a plurality of local minima and local maxima, wherein the refractive index of the core sections was found to continuously decrease from the center portion towards the periphery to reach the local minima, whereas the refractive index of the side-face cladding sections was found to continuously increase as departing from the local minima. At each local minimum, the refractive index distribution was found to show a nearly V-shaped profile, showing therearound a discontinuous change in the refractive index.

Reference Example 1

An optical waveguide was obtained in a similar way as described in Example 1, except that the optical waveguide was configured only with the core layer, without stacking the cladding layer.
2. Evaluation
2.1 Refractive Index Distribution of Optical Waveguide The refractive index distribution of the core layer of each of the thus-obtained optical waveguides was measured on the transverse cross section along the center line in the thickness-wise direction by the refracted near field method, to thereby obtain the refractive index distribution in the width-wise direction of the transverse cross section of the core layer. Since the thus-obtained refractive index distribution have a pattern repeated therein corresponding to every core section, so that the a part of the thus-obtained refractive index distribution was extracted and assumed as the refractive index distribution W. A profile of the refractive index distribution W was found to contain, as illustrated in FIG. 2, four local minima and five local maxima alternately arranged.

Based on the thus-obtained refractive index distribution W, the individual local minima Ws1, Ws2, Ws3, Ws4 and the individual local maxima Wm1, Wm2, Wm3, Wm4, Wm5 were determined, and an average refractive index WA of the cladding section was determined.

In addition, in the refractive index distribution W, the width a [μm] over which the refractive index at around the local maxima Wm2, Wm4 formed in the core sections is not smaller than the average refractive index WA, and the width b [μm] over which the refractive index at around each of the local minima Ws1, Ws2, Ws3, Ws4 is smaller than the average refractive index WA, were measured.

In addition, the refractive index distribution of the core section of the thus-obtained optical waveguides was measured on the transverse cross section along the center line in the thickness-wise direction, using a dual-beam interference microscope under the above-described conditions, to thereby obtain the refractive index distribution T in the thickness-wise direction of the transverse cross section of the optical waveguide.

It was eventually found that, in the refractive index distribution W of each of the optical waveguides obtained in the individual Examples, the refractive index continuously changed over the entire range.

On the other hand, the refractive index distribution T of each of the optical waveguides obtained in the individual Examples was found to be of the step index type. It was also found that, in Examples, the refractive index distribution P over the first cladding layer, the cladding section, and the cladding layer was found to be of the SI type.

The refractive index distribution W of the optical waveguide obtained in Comparative Example 1 was found to be of the step index type as described in the above, and also the refractive index distribution T was found to be of the step index type.

The refractive index distribution W of the optical waveguide obtained in Comparative Example 2 was found to be of graded index type as described in the above, whereas the refractive index distribution T was found to be of the step index type.

The refractive index distribution W of the optical waveguide obtained in Comparative Example 3 was found to show a discontinuous change in the refractive index between the core sections and the side-face cladding sections, whereas the refractive index distribution T was found to be of the step index type.

The refractive index distribution W of the optical waveguide of Reference Example 1 was found to show a profile similar to that of the refractive index distribution W of the optical waveguides obtained in the individual Examples. On the other hand, the refractive index distribution T was not measured, since the cladding layer was not formed.
2.2 Transmission Loss of Optical Waveguide Light emitted from a 850-nm VCSEL (vertical cavity surface emitting laser) was introduced through a 50-μm-diameter optical fiber into the optical waveguide, and received by a 200-μm-diameter optical fiber to thereby measure the intensity of light. The measurement was based on the cut back method. Measured values, plotted relative to the longitudinal length of the optical waveguide on the abscissa and insertion loss on the ordinate, fell on a straight line. Transmission loss was then calculated from the slope of the straight line.
2.3 Maintainability of Waveform of Pulse Signal Pulse signal with a pulse width of 1 ns was input from a laser pulse source into the thus-obtained optical waveguide, and the pulse width of the output light was measured.

The pulse width of the observed output light was calculated, assuming the value measured for optical waveguide obtained in Comparative Example 1 (step index-type optical waveguide) as 1, and the results was evaluated according to the criteria below:

<Evaluation Criteria for Pulse Width>
A: relative value of pulse width is smaller than 0.5;
B: relative value of pulse width is 0.5 or larger and smaller than 0.8;
C: relative value of pulse width is 0.8 or larger and smaller than 1; and
D: relative value of pulse width is 1 or larger.

Results of evaluation in sections 2.2 and 2.3 are summarized in Table 1.

TABLE 1

| | PARAMETERS FOR REFRACTIVE INDEX DISTRIBUTION W IN TRANSVERSE CROSS SECTION OF OPTICAL WAVEGUIDE | | | | | | | | |
|---|---|---|---|---|---|---|---|---|---|
| | Wm1 | Ws1 | Wm2 | Ws2 | Wm3 | Ws3 | Wm4 | Ws4 | Wm5 |
| EXAMPLE 1 | 1.551 | 1.549 | 1.557 | 1.549 | 1.551 | 1.549 | 1.554 | 1.549 | 1.551 |
| EXAMPLE 2 | 1.548 | 1.544 | 1.556 | 1.544 | 1.548 | 1.544 | 1.556 | 1.544 | 1.548 |
| EXAMPLE 3 | 1.548 | 1.545 | 1.561 | 1.545 | 1.548 | 1.545 | 1.561 | 1.545 | 1.548 |
| EXAMPLE 4 | 1.555 | 1.553 | 1.562 | 1.553 | 1.555 | 1.553 | 1.562 | 1.553 | 1.555 |
| EXAMPLE 5 | 1.564 | 1.560 | 1.578 | 1.560 | 1.564 | 1.560 | 1.578 | 1.560 | 1.564 |
| EXAMPLE 8 | 1.553 | 1.552 | 1.560 | 1.552 | 1.553 | 1.552 | 1.560 | 1.552 | 1.553 |
| EXAMPLE 9 | 1.568 | 1.565 | 1.575 | 1.565 | 1.568 | 1.565 | 1.575 | 1.565 | 1.568 |
| EXAMPLE 10 | 1.543 | 1.540 | 1.547 | 1.540 | 1.543 | 1.540 | 1.547 | 1.540 | 1.543 |
| EXAMPLE 11 | 1.580 | 1.577 | 1.601 | 1.577 | 1.580 | 1.577 | 1.601 | 1.577 | 1.580 |
| EXAMPLE 12 | 1.577 | 1.574 | 1.605 | 1.574 | 1.577 | 1.574 | 1.605 | 1.574 | 1.577 |
| EXAMPLE 13 | 1.547 | 1.546 | 1.555 | 1.546 | 1.547 | 1.546 | 1.555 | 1.546 | 1.547 |
| EXAMPLE 14 | 1.549 | 1.548 | 1.561 | 1.548 | 1.549 | 1.548 | 1.561 | 1.548 | 1.549 |
| EXAMPLE 15 | 1.549 | 1.547 | 1.562 | 1.547 | 1.549 | 1.547 | 1.562 | 1.547 | 1.549 |
| EXAMPLE 16 | 1.546 | 1.544 | 1.557 | 1.544 | 1.546 | 1.544 | 1.557 | 1.544 | 1.546 |
| EXAMPLE 17 | 1.543 | 1.540 | 1.554 | 1.540 | 1.543 | 1.540 | 1.554 | 1.540 | 1.543 |
| EXAMPLE 18 | 1.547 | 1.543 | 1.553 | 1.543 | 1.547 | 1.543 | 1.553 | 1.543 | 1.547 |
| COMPARATIVE EXAMPLE 1 | STEP INDEX-TYPE REFRACTIVE INDEX DISTRIBUTION W | | | | | | | | |
| COMPARATIVE EXAMPLE 2 | GRADED INDEX-TYPE REFRACTIVE INDEX DISTRIBUTION W | | | | | | | | |
| COMPARATIVE EXAMPLE 3 | DISCONTINUOUS REFRACTIVE INDEX DISTRIBUTION W | | | | | | | | |
| REFERENCE EXAMPLE 1 | 1.550 | 1.546 | 1.554 | 1.546 | 1.550 | 1.546 | 1.554 | 1.546 | 1.550 |

| | PARAMETERS FOR REFRACTIVE INDEX DISTRIBUTION W IN TRANSVERSE CROSS SECTION OF OPTICAL WAVEGUIDE | | | | | |
|---|---|---|---|---|---|---|
| | AVERAGE REFRACTIVE INDEX WA | (WA − Ws1)/ (Wm2 − Ws1) × 100 | (Wm1 − Ws1)/ (Wm2 − Ws1) × 100 | Wm2 − Ws1 | a [μm] | b |
| EXAMPLE 1 | 1.5500 | 12.5 | 25.0 | 0.008 | 45 | 0.42a |
| EXAMPLE 2 | 1.5460 | 16.7 | 33.3 | 0.012 | 43 | 0.31a |
| EXAMPLE 3 | 1.5465 | 9.4 | 18.8 | 0.016 | 40 | 0.50a |
| EXAMPLE 4 | 1.5540 | 11.1 | 22.2 | 0.009 | 40 | 0.64a |
| EXAMPLE 5 | 1.5620 | 11.1 | 22.2 | 0.018 | 36 | 0.33a |
| EXAMPLE 8 | 1.5525 | 6.2 | 12.5 | 0.008 | 44 | 0.32a |
| EXAMPLE 9 | 1.5665 | 15.0 | 30.0 | 0.010 | 42 | 0.43a |
| EXAMPLE 10 | 1.5415 | 21.4 | 42.9 | 0.007 | 50 | 0.20a |
| EXAMPLE 11 | 1.5785 | 6.3 | 12.5 | 0.024 | 49 | 0.09a |
| EXAMPLE 12 | 1.5755 | 4.8 | 9.7 | 0.031 | 51 | 0.05a |
| EXAMPLE 13 | 1.5465 | 5.6 | 11.1 | 0.009 | 43 | 0.44a |
| EXAMPLE 14 | 1.5485 | 3.8 | 7.7 | 0.013 | 41 | 0.34a |
| EXAMPLE 15 | 1.5480 | 6.7 | 13.3 | 0.015 | 42 | 0.26a |
| EXAMPLE 16 | 1.5450 | 7.7 | 15.4 | 0.013 | 44 | 0.25a |
| EXAMPLE 17 | 1.5415 | 10.7 | 21.4 | 0.014 | 35 | 0.62a |
| EXAMPLE 18 | 1.5450 | 20.0 | 40.0 | 0.010 | 40 | 0.55a |
| COMPARATIVE EXAMPLE 1 | STEP INDEX-TYPE REFRACTIVE INDEX DISTRIBUTION W | | | | | |
| COMPARATIVE EXAMPLE 2 | GRADED INDEX-TYPE REFRACTIVE INDEX DISTRIBUTION W | | | | | |
| COMPARATIVE EXAMPLE 3 | DISCONTINUOUS REFRACTIVE INDEX DISTRIBUTION W | | | | | |
| REFERENCE EXAMPLE 1 | 1.5480 | 25.0 | 50.0 | 0.008 | 28 | 0.71a |

TABLE 1-continued

| | PARAMETERS FOR REFRACTIVE INDEX DISTRIBUTION T IN TRANSVERSE CROSS SECTION OF OPTICAL WAVEGUIDE | | | | RESULTS OF EVALUATION | |
|---|---|---|---|---|---|---|
| | AVERAGE REFRACTIVE INDEX n2 IN T2 | AVERAGE REFRACTIVE INDEX n1 IN T1 | PROFILE OF REFRACTIVE INDEX DISTRIBUTION T | $|n1/n2 - 1| \times 100$ | TRANSMISSION LOSS [dB/cm] | PULSE WIDTH |
| EXAMPLE 1 | 1.517 | 1.557 | SI TYPE | 2.6 | 0.07 | C |
| EXAMPLE 2 | 1.517 | 1.556 | SI TYPE | 2.6 | 0.05 | B |
| EXAMPLE 3 | 1.517 | 1.561 | SI TYPE | 2.9 | 0.04 | A |
| EXAMPLE 4 | 1.517 | 1.562 | SI TYPE | 3.0 | 0.06 | B |
| EXAMPLE 5 | 1.517 | 1.578 | SI TYPE | 4.0 | 0.02 | A |
| EXAMPLE 8 | 1.517 | 1.560 | SI TYPE | 2.8 | 0.08 | C |
| EXAMPLE 9 | 1.517 | 1.575 | SI TYPE | 3.8 | 0.05 | C |
| EXAMPLE 10 | 1.517 | 1.547 | SI TYPE | 2.0 | 0.09 | C |
| EXAMPLE 11 | 1.517 | 1.601 | SI TYPE | 5.5 | 0.06 | B |
| EXAMPLE 12 | 1.517 | 1.605 | SI TYPE | 5.8 | 0.08 | C |
| EXAMPLE 13 | 1.517 | 1.555 | SI TYPE | 2.5 | 0.04 | B |
| EXAMPLE 14 | 1.517 | 1.561 | SI TYPE | 2.9 | 0.04 | B |
| EXAMPLE 15 | 1.517 | 1.562 | SI TYPE | 3.0 | 0.08 | B |
| EXAMPLE 16 | 1.517 | 1.557 | SI TYPE | 2.6 | 0.04 | B |
| EXAMPLE 17 | 1.517 | 1.554 | SI TYPE | 2.4 | 0.03 | A |
| EXAMPLE 18 | 1.517 | 1.553 | SI TYPE | 2.4 | 0.05 | B |
| COMPARATIVE EXAMPLE 1 | REFRACTIVE INDEX DISTRIBUTION SIMILAR TO EXAMPLE 1 | | | | 0.26 | — |
| COMPARATIVE EXAMPLE 2 | REFRACTIVE INDEX DISTRIBUTION SIMILAR TO EXAMPLE 1 | | | | 0.12 | D |
| COMPARATIVE EXAMPLE 3 | REFRACTIVE INDEX DISTRIBUTION SIMILAR TO EXAMPLE 1 | | | | 0.10 | C |
| REFERENCE EXAMPLE 1 | NO CLADDING LAYER | | | | 0.13 | D |

As is clear from Tale 1, the optical waveguides obtained in the individual Examples were confirmed to be suppressed in the transmission loss and rounding of pulse signal, as compared with the optical waveguides obtained in the individual Comparative Examples. It was also found that both of the transmission loss and rounding of pulse signal in the cladding section of Examples were suppressed as compared from those in the cases where all of the first cladding layer, the cladding section, and the second cladding layer have the same refractive index.

2.4 Intensity Distribution of Output Light of Optical Waveguide

An intensity distribution of the output light was measured at the end face on the output side of each optical waveguide obtained in the above, when the light was input into one ends of eight core sections.

The intensity distribution of output light was measured as described below.

Figure 12:
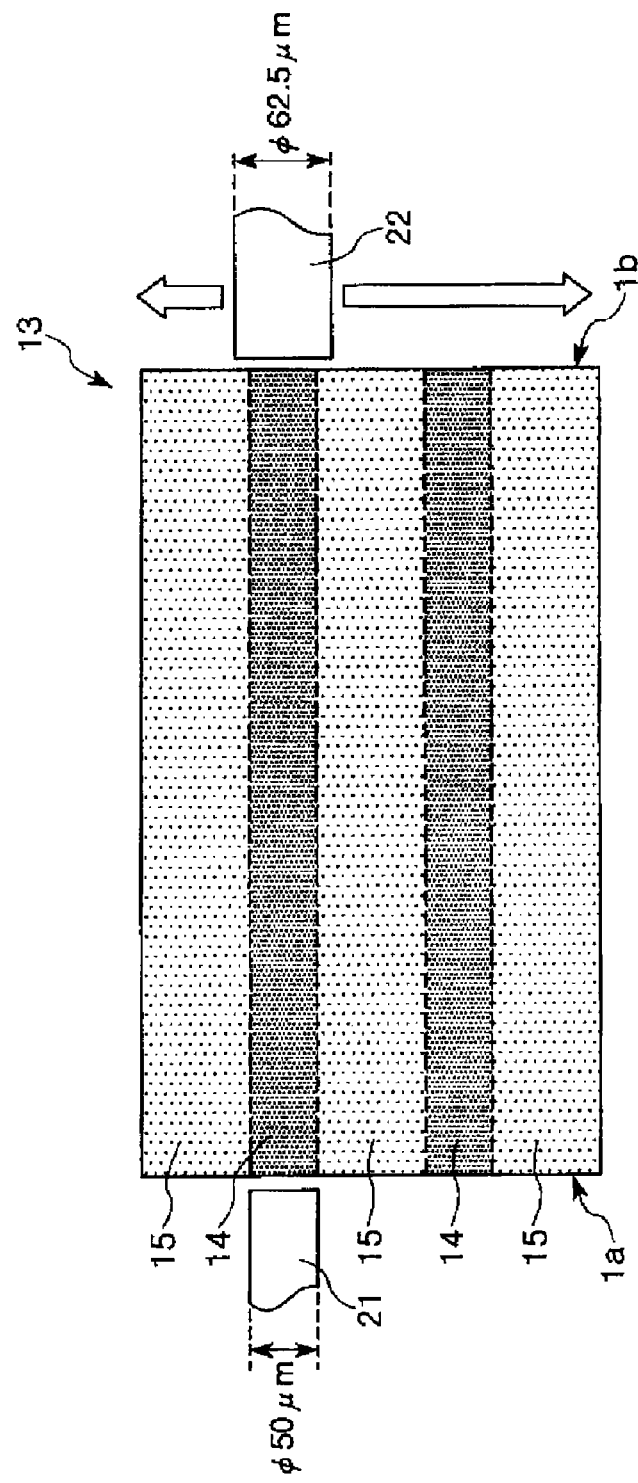
FIG. 12 is a drawing explaining a method of measuring intensity distribution of output light at the end face on the output side of the optical waveguide.

FIG. 12 is a drawing explaining the method of measuring intensity distribution of output light at the end face on the output side of the optical waveguide.

In the method illustrated in FIG. 12, first, a 50 μm-diameter, input-side optical fiber 21 was disposed, so as to oppose with one of the core sections 14 which appear on the end face 1a on the input side of the optical waveguide 1 to be measured. The input-side optical fiber 21 was connected to a light emitting element (not illustrated) for inputting light into the optical waveguide 1, and was disposed so as to align the optical axis thereof with the optical axis of the core section 14.

On the other hand, a 62.5 μm-diameter, output-side optical fiber 22 was disposed so as to oppose with the end face 1b on the output side of the optical waveguide 1. The output-side optical fiber 22 was connected to a photodetector (not illustrated) for receiving the light output from the optical waveguide 1, and was disposed so as to align the optical axis thereof with the center line in the thickness-wise direction of the core layer of the optical waveguide 1. The output-side optical fiber 22 is configured so as to scan over a plane which contains the center line, while keeping the distance from the end face on the output side constant.

The output-side optical fiber 22 is then scanned, while inputting light through the input-side optical fiber into one of the core sections. The intensity distribution of output light in relation to the position of the end face 1b on the output side may be obtained, by measuring intensity of output light received by the photodetector.

Figure 13:
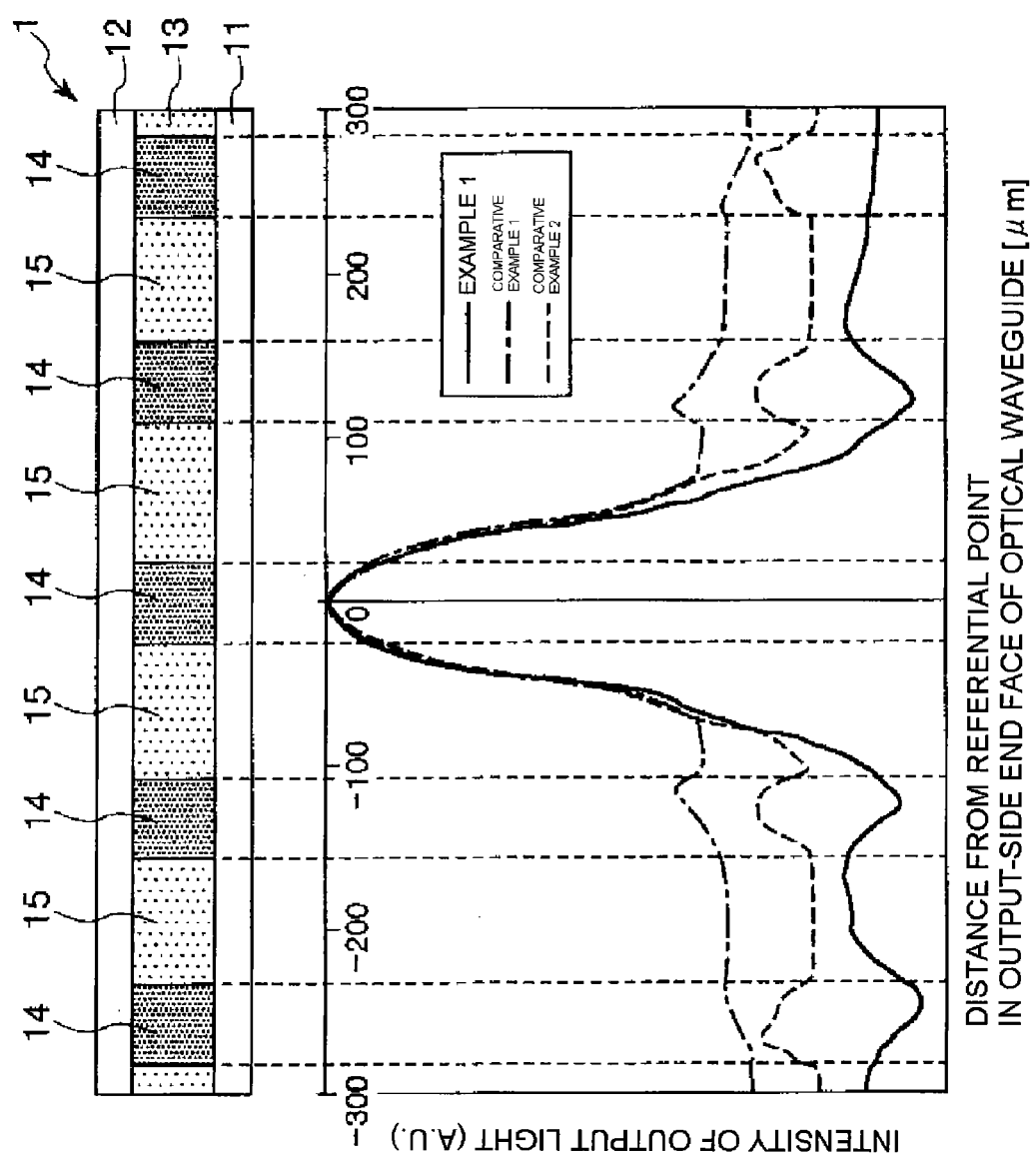
FIG. 13 is a drawing illustrating an intensity distribution of the output light observed at the end faces on the output side of the optical waveguide obtained in Example 1, Comparative Example 1 and Comparative Example 2.

The intensity distribution of output light measured as described in the above was shown in FIG. 13. FIG. 13 representatively shows the intensity distribution of the optical waveguides obtained in Example 1, Comparative Example 1 and Comparative Example 2.

As is clear from FIG. 13, the optical waveguide obtained in Example 1 was found to be sufficiently suppressed in crosstalk. It was also found that, in the optical waveguide obtained in Example 1, the intensity of output light from the core section 14 in adjacent to the core section 14 into which the light was input (the center core section 14 in FIG. 13), was smaller than the intensity of output light from the side-face cladding section 15 positioned opposite to the core section 14 into which the light was input, and in adjacent to the core section 14. This is supposedly because, in the optical waveguide obtained in Example 1, the local maximum which resides in the side-face cladding section 15 is smaller than the local maximum in the core section 14, and the refractive index distribution continuously changes, so that light which has otherwise leaked into the adjacent core section 14 to cause "crosstalk" in the conventional configuration may now be concentrated into the side-face cladding section 15, and may successfully suppress the crosstalk as a consequence. Accordingly, the optical waveguide obtained in Example 1 successfully prevents interference between channels.

While it was observed in the optical waveguide obtained in Example 1 that a part of the output light was concentrated into the side-face cladding section 15, the photodetector to be connected to the optical waveguide is generally connected so as to oppose with the end face on the output side of the individual core sections 14, but not connected to the side-face cladding section 15. Accordingly, even if the light should be concentrated into the side-face cladding section 15, it will not causative of crosstalk, and thereby interference may be suppressed.

Although not illustrated, also the optical waveguides obtained in other Examples were found to be sufficiently suppressed in the crosstalk, like Example 1.

On the other hand, the optical waveguides obtained in Comparative Examples 1, 2 were found to have the local maxima in the intensity distribution of output light positioned in the core section 14 adjacent to the core section 14 into which the light was input, and leakage of light (crosstalk) was observed.

Although not illustrated, crosstalk was observed also in the optical waveguide obtained in Comparative Example 3.

2.5 Mirror Loss

A recess having a V-shaped transverse cross section was formed in a region at around the end of the thus-obtained optical waveguide, by laser processing. In this way, the mirror illustrated in FIG. 5 was formed in each of the optical waveguides.

Mirror loss was then measured in accordance with the method of measuring mirror loss specified in section 4.6.3 of JPCA-PE02-05-01S standard, "Koubunshi Hikari Douharo no Shiken Houhou (Methods of Testing Polymer Optical Waveguide)" by JPCA (Japan Electronics Packaging and Circuits Association).

More specifically, the output-side optical fiber was aligned with the vertical end face of the optical waveguide, and the input-side optical fiber was set at a position where it may be connected via the mirror with the core section of the optical waveguide. Light was then input from the input-side optical fiber into the optical waveguide, and intensity of light detected through the output-side optical fiber was denoted as P1 (dBm).

Next, only the mirror portion was cut by dicing using a dicing saw to thereby form a vertical end face, the output-side optical fiber was set to the vertical end face, and intensity of output light was measured again. Intensity of light thus measured was denoted as P0 (dBm).

The mirror loss (dB) was calculated by P0-P1.

It was found from the results that all of the optical waveguides obtained in the individual Examples and Comparative Examples showed the mirror loss suppressed to lower levels, whereas the optical waveguide obtained in Reference Example showed a large mirror loss.

3. Other Examples 3.1 Manufacturing of Optical Waveguide

Example A (1) Preparation of Cladding Layer-Forming Solution

Twenty grams of Celloxide 2081 from Daicel Corporation, 0.6 g of Adekaoptomer SP-170 from ADEKA Corporation, and 80 g of methyl isobutyl ketone were mixed under stirring, and the mixture was filtered through a PTFE filter with a pore size of 0.2 µm, to thereby obtain a clean, colorless and clear cladding layer-forming solution E1.

(2) Preparation of Photosensitive Resin Composition

Twenty grams of YP-50S from Nippon Steel and Chemical Co. Ltd., 5 g of Celloxide 2021P from Daicel Corporation, and 0.2 g of Adekaoptomer SP-170 from ADEKA Corporation were added to 80 g of methyl isobutyl ketone and dissolved under stirring, the mixture was filtered through a PTFE filter with a pore size of 0.2 µm, to thereby obtain a clean, colorless and clear photosensitive resin composition F1.

(3) Formation of Lower Cladding Layer

On a polyimide film of 25 µm thick, the cladding layer-forming solution E1 was uniformly coated using a doctor blade, and the product was placed in a drying oven at 50° C. for 10 minutes. After the solvent was completely removed, the product was irradiated over the entire surface with 500 mJ/cm$^2$ UV for curing, to thereby obtain a colorless, clear lower cladding layer. The thus-obtained cladding layer was found to be 10 µm thick.

(4) Formation of Core Layer, and Patterning of Core Region and Cladding Region

On the lower cladding layer, the photosensitive resin composition F1 was uniformly coated using a doctor blade, and the product was placed in a drying oven at 50° C. for 10 minutes. After the solvent was completely removed, the product was brought into contact under pressure with a photomask having a linear pattern of 50-µm lines and 50-µm spaces over the entire surface, and was irradiated by UV using a parallel exposure apparatus with an irradiation dose of 500 mJ/cm$^2$. The mask was then removed, the product was placed in a drying oven at 150° C. for 30 minutes, and then taken out. Formation of a clear waveguide pattern was confirmed. The thus-obtained core layer was found to be 50 µm thick.

(5) Formation of Upper Cladding Layer

On the core layer, the upper cladding layer was formed using the cladding layer-forming solution E1, under conditions similar to those for the lower cladding layer. The thus-obtained upper cladding layer was found to be 10 µm thick.

Example B (1) Synthesis of Polymer

In a separable flask, 20.0 g of methyl methacrylate, 30.0 g of benzyl methacrylate, and 450 g of methyl isobutyl ketone were placed, the content was stirred and mixed, followed by substitution with nitrogen, to thereby obtain a monomer solution. On the other hand, 0.25 g of azobisisobutyronitrile as a polymerization initiator was dissolved into 10 g of methyl isobutyl ketone, followed by substitution with nitrogen, to thereby obtain an initiator solution. The monomer solution was then heated to 80° C. under stirring, and the initiator solution was added using a syringe to the monomer solution. The mixture was kept heated at 80° C. for 1 hour under stirring, and then cooled, to thereby obtain a polymer solution.

Next, 5 L of isopropanol was placed in a beaker and kept at normal temperature under stirring using a stirrer, and thereto the polymer solution was dropped. The mixture was kept under stirring for 30 minutes after completion of the dropping, the precipitated polymer was collected, and dried in a vacuum drying oven at 60° C. for 8 hours under reduced pressure, to thereby obtain polymer A1.

(2) Preparation of Cladding Layer-Forming Solution

Twenty grams of water-base acrylate resin solution RD-180 from Goo Chemical Co. Ltd., 20 g of isopropanol, and 0.4 g of Carbodilite V-02-L2 from Nisshinbo Chemical Inc. were mixed under stirring, the product was filtered through a PTFE filter having a pore size of 0.2 µm, to thereby obtain a clean, colorless and clear cladding layer-forming solution B1.

(3) Preparation of Photosensitive Resin Composition

Twenty grams of polymer A1 obtained by the method (1), 5 g of cyclohexyl methacrylate, and 0.2 g of Irgacure 651 from BASF Japan were placed in 80 g of methyl isobutyl ketone, dissolved under stirring, and the product was filtered through a PTFE filter having a pore size of 0.2 μm, to thereby obtain a clean, colorless and clear photosensitive resin composition C1.

(4) Formation of Lower Cladding Layer

On a polyimide film of 25 μm thick, the cladding layer-forming solution B1 was uniformly coated using a doctor blade, and the product was placed in a drying oven at 80° C. for 10 minutes. After the solvent was completely removed, the product was further placed in an oven at 150° C. for 10 minutes for curing, to thereby form a colorless and clear lower cladding layer. The thus obtained cladding layer was found to be 10 μm thick.

(5) Formation of Core Layer, and Patterning of Core Region and Cladding Region

On the lower cladding layer, the photosensitive resin composition C1 was uniformly coated using a doctor blade, and the product was placed in a drying oven at 50° C. for 10 minutes. After the solvent was completely removed, the product was brought into contact under pressure with a photomask having a stripe pattern of 50-μm lines and 50-μm spaces over the entire surface, and was irradiated by UV using a parallel exposure apparatus with an irradiation dose of 500 mJ/cm$^2$. The mask was then removed, the product was placed in a nitrogen-filled drying oven at 150° C. for 30 minutes, and then taken out. Formation of a clear waveguide pattern was confirmed. The thus-obtained core layer was found to be 50 μm thick.

(6) Formation of Upper Cladding Layer

On the core layer, the upper cladding layer was formed using the cladding layer-forming solution B1, under conditions similar to those for the lower cladding layer. The thus-obtained upper cladding layer was found to be 10 μm thick.

Example C

First, polymer A2 was synthesized in a similar way as described in Example B (1), except that 2-(perfluorohexyl) ethyl methacrylate was used in place of benzyl methacrylate.

Thereafter, an optical waveguide was obtained in a similar way as described in Example B, except that polymer A2 was used in place of polymer A1.

3.2 Evaluation (Transmission Loss of Optical Waveguide)

Light emitted from a 850-nm VCSEL (vertical cavity surface emitting laser) was introduced through a 50-μm-diameter optical fiber into the optical waveguides obtained in Examples A to C, and received by a 200-μm-diameter optical fiber to thereby measure the intensity of light. Transmission loss was measured by the cut back method. Measured values, plotted relative to the length of the optical waveguide on the abscissa and insertion loss on the ordinate, fell on a straight line. Propagation loss of each optical waveguide, calculated based on the slope of the straight line, was found to be 0.05 dB/cm.

In Examples A to C, modification of the refractive index distribution parameters into those in section 1. gave results of evaluation with a tendency similar to section 2.

(Maintainability of Waveform of Pulse Signal)

The optical waveguides obtained in Examples A to C were evaluated with respect to the maintainability of waveform of pulse signal, in a similar way as described in section 2.3. All optical waveguides were confirmed to show small levels of rounding of pulse signal.

In Examples A to C, modification of the refractive index distribution parameters into those in section 1. gave results of evaluation with a tendency similar to section 2.

Comparative Example 4

(1) Synthesis of Norbornene-Based Resin Having Eliminatable Group

In a glove box having both of moisture and oxygen concentration conditioned at 1 ppm or lower, and filled with dry nitrogen, 7.2 g (40.1 mmol) of hexylnorbornene (HxNB), and 12.9 g (40.1 mmol) of diphenylmethyl norbornene methoxysilane were weighed in a 500-mL vial, followed by further addition of 60 g of dehydrated toluene and 11 g of ethyl acetate, and the vial was tightly closed by placing a silicone sealer on the top.

Next, 1.56 g (3.2 mmol) of a Ni catalyst represented by the formula (4) below, and 10 mL of dehydrated toluene were weighed in a 100-mL vial, the vial was then sealed, with a stirrer chip enclosed therein, and the catalyst was completely dissolved by thorough stirring.

One milliliter of the solution of the Ni catalyst represented by the chemical formula (A) was exactly measured using a syringe, and quantitatively injected into the vial containing the two above-described species of norbornenes, and stirred at room temperature for one hour. A distinct increase in the viscosity was confirmed. The seal was removed at this point of time, 60 g of tetrahydrofuran (THF) was added and stirred, to thereby obtain a reaction solution.

In a 100-mL beaker, 9.5 g of acetic anhydride, 18 g (30% concentration) of aqueous hydrogen peroxide, and 30 g of deionized water were placed and stirred, to thereby prepare an aqueous peracetic acid in situ. Next, the whole quantity of the aqueous solution was added to the above-described reaction solution, and stirred for 12 hours, to thereby allow reduction treatment of Ni to proceed.

Next, the reaction solution after the treatment was transferred into a separating funnel, the lower aqueous layer was discarded, 100 mL of a 30% aqueous solution of isopropanol was added, and vigorously shaken. The content was allowed to stand still so as to allow it to completely separate into two layers, and the aqueous layer was discarded. After the water washing process repeated three times, the oil layer was dropped into a large excess of acetone so as to re-precipitate the produced polymer, the polymer was separated by filtration from the filtrate, and then dried under heating in a vacuum drying oven set to 60° C. for 12 hours. Norbornene-based resin A (polymer #1) having in the side chain thereof eleminatable groups was thus obtained. Measurement of molecular weight distribution by GPC gave Mw=100,000 and Mn=40,000. Measurement of molar ratios of the individual structural units in the norbornene-based resin A by NMR revealed 50 mol % of hexylnorbornene structural unit, and 50 mol % of diphenylmethyl norbornene methoxysilane structural unit. The refractive index, measured by metricon, was found to be 1.55 (measured at 633 nm).

[Chemical Formula 42]

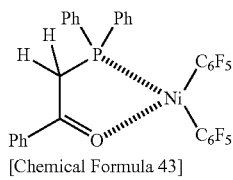

[Chemical Formula 43]

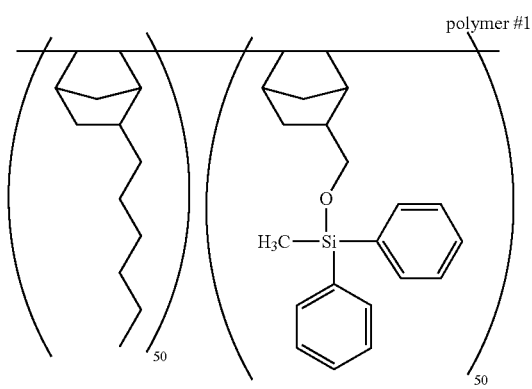

(2) Preparation of Photosensitive Resin Composition

Ten grams of the purified norbornene-based resin A was weighed in a 100-mL glass container, to which 40 g of mesitylene, 0.01 g of antioxidant Irganox 1076 (from Ciba Geigy), 2 g of cyclohexyloxetane monomer (first monomer represented by the formula (20), CHOX from TOAGOSEI Co. Ltd., CAS #483303-25-9, molecular weight=186, boiling point=125° C./1.33 kPa), and photoacid generator Rhodorsil Photoinitiator 2074 (From Rhodia, CAS #178233-72-2) (1.36E-2 g, in 0.1 mL ethyl acetate) were added, the content was allowed to uniformly solubilize, and filtered through a 0.2-μm PTFE filter, to thereby obtain a clean photosensitive resin composition varnish V1 for forming the core layer.

(3) Manufacturing of Optical Waveguide (Formation of Lower Cladding Layer)

On a silicon wafer, a photosensitive norbornene resin composition (Avatrel 2000P varnish from Promerus LLC) was uniformly coated using a doctor blade, and the product was placed in a drying oven at 45° C. for 15 minutes. After completely removing the solvent, the entire surface of coating was irradiated by 100 mJ UV, the product was dried in a drying oven at 120° C. for one hour so as to cure the coated film, and thereby the lower cladding layer was formed. The thus-formed lower cladding layer was found to be 20 μm thick, colorless and clear, and to have a refractive index of 1.52 (measured at 633 nm).

(Formation of Core Region, Cladding Region)

On the lower cladding layer, the photosensitive resin composition varnish V1 obtained by preparation described in the above was uniformly coated using a doctor blade, and the product was placed in a drying oven at 45° C. for 15 minutes. After the solvent was completely removed, the product was brought into contact with a photomask under pressure, and was selectively irradiated with 500 mJ/cm² UV. The mask was then removed, and the product was heated in a drying oven in a three-step manner at 45° C. for 30 minutes, at 85° C. for 30 minutes, and at 150° C. for one hour. After the heating, the core layer in which a very clear waveguide pattern appeared, was confirmed.

(Formation of Upper Cladding Layer)

On a polyethersulfone (PES) film, a photosensitive norbornene resin composition (Avatrel 2000P varnish from Promerus LLC) was preliminarily stacked so as to give a dry thickness of 20 μm, to thereby obtain a film for forming upper cladding layer.

(Manufacturing of Optical Waveguide)

The core layer formed on the lower cladding layer was bonded with the above-described film for forming upper cladding layer, the stack was placed in a vacuum laminator set to 140° C. for thermocompression bonding. The product was then irradiated with 100 mJ UV over the entire surface, dried in a drying oven at 120° C. for 1 hour so as to cure Avatrel 2000P, to thereby form the upper cladding layer. The optical waveguide was thus obtained.

It was confirmed that the refractive index distribution in the in-layer direction of the core layer of the optical waveguide of Comparative Example 4 was not of W-type.

This embodiment also includes the followings.

The refractive index at the bottom of the first dip may be smaller than the average refractive index of the cladding section.

The refractive index distribution W may have the apex of the second peak, outside the region around the boundary between the first core section and the cladding section.

The refractive index distribution W may have a region in which the apex of the second peak resides at the center portion of the cladding section, and the refractive index continuously decreases from the apex of the second peak towards the first dip. Difference in refractive index in the refractive index distribution T, between the first core section and the first cladding layer, may be larger than difference in refractive index in the refractive index distribution W, between the bottom of first dip and the apex of first peak. Now the refractive index at the apex may be represented by the local maximum or by the refractive index at the center of plateau.

The optical waveguide may be configured so that a space is provided so as to extend through the first core section and the first cladding layer, and so that a reflective surface on which light which propagates through the core section may be configured by the inner surface of the space.

The apex of the third peak in the refractive index distribution T may be located at the center portion of the core section.

The maximum value of the third peak may be larger than the maximum value of the first peak.

The refractive index distribution T may have a region in which the apex of the third peak resides at the center portion of the core section, and the refractive index continuously decreases from the apex of the third peak towards the second dip.

The refractive index distribution T positioned at the first cladding layer may show a maximum value of refractive index, outside the region around the boundary between the first cladding layer and the first core section, may show a minimum value of refractive index in a region at around the boundary between the first cladding layer and the core section, and may have a region in which the refractive index continuously decreases from the portion showing the maximum value towards the portion showing the minimum value.

Difference between the refractive index at the bottom of the second dip and the average refractive index of the cladding layer may be 3 to 80% of the difference between the refractive indices at the bottom of the second dip and the refractive index at the apex of the third peak.

Difference between the refractive indices at the bottom of the second dip and the refractive index at the apex of the third peak may be 0.005 to 0.07.

Difference between the refractive indices at the apex of the first dip and the average refractive index of the cladding section may be 3 to 80% of difference between the refractive indices at the bottom of the first dip and the refractive index at the apex of the first peak.

Difference between the refractive index at the bottom of the first dip and the refractive index at the apex of the first peak may be 0.005 to 0.07.

In the refractive index distribution W, defining a [μm] to be the width of a region of the first peak, over which the refractive index is not smaller than the average refractive index of the cladding section, and defining b [μm] to be the width of a region of the first dip, over which the refractive index is smaller than the average refractive index of the cladding section, then b may be given by 0.01a to 1.2a.

This embodiment also includes the followings:

(1) An optical waveguide which includes a core layer having a core section, and side-face cladding sections disposed adjacent to both side faces of the core section;

and cladding layers respectively stacked on both surfaces of the core layer, a refractive index distribution W, in the width-wise direction of a transverse cross section of the core layer, has a region which shows at least two local minima, at least one first local maximum, and at least two second local maxima smaller than the first local maximum, aligned in the order of the second local maximum, the local minimum, the first local maximum, the local minimum, and the second local maximum, and, of the region, a portion thereof which contains the first local maximum and falls between the two local minima corresponds to the core section, and a portion on the second local maximum side of each local minimum corresponds to the side-face cladding section, each local minimum is smaller than the average refractive index of the cladding section, and, the refractive index continuously changes over the entire range of the refractive index distribution, and a refractive index distribution T in the thickness-wise direction of the transverse cross section of the optical waveguide shows almost constant values of refractive index respectively in a region corresponded to the core section and in regions corresponded to the cladding layers, and shows a discontinuous change in the refractive index at each boundary between the core section and each cladding layer.

(2) The optical waveguide according to (1), wherein, in regions of the refractive index distribution W corresponded to the side-face cladding sections, the second local maxima reside at portions other than the vicinity of the boundary with the core section.

(3) The optical waveguide according to (2), wherein, in regions of the refractive index distribution W corresponded to the side-face cladding sections, the second local maxima reside at the center portions of the regions, and, the refractive index changes so as to continuously decrease from the second local maxima towards the local minima.

(4) The optical waveguide according to any one of (1) to (3), wherein difference between the local minimum and the average refractive index of the side-face cladding section is 3 to 80% of difference between the local minimum and the first local maximum.

(5) The optical waveguide according to (4), wherein difference in refractive index between the local minimum and the first local maximum is 0.005 to 0.07.

(6) The optical waveguide according to any one of (1) to (5), wherein, in an expression having position in the width-wise direction of a transverse cross section plotted on the abscissa, and having refractive index in the transverse cross section plotted on the ordinate, the refractive index distribution W shows a concave-up nearly U-profile at around the first local maximum, and shows a concave-down nearly U-profile at around the local minimum.

(7) The optical waveguide according to any one of (1) to (6), wherein, in the refractive index distribution W, defining a [μm] to be the width of a region around the first local maximum, over which the refractive index is not smaller than the average refractive index of the side-face cladding section, and defining b [μm] to be the width of a region around the local minimum, over which the refractive index is smaller than the average refractive index of the side-face cladding section, then b is 0.01a to 1.2a.

(8) The optical waveguide according to any one of (1) to (7), wherein difference in the refractive index between the core section and the cladding layer in the refractive index distribution T, is larger than difference between the refractive index at the local minimum and the refractive index at the first local maximum in the refractive index distribution W.

(9) The optical waveguide according to any one of (1) to (8), wherein the core layer has a plurality of core sections, and a plurality of side-face cladding sections adjacent to the side faces of the individual core sections.

(10) The optical waveguide according to any one of (1) to (9), further having a space provided so as to extend across the core section and the cladding layer, with an inner surface thereof being configured as a reflective surface on which light which propagates through the core section is reflected.

(11) The optical waveguide according to any one of (1) to (10), wherein the core section is composed of a norbornene-based resin.

(12) An electronic device having the optical waveguide described in any one of (1) to (11)

This application claims priority right based on Japanese Patent Application No. 2010-191294 filed on Aug. 27, 2010, the entire content of which is incorporated hereinto by reference.

The invention claimed is:

1. An optical waveguide comprising:
a first cladding layer;
a core layer provided over the first cladding layer and having a cladding section, a first core section, a cladding section, a second core section, and a cladding section aligned in an order of the cladding section, first core section, cladding section, second core section and cladding section in the in-layer direction; and
a second cladding layer provided over the core layer,
wherein the core layer has a refractive index distribution W in the in-layer direction in a portion which ranges from the first core section to the cladding section such that the refractive index distribution W has a continuous change and a region in which a first peak, a first dip, and a second peak are aligned in an order of the first peak, first dip and second peak, the first core section and the second core section are in contact with the first cladding layer and with the second cladding layer, the first peak in the refractive index distribution W is at the position corresponding to the first core section, the second peak in the refractive index distribution W has a maximum value of refractive index smaller than a maximum value of refractive index of the first peak and is at the position corresponding to the cladding section, the first cladding layer and the first core section have a refractive index distribution T in the layer-stacking direction in a portion which ranges from the first cladding layer to the first core section such that refractive index distribution T has a discontinuous change at the boundary between the first cladding layer and the first core section, and a difference between the maximum value of refractive index of the first core section and the maximum value of refractive index of the first cladding layer is larger than a difference between the maximum value of refractive index of the first core section and the maximum value of refractive index of the cladding section.

2. The optical waveguide according to claim 1, wherein the first cladding layer, core layer and second cladding layer have a refractive index distribution P in the layer-stacking direction in a portion which ranges from the first cladding layer through the cladding section to the second cladding layer such that the refractive index distribution P appears differently in a portion located at the first cladding layer and a portion located at the cladding section.

3. The optical waveguide according to claim 1, wherein the refractive index distribution T in the layer-stacking direction in the portion which ranges from the first cladding layer to the first core section is different from the refractive index distribution W.

4. The optical waveguide according to claim 1, further comprising a second core layer provided over the second cladding layer, wherein the second core layer has a third core section located above the first core section in the layer-stacking direction.

5. The optical waveguide according to claim 1, wherein the refractive index at the bottom of the first dip is smaller than the average refractive index of the cladding sections.

6. The optical waveguide according to claim 1, wherein the refractive index distribution W shows the apex of the second peak at a portion other than the vicinity of the boundary between the first core section and the cladding section.

7. The optical waveguide according to claim 1, wherein the refractive index distribution W shows the apex of the second peak at the center portion of the cladding section and has a region in which the refractive index continuously decreases from the apex of the second peak towards the first dip.

8. The optical waveguide according to claim 1, wherein a difference between the refractive indices of the first core section and the first cladding layer in the refractive index distribution T is larger than a difference between the refractive indices at the bottom of the first dip and at the apex of the first peak in the refractive index distribution W.

9. The optical waveguide according to claim 1, further comprising a space provided so as to extend across the first core section and the first cladding layer, with an inner surface thereof being configured as a reflective surface on which light which propagates through the core section is reflected.

10. The optical waveguide according to claim 1, wherein a difference between the refractive indices at the bottom of the first dip and the average refractive index of the cladding section is 3 to 80% of a difference between the refractive indices at the bottom of the first dip and at the apex of the first peak.

11. The optical waveguide according to claim 1, wherein a difference between the refractive indices at the bottom of the first dip and at the apex of the first peak is 0.005 to 0.07.

12. The optical waveguide according to claim 1, wherein, in the refractive index distribution W, defining a in μm to be the width of a region of the first peak, over which the refractive index is not smaller than the average refractive index of the cladding section, and defining b in μm to be the width of a region of the first dip, over which the refractive index is smaller than the average refractive index of the cladding section, then b is 0.01a to 1.2a.

13. An electronic device comprising the optical waveguide of claim 1.

14. An optical waveguide comprising:
a first cladding layer;
a core layer provided over the first cladding layer and having a cladding section, a first core section, a cladding section, a second core section, and a cladding section aligned in an order of the cladding section, first core section, cladding section, second core section and cladding section in the in-layer direction; and
a second cladding layer provided over the core layer,
wherein the core layer has a refractive index distribution W in the in-layer direction in a portion which ranges from the first core section to the cladding section such that the refractive index distribution W has a continuous change and a region in which a first peak, a first dip, and a second peak are aligned in an order of the first peak, first dip and second peak, the first core section and the second core section are in contact with the first cladding layer and with the second cladding layer, the first peak in the refractive index distribution W is at the position corresponding to the first core section, the second peak in the refractive index distribution W has a maximum value of refractive index smaller than a maximum value of refractive index of the first peak and is at the position corresponding to the cladding section, the first cladding layer and the first core section have a refractive index distribution T in the layer-stacking direction in a portion which ranges from the first cladding layer to the first core section such that refractive index distribution T has a discontinuous change at the boundary between the first cladding layer and the first core section, and a difference between the refractive indices of the first core section and the first cladding layer in the refractive index distribution T is larger than a difference between the refractive indices at the bottom of the first dip and at the apex of the first peak in the refractive index distribution W.

15. The optical waveguide according to claim 14, wherein the first cladding layer, core layer and second cladding layer have a refractive index distribution P in the layer-stacking direction in a portion which ranges from the first cladding layer through the cladding section to the second cladding layer such that the refractive index distribution P appears differently in a portion located at the first cladding layer and a portion located at the cladding section.

16. The optical waveguide according to claim 14, wherein the refractive index distribution T in the layer-stacking direction in the portion which ranges from the first cladding layer to the first core section is different from the refractive index distribution W.

17. The optical waveguide according to claim 14, further comprising a second core layer provided over the second cladding layer, wherein the second core layer has a third core section located above the first core section in the layer-stacking direction.

18. The optical waveguide according to claim 14, wherein the refractive index at the bottom of the first dip is smaller than the average refractive index of the cladding sections.

19. The optical waveguide according to claim 14, wherein the refractive index distribution W shows the apex of the second peak at a portion other than the vicinity of the boundary between the first core section and the cladding section.

20. The optical waveguide according to claim 14, wherein the refractive index distribution W shows the apex of the second peak at the center portion of the cladding section and has a region in which the refractive index continuously decreases from the apex of the second peak towards the first dip.

21. The optical waveguide according to claim 14, further comprising a space provided so as to extend across the first core section and the first cladding layer, with an inner surface thereof being configured as a reflective surface on which light which propagates through the core section is reflected.

22. The optical waveguide according to claim 14, wherein a difference between the refractive indices at the bottom of the first dip and the average refractive index of the cladding section is 3 to 80% of the difference between the refractive indices at the bottom of the first dip and at the apex of the first peak.

23. The optical waveguide according to claim 14, wherein the difference between the refractive indices at the bottom of the first dip and at the apex of the first peak is 0.005 to 0.07.

24. The optical waveguide according to claim 14, wherein, in the refractive index distribution W, defining a in μm to be the width of a region of the first peak, over which the refractive index is not smaller than the average refractive index of the cladding section, and defining b in μm to be the width of a region of the first dip, over which the refractive index is smaller than the average refractive index of the cladding section, then b is 0.01a to 1.2a.

25. An electronic device having the optical waveguide described in claim 14.

* * * * *